United States Patent
Ayyub et al.

(10) Patent No.: US 12,540,348 B2
(45) Date of Patent: Feb. 3, 2026

(54) DEVICE AND METHODS OF USING DEVICE FOR DETECTION OF AMINOACIDOPATHIES

(71) Applicants: University of Maryland, College Park, College Park, MD (US); Children's National Medical Center, Washington, DC (US)

(72) Inventors: Omar Bilal Ayyub, Potomac, MD (US); Brian Theodore Heligman, North Potomac, MD (US); Peter Kofinas, North Bethesda, MD (US); Marshall Lynn Summar, Washington, DC (US); Juan Manuel Cabrera-Luque, Rockville, MD (US); Gary Cunningham, Washington, DC (US)

(73) Assignees: University of Maryland, College Park, College Park, MD (US); Children's National Medical Center, Washington, DC (US)

( * ) Notice: Subject to any disclaimer, the term of this patent is extended or adjusted under 35 U.S.C. 154(b) by 0 days.

(21) Appl. No.: 15/304,852

(22) PCT Filed: Apr. 17, 2015

(86) PCT No.: PCT/US2015/026546
§ 371 (c)(1),
(2) Date: Oct. 17, 2016

(87) PCT Pub. No.: WO2015/161301
PCT Pub. Date: Oct. 22, 2015

(65) Prior Publication Data
US 2017/0198329 A1    Jul. 13, 2017

Related U.S. Application Data

(60) Provisional application No. 62/112,019, filed on Feb. 4, 2015, provisional application No. 61/981,126, filed on Apr. 17, 2014.

(51) Int. Cl.
| | |
|---|---|
| *C12Q 1/32* | (2006.01) |
| *B01L 3/00* | (2006.01) |
| *C12Q 1/00* | (2006.01) |
| *G01N 33/52* | (2006.01) |
| *G01N 33/68* | (2006.01) |

(52) U.S. Cl.
CPC .......... *C12Q 1/32* (2013.01); *B01L 3/502715* (2013.01); *C12Q 1/005* (2013.01); *G01N 33/523* (2013.01); *G01N 33/6812* (2013.01); *G01N 33/6893* (2013.01); *B01L 2200/10* (2013.01); *B01L 2300/0887* (2013.01); *G01N 2333/902* (2013.01); *G01N 2333/904* (2013.01); *G01N 2333/90622* (2013.01); *G01N 2800/04* (2013.01); *G01N 2800/52* (2013.01)

(58) Field of Classification Search
CPC ...... C12Q 1/005; C12Q 1/32; G01N 33/6812; G01N 33/523; G01N 33/6893; G01N 2800/52; G01N 2333/904; G01N 2333/90622; G01N 2333/902; G01N 2800/04; B01L 3/052715; B01L 2200/10; B01L 2300/0887
See application file for complete search history.

(56) References Cited

U.S. PATENT DOCUMENTS

| | | | |
|---|---|---|---|
| 4,254,222 A | 3/1981 | Owen | |
| 4,351,899 A | 9/1982 | Owen | |
| 4,806,343 A * | 2/1989 | Carpenter | A61K 9/127 264/4.3 |
| 4,849,345 A * | 7/1989 | Asano | C12N 9/0018 435/106 |
| 4,963,814 A | 10/1990 | Parks et al. | |
| 4,966,856 A * | 10/1990 | Ito | G01N 33/54386 422/421 |
| 4,999,582 A | 3/1991 | Parks et al. | |
| 4,999,632 A | 3/1991 | Parks | |

(Continued)

FOREIGN PATENT DOCUMENTS

| | | | | |
|---|---|---|---|---|
| EP | 1314786 A1 * | 5/2003 | | G01N 33/52 |
| JP | H10-33196 A | 2/1998 | | |

(Continued)

OTHER PUBLICATIONS

"Microcomputer." Britannica Academic, Encyclopaedia Britannica. Published May 12, 2016. [online]. [Retrieved on Sep. 2, 2018]. URL: <http://academic.eb.com/levels/collegiate/article/microcomputer/52500>. (Year: 2016).*

(Continued)

*Primary Examiner* — David W Berke-Schlessel
*Assistant Examiner* — Susan E. Fernandez
(74) *Attorney, Agent, or Firm* — John A. Zurawski; The Belles Group, P.C.

(57) ABSTRACT

The present disclosure relates to a biosensor capable of measuring the total concentration of one or a plurality of amino acids with the use of a reaction surface comprising one or a plurality of metabolic enzymes or functional fragments thereof, but wherein the reaction surface does not comprise an electrode or electrically conductive support. In some embodiments, the biosensor comprises use of a thermophilic bacterial metabolic enzyme immobilized or attached to the reaction surface.

25 Claims, 28 Drawing Sheets
Specification includes a Sequence Listing.

(56) References Cited

U.S. PATENT DOCUMENTS

| | | | |
|---|---|---|---|
| 5,041,733 A * | 8/1991 | Noguchi | G01N 15/1459 |
| | | | 250/459.1 |
| 5,243,516 A | 9/1993 | White | |
| 5,326,697 A | 7/1994 | Magers | |
| 5,353,351 A | 10/1994 | Bartoli et al. | |
| 5,366,609 A | 11/1994 | White et al. | |
| 5,405,511 A | 4/1995 | White et al. | |
| 5,438,271 A | 8/1995 | White et al. | |
| 5,510,245 A | 4/1996 | Magers | |
| 5,670,031 A | 9/1997 | Hintsche et al. | |
| 5,762,770 A | 6/1998 | Pritchard et al. | |
| 5,912,139 A | 6/1999 | Iwata et al. | |
| 5,969,813 A * | 10/1999 | Hammond | G01N 21/253 |
| | | | 250/339.11 |
| 6,200,773 B1 | 3/2001 | Ouyang et al. | |
| 6,541,216 B1 | 4/2003 | Wilsey et al. | |
| 6,645,359 B1 | 11/2003 | Bhullar et al. | |
| 6,662,439 B1 | 12/2003 | Bhullar | |
| 6,696,266 B1 * | 2/2004 | Etoh | C12Q 1/25 |
| | | | 435/26 |
| 6,736,957 B1 | 5/2004 | Forrow et al. | |
| 2001/0053849 A1 * | 12/2001 | Kreek | B01J 19/0046 |
| | | | 536/25.3 |
| 2002/0127623 A1 | 9/2002 | Minshull et al. | |
| 2003/0092034 A1 * | 5/2003 | Cooper | G01N 21/7703 |
| | | | 435/6.19 |
| 2003/0176183 A1 | 9/2003 | Drucker et al. | |
| 2004/0043376 A1 * | 3/2004 | Gupta | C12Q 1/32 |
| | | | 435/4 |
| 2006/0223729 A1 * | 10/2006 | Hamblin | A61K 41/0019 |
| | | | 510/130 |
| 2007/0077567 A1 | 4/2007 | Kim et al. | |
| 2007/0112118 A1 * | 5/2007 | Park | G03F 7/0047 |
| | | | 524/492 |
| 2007/0122867 A1 * | 5/2007 | Shunnarah | G01N 33/526 |
| | | | 435/27 |
| 2008/0045825 A1 | 2/2008 | Melker et al. | |
| 2008/0242738 A1 | 10/2008 | Marks et al. | |
| 2008/0262321 A1 * | 10/2008 | Erad | G01N 35/00871 |
| | | | 422/52 |
| 2012/0129710 A1 | 5/2012 | Mccafferty et al. | |
| 2012/0164627 A1 | 6/2012 | Battrell et al. | |
| 2012/0231489 A1 | 9/2012 | Lenhert | |
| 2013/0081958 A1 * | 4/2013 | Jung | C12Q 1/004 |
| | | | 205/777.5 |
| 2013/0201049 A1 | 8/2013 | Sugimoto | |
| 2015/0299760 A1 * | 10/2015 | Hovda | C12Q 1/32 |
| | | | 514/406 |

FOREIGN PATENT DOCUMENTS

| | | | | |
|---|---|---|---|---|
| JP | 2003-065951 A | 3/2003 | | |
| JP | 2006271379 A | 10/2006 | | |
| JP | 2006524509 A | 11/2006 | | |
| JP | 2009-168671 A | 7/2009 | | |
| JP | 2012-020054 A | 2/2012 | | |
| WO | WO-02/18624 A1 | 3/2002 | | |
| WO | 03/025627 A2 | 3/2003 | | |
| WO | WO-2004/091376 A2 | 10/2004 | | |
| WO | WO-2008029920 A1 * | 3/2008 | | G01N 33/6815 |
| WO | WO-2014062985 A1 * | 4/2014 | | C12N 11/10 |

OTHER PUBLICATIONS

Takada, H et al. Thermostable phenylalanine dehydrogenase of Thermoactinomyces intermedius: cloning, expression, and sequencing of its gene. J. Biochem. 1991. 109: 371-376. (Year: 1991).*

Hay, ID et al. Microbial alginate production, modification and its applications. Microbial Biotechnology. 2013. 6: 637-650. (Year: 2013).*

Villalonga, R et al. Increased conformational and thermal stability properties for phenylalanine dehydrogenase by chemical glycosidation with end-group activated dextran. Biotechnology Letters. 2005. 27: 1311-1317. (Year: 2005).*

Azmi, NE et al. An optical based biosensor for the determination of ammonium in aqueous environment. American Journal of Analytical Chemistry. 2012. 3: 364-370. (Year: 2012).*

Arakawa, T et al. Biosensor for L-phenylalanine based on the optical detection of NADH using a UV light emitting diode. Microchim Acta. 2011. 173: 199-205. (Year: 2011).*

Ayyub, OB et al. Point of care sensing of phenylketonuria. J. Inherit. Metab. Dis. 2013. 36(Suppl 2): S136. Abstract P-079. Published Aug. 8, 2013. (Year: 2013).*

Ali Kemal Yetisen et al: "Paper-based microfluidic point-of-care diagnostic devices" Lab on a Chip, vol. 13, No. 12, Jan. 1, 2013 (pp. 2210-2251), XP055105962.

Nuno Pires et al: "Recent Developments in Optical Detection Technologies in Lab-on-a-Chip Devices . . . ", Sensors, vol. 14, No. 8, Aug. 21, 2014, pp. 15458-15479, XP055413471.

Tomoyuki Koshida et al: "Fluorescence biosensing system . . . , Sensors and Actuators B: Chemical: International Journal . . . ", vol. 146, No. 1, Apr. 8, 2010, pp. 177-182.

Gregory Thiessen et al: "Conversion of a laboratory-based test for phenylalanine detection to a simple . . . ", Analyst, vol. 140, No. 2, Nov. 26, 2014, pp. 609-615.

Weiss et al., Dehydrogenase based reagentless biosensor for monitoring phenylketonuria, *Biosens Bioelectron* 2007;22(11):2436-41.

Uniprot F8CXT3 , *Geobacillus themoglucosidasius* C56-YS93 phenylalanine dehydrogenase [online] May 16, 2012; [retrieved Dec. 27, 2013] http://www.uniprot.org/uniprot/F8CXT3.txt?version=9.

Forrow et al., Development of a commercial amperometric biosensor electrode for the ketone D-3-hydroxybutyrate, *Biosens Bioelectron* 2005;20(8):1617-25.

Azmi et al., Biosensor based on glutamate dehydrogenase immobilized in chitosan for the determination of ammonium in water samples, *Analytical Biochem* , 2009; 388(1):28-32.

Cui et al., Development of an interference-free biosensor for I-glutamate using a bienzyme salicylate hydroxylase/I-glutamate dehydrogenase system, Enzyme and Microbial Tech 2007;41(6-7):689-693.

Huang et al., Determination of L-phenylalanine based on an NADH-detecting biosensor, *Analytical Chem* 1998; 70:991-997.

Ionescue et al., Improved enzyme retention from an electropolymerized polypyrrole-alginate matrix in the development of biosensors, *Electrochem Comm* 2005;7(12):1277-1282.

Kwan et al., Amperometric determination of ammonium with bienzyme/poly(carbamoyl) sulfonate hydrogel-based biosensor, *Sensors and Actuators* B 2005, 107:616-622.

Qin et al., Amperometric enzyme electrodes of glucose and lactate based on poly(diallyldimethylammonium)-alginate-metal ion-enzyme biocomposites, *Analytica Chimica Acta* 2012;720:49-56.

Villalonga et al., Supramolecular-mediated immobilization of L-phenylalanine dehydrogenase on cyclodextrin-coated Au electrodes for biosensor application, Biotech Letters 2007; 29(3); 447-452.

Jeffries C et al: "Evaluation of a thermophile enzyme for a carbon paste amperometric biosensor: L-glutamate dehydrogenase", Biosensors and Bioelectronics (1997) vol. 12, No. 3, 1997, pp. 225-232.

Pasco N et al: "Characterisation of a thermophilic L-glutamate dehydrogenase biosensor for amperometric determination of L-glutamate by flow injection analysis.", Biosensors & Bioelectronics (1999), vol. 14, No. 2, pp. 171-178.

Communication pursuant to Article 94(3) EPC was issued on May 28, 2019 by the European Patent Office for EP Application No. 13846569.5, which was filed on Oct. 17, 2013 and published as EP 2909606 on Aug. 26, 2015 (Applicant—University of Maryland) (5 pages).

International Search Report and Written Opinion of the International Searching Authority for PCT/US2015/026546 Mailed Aug. 14, 2015.

International Preliminary Report on Patentability for PCT/US2015/026546 Issued Oct. 18, 2016.

* cited by examiner

DEVICE AND METHODS OF USING DEVICE FOR DETECTION OF AMINOACIDOPATHIES

CROSS-REFERENCE TO RELATED APPLICATIONS

This application is a United States non-provisional application, which claims priority to and is a United States National Stage filing under 35 U.S.C. § 371 of International PCT Application Serial No. PCT/US2015/026546, filed Apr. 17, 2015, which claims priority to U.S. Provisional Ser. No. 61/981,126, filed Apr. 17, 2014, and U.S. Provisional Ser. No. 62/112,019, filed on Feb. 4, 2015, all of which are incorporated herein by reference in their entireties.

GOVERNMENT SUPPORT

This disclosure was made with support form the United States government as represented by the Secretary of Health and Human Services and the National Institutes of Health (NIH) under NIH grant number #HHSN268201200360P. The United States government has certain rights in the invention.

FIELD OF THE INVENTION

The disclosure relates generally to devices that quantify and identify the presence or absence of amino acids in a sample of bodily fluid. In some embodiments, the disclosure relates to detecting the presence, absence, or quantity of amino acids in a sample of bodily fluid. In some embodiments, the device is a reagentless biosensor only requiring a sample of bodily fluid for detection and/or quantification of one or more amino acids.

BACKGROUND

Numerous metabolic disorders, such as hyperammonemia and aminoacidopathies, are characterized by a chronic elevation of a specific metabolite due to dysfunction of enzymes involved in metabolic regulation, process and clearance. These high levels of metabolites can be biochemically evaluated by measuring plasma levels using well defined analytical methods and result in specific tissue toxicity, which define the symptomatology of each disease. It would be of great utility and convenience to develop sensors able to detect specific plasma metabolites in real time in similar fashion of what for example it has been done with glucose and diabetes. These sensors would allow doing immediate blood level evaluation of specific metabolites, facilitating the management, treatment and follow up of metabolic disorders. Recent estimations of the prevalence of metabolic and endocrine disorders in USA reveal that at least 5% of the population suffers from an endocrine disorder and more than 47 million of US residents have a metabolic syndrome. Besides the tremendous human suffering and the high impact on the health care costs, the management of these diseases is difficult and expensive not only in terms of medications, analytical monitoring, and follow-up of patients, but in many cases results in unnecessary procedures and hospitalizations. Although important advances have been made in specific disorders such as diabetes or hypercholesterolemia, advances in others with lower prevalence have been delayed. For example, not much advance has been made in obtaining new diagnostic or therapeutic solutions for patients with Hyperammonemia and Aminoacidopathies. Currently the monitoring of metabolite levels has to be done in a hospital equipped with a specialized mass spectrometry instrumentation, and therefore every time that these patients have an appearance of a crisis, whether related or unrelated to the elevation of the corresponding metabolite, they need to visit the hospital in order for the specialized testing to be performed. The disclosure addresses an advantageous unmet medical need. From both a patient quality-of-life and a financial management standpoint, the disclosure relates to a device capable of detecting the above-identified metabolites in real time.

SUMMARY OF INVENTION

The present disclosure encompasses the recognition that aminoacidopathies can be identified and/or characterized by identifying the levels or quantities of amino acids in bodily fluid including whole blood samples. It is the purpose of the application to identify the first In some embodiments, the present invention relates to identifying or diagnosing the quantity, presence, or absence of amino acids in bodily fluids by contacting a bodily fluid to a device disclosed herein. In some embodiments, the methods disclosed herein do not comprise contacting the bodily fluid with any reagent prior to identifying whether one or more amino acids are present or absent in the bodily fluid.

We envisioned the achievement of this goal immobilizing specific enzymes with sugar molecules to a reaction surface. After exposure to light, the wavelength of light emitted from reaction products flow can be analyzed. The concentration of the metabolite in blood correlates with readings taken by a light detector positioned at or proximate to the reaction surface. The disclosure relates to showing how to select the metabolite, how to choose the immobilized enzyme, how to perform the immobilization (what polymer, what additives, etc), how to attach the components to the reaction surface, how to make the measurement and how do develop a prototype.

This disclosure relates to a method of measuring metabolites in whole blood of patients in real time. Aside from the sensor disclosed herein, there are no known sensors able to measure the proposed metabolites from whole blood in real time. In one embodiment, a small volume of whole blood is applied to the electrode and the result is reported within several minutes. Depending on the exact analyte, specific enzyme(s) and cofactor(s) are incorporated onto the reaction surface and the sensor can detect the quantity of an analyte-specific reaction and response. For example, to detect elevated phenylalanine, the enzyme phenylalanine dehydrogenase is incorporated along with NAD+ cofactor. NADH is fluorescent when exposed to certain wavelength of light.

The present disclosure relates to a biosensor comprising: a light source; a light detector; and at least one reaction surface comprising at least one reduction agent, and at least one metabolic enzyme or functional fragment thereof; wherein the reaction surface does not comprise and is not attached to an electrically conductive support; and wherein the light source is positioned at a distance from the reaction surface sufficient to irradiate the reaction surface and the light detector is positioned at a distance from the reaction surface sufficient to collect irradiated light from the reaction surface. In some embodiments, the reaction surface further comprises at least one circuit connecting the light detector to a controller. In some embodiments, the light detector is a photodiode operably connected to a light accelerator, a controller and a display, such that, upon exposure of the reaction surface to an amount of a sample comprising an amino acid substrate, the controller receives a current from the photodiode and correlates the current to an electrical signal corresponding to a concentration value of the amnio acid in the sample, such electrical signal being propagated to and displayed by the display. In some embodiments, the reaction surface comprises at least one or a combination of amino acids chosen from: leucine dehydrogenase, tyrosine dehydrogenase, phenylalanine dehydrogenase, leucine oxidoreductase, tyrosine monooxygenase, alanine dehydrogenase, or glutamate dehydrogenase; or functional fragments thereof. In some embodiments, the reaction surface is a filter paper that comprises the at least one metabolic enzyme or functional fragment thereof. In some embodiments, at least one metabolic enzyme or functional fragment thereof is lyophilized onto the reaction surface.

In some embodiments, the biosensor further comprises a housing that contains at least a first fluid opening adjacent to and in fluid communication with a filter paper; wherein the filter paper is immediately adjacent to a microfluidic chamber that comprises the reaction surface. In some embodiments, the reaction surface is free of one or more of the following: (i) uricase or a functional fragment thereof; (ii) a hydrogel comprising dextran or a derivative thereof; (iii) a bacterial cell; (iv) an electronic dipole configured for electrophoresis; and (v) 3, 4-DHB. In some embodiments, the biosensor is free of a centrifuge or a rotor capable of centrifugal motion mechanically linked to the reaction surface. In some embodiments, the biosensor is at least 70% biologically active after about thirty days in storage at 4 degrees Celsius. In some embodiments, the reaction surface holds no more than from about 10 µL to about 100 µL of fluid.

In some embodiments, the at least one enzyme or functional fragment thereof is derived from a bacterial species and is immobilized on the reaction surface. In some embodiments, the at least one enzyme or functional fragment thereof is derived from a thermophilic bacterial species and is immobilized in the hydrogel. In some embodiments, the at least one enzyme or functional fragment thereof comprises at least about 70% sequence identity to SEQ ID NO:1 or SEQ ID NO:2. In some embodiments, the at least one enzyme is phenylalanine dehydrogenase or a functional fragment thereof obtained from a thermophilic bacterial cell.

In some embodiments, the alginate comprises a block polymer with a formula:

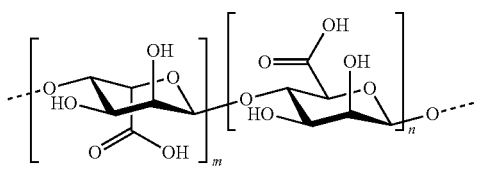

wherein m and n are any positive integer.

In some embodiments, the reaction surface forms at least one side of a microfluidic chamber with a volume no greater than 20 µL. In some embodiments, the at least one electron mediator is selected from: thionine, o-phenylenediamine, methylene blue, and toluidine blue. In some embodiments, the at least one reduction agent is chosen from: NAD+ or FAD+. In some embodiments, the reaction surface consists of a filter paper comprising a mixture of at least one lyophilized metabolic enzymes or functional fragments thereof and a sugar at a concentration from about 100 mM to about 400 mM.

The disclosure also relates to a biosensor comprising: at least one reaction surface comprising at least one electron mediator, at least one reduction agent, and at least one metabolic enzyme or functional fragment thereof; wherein the at least one enzyme or functional fragment thereof is at least 70% homologous to a phenylalanine dehydrogenase from *Geobacillus thermoglucosidasius*; and wherein the reaction surface does not comprise and is not attached to an electrically conductive support. In some embodiments, the biosensor is free of an amperometer.

In some embodiments, the enzyme or functional fragment thereof is at least 70% homologous to SEQ ID NO:1 or at least 70% homologous to a functional fragment of SEQ ID NO:1. In some embodiments, the one of plurality of enzymes or functional fragments thereof is derived from a bacterial cell.

In some embodiments, the at least one enzyme or functional fragment thereof is at least 70% homologous to a phenylalanine dehydrogenase from *Geobacillus thermoglucosidasius*; wherein the reaction surface comprises a filter paper and is free of and is not attached to an electrically conductive support; wherein the light source is positioned at a distance from the reaction surface sufficient to irradiate the reaction surface and the light detector is positioned at a distance from the reaction surface sufficient to collect irradiated light from the reaction surface.

The present disclosure also relates to a system comprising a biosensor disclosed herein in operable connection to at least one computer storage memory. In some embodiments, the system further comprises a sample of bodily fluid. In some embodiments, the system further comprises a digital display in operable connection to the at least one electrically conductive support by an electrical circuit capable of carrying an a electrical signal corresponding to a measurement of current and/or voltage differential from the voltmeter and/or amperometer to the digital display, wherein the digital display is a configured to display concentration value of an amino acid in a sample when the at least one electrically conductive support is in contact with the sample for a time period sufficient for the at least one metabolic enzyme to catalyze the oxidation of its amino acid substrate. In some embodiments, the system further comprises a computer processor in operable connection with the at least one computer storage memory. In some embodiments, the metabolic enzyme is a phenylalanine dehydrogenase immobilized to the reaction surface with one or a plurality of sugar molecules.

The present disclosure also relates to a kit comprising a biosensor disclosed herein. In some embodiments, the reaction surface comprises a test strip or filter paper contained within a removable housing having at least one fluid inlet, and a set of instructions, optionally accessible remotely through an electronic medium.

The present disclosure also relates to a method of determining or identifying a concentration of an amino acid in a sample of bodily fluid comprising: contacting a sample of bodily fluid to a biosensor disclosed herein, or a system disclosed herein; or any test strip disclosed herein; and determining a quantity of amino acid in the sample. In some embodiments, the sample of bodily fluid comprises whole blood.

The present disclosure also relates to a method of quantifying a concentration of one or more amino acids in sample of bodily fluid of a subject comprising contacting a sample of bodily fluid to a biosensor disclosed herein, or a system disclosed herein; or any test strip disclosed herein. In some embodiments, the method further comprises comparing a concentration value obtained by the quantifying or identifying steps to a threshold value associated with one or more metabolic diseases. In some embodiments, the step of contacting comprises exposing the sample of bodily fluid of a subject to the biosensor disclosed herein, or the system disclosed herein; or any test strip disclosed herein for a sufficient period of time to allow oxidation of at least one amino acid in the sample of bodily fluid by the metabolic enzyme or functional fragment thereof. In some embodiments, the method comprises exposing the sample of bodily fluid to light emitted from light source prior to detecting the light emitted from the reaction surface. In some embodiments, the sample of bodily fluid contains whole blood or serum from a subject. In some embodiments, the sample of bodily fluid is free of urine.

The present disclosure also relates to a method of diagnosing a metabolic disease in a subject comprising: (a) contacting a sample of bodily fluid to the to a biosensor disclosed herein or a system disclosed herein; or any test strip disclosed herein; (b) quantifying one or more concentration values of amino acids in the sample; (c) comparing the one or more concentration values of amino acids in the sample to a threshold value of amino acid concentration identified as being in a healthy range; and (d) identifying the subject as having a metabolic disease if the one or more concentration values of amino acids in the sample exceed or fall below the threshold value. In some embodiments, the metabolic disease is chosen from at least one or a combination of: phenylketonuria, hyperammonemia, and maple syrup urine disease.

The present disclosure also relates to a method of determining patient responsiveness to a therapy comprising: (a) contacting a sample of bodily fluid to the to a biosensor disclosed herein or a system disclosed herein; or any test strip disclosed herein; (b) quantifying one or more amino acid concentration values; (c) comparing the one or more concentration values to one or more threshold values associated with a metabolic disease.

The present disclosure also relates to a test strip comprising at least one reaction surface, wherein the reaction surface comprises at least one electron mediator, at least one reduction agent, at least one metabolic enzyme or functional fragment thereof, and alginate; and wherein the reaction surface does not comprise and is not attached to an electrode. In some embodiments, the test strip is adapted for a portable device comprising a voltmeter and/or amperometer and a digital display such that, when the test strip is contacted to the device, the first and second electrodes become operably connected to a closed electrical circuit comprising the voltmeter and/or amperometer and the digital display, and, upon contact with a sample of bodily fluid, the at least one metabolic enzyme or functional fragment thereof catalyzes oxidation of an amino acid resulting in a current on the first electrode corresponding to a concentration value of amino acid in the sample of bodily fluid, such concentration value readable on the display of the portable device.

The present disclosure also relates to a method of manufacturing a biosensor disclosed herein or a system disclosed herein; or any test strip disclosed herein comprising: immobilizing one or a plurality of metabolic enzymes or functional fragments thereof to the reaction surface; encasing said reaction surface in a housing. In some embodiments, the method comprises immobilizing the one or plurality of metabolic enzymes in a mixture of sugar wherein the sugar is at a concentration of from about 100 to about 300 mM in a buffer that is free of or substantially free of a salt.

DETAILED DESCRIPTION OF THE INVENTION

Figure 1:
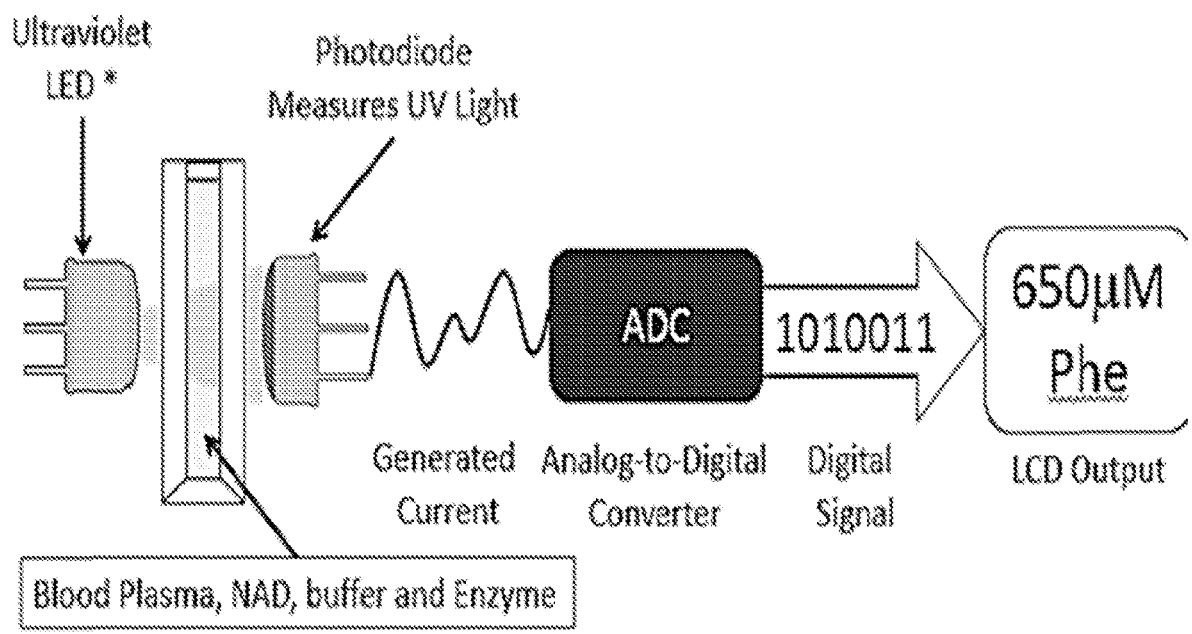
FIG. 1 depicts the process of converting UV light absorbance to a digital signal.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "about" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

The term "addressable location" as used herein means a discrete surface area or position on test strip or on the biosensor from which a signal, such as wavelength emitted from a reaction product produced from a reaction disclosed herein performed at the reaction surface, is obtained. can be one or a plurality of adhesion sets are immobilized or absorbed such that exposure of the one or plurality of adhesion sets to a sample comprising a biomaterial or cell for a sufficient time period results in contact between the cell or biomaterial and the adhesion set. In some embodiments, the disclosure relates to an array comprising one or a plurality of addressable locations of the biosensor with a surface no greater than 4 square microns. As used herein, the terms "attach," "attachment," "adhere," "adhered," "adherent," or like terms generally refer to immobilizing or fixing, for example, a group, a compound or adhesion set, to a surface, such as by physical absorption, chemical bonding, and like processes, or combinations thereof.

As used herein the terms "electronic medium" mean any physical storage employing electronic technology for access, including a hard disk, ROM, EEPROM, RAM, flash memory, nonvolatile memory, or any substantially and functionally equivalent medium. In some embodiments, the software storage may be co-located with the processor implementing an embodiment of the disclosure, or at least a portion of the software storage may be remotely located but accessible when needed.

As used herein, "sequence identity" is determined by using the stand-alone executable BLAST engine program for blasting two sequences (bl2seq), which can be retrieved from the National Center for Biotechnology Information (NCBI) ftp site, using the default parameters (Tatusova and Madden, FEMS Microbiol Lett., 1999, 174, 247-250; which is incorporated herein by reference in its entirety).

As used herein, the terms "biopsy" means a cell sample, collection of cells, or bodily fluid removed from a subject or patient for analysis. In some embodiments, the biopsy is a bone marrow biopsy, punch biopsy, endoscopic biopsy, needle biopsy, shave biopsy, incisional biopsy, excisional biopsy, or surgical resection.

As used herein, the terms "bodily fluid" means any fluid from a isolated from a subject including, but not necessarily limited to, a blood sample, an unprocessed whole blood sample, serum sample, urine sample, mucus sample, saliva sample, and sweat sample. The sample may be obtained from a subject by any means such as intravenous puncture, biopsy, swab, capillary draw, lancet, needle aspiration, collection by simple capture of excreted fluid.

As used herein the terms "electronic medium" mean any physical storage employing electronic technology for access, including a hard disk, ROM, EEPROM, RAM, flash memory, nonvolatile memory, or any substantially and functionally equivalent medium. In some embodiments, the software storage may be co-located with the processor implementing an embodiment of the disclosure, or at least a portion of the software storage may be remotely located but accessible when needed.

As used herein, the term "aminoacidopathy" is meant to refer to those diseases and disorders characterized by dysfunction of a metabolic catalysis of amino acids that results in over production or under production of amino acids in the body of a subject. Examples of aminoaciopathies are listed in the definition of a metabolic disease, terms that are used interchangeably in this application.

The term "subject" is used throughout the specification to describe an animal from which a sample of bodily fluid is taken. In some embodiments, the animal is a human. For diagnosis of those conditions which are specific for a specific subject, such as a human being, the term "patient" may be interchangeably used. In some instances in the description of the present disclosure, the term "patient" will refer to human patients suffering from a particular disease or disorder. In some embodiments, the subject may be a human suspected of having or being identified as at risk to develop an aminoacidopathy. In some embodiments, the subject may be diagnosed as having at least one aminoacidopathy. In some embodiments, the subject is suspected of having or has been diagnosed with phenylketonuria. In some embodiments, the subject may be a human suspected of having or being identified as at risk to develop aminoacidopathy. In some embodiments, the subject may be a mammal which functions as a source of the isolated sample of bodily fluid. In some embodiments, the subject may be a non-human animal from which a sample of bodily fluid is isolated or provided. The term "mammal" encompasses both humans and non-humans and includes but is not limited to humans, non-human primates, canines, felines, murines, bovines, equines, and porcines.

As used herein, "conservative" amino acid substitutions may be defined as set out in Tables A, B, or C below. Metabolic enzymes include those amino acid sequences wherein conservative substitutions have been introduced by modification of polynucleotides encoding polypeptides of the disclosure. Amino acids can be classified according to physical properties and contribution to secondary and tertiary protein structure. A conservative substitution is recognized in the art as a substitution of one amino acid for another amino acid that has similar properties. Exemplary conservative substitutions are set out in Table A.

TABLE A

Conservative Substitutions I

| Side Chain Characteristics | Amino Acid |
|---|---|
| Aliphatic | |
| Non-polar | G A P I L V F |
| Polar-uncharged | C S T M N Q |
| Polar-charged | D E K R |
| Aromatic | H F W Y |
| Other | N Q D E |

Alternately, conservative amino acids can be grouped as described in Lehninger, (Biochemistry, Second Edition; Worth Publishers, Inc. NY, N.Y. (1975), pp. 71-77) as set forth in Table B.

TABLE B

Conservative Substitutions II

| Side Chain Characteristic | Amino Acid |
|---|---|
| Non-polar (hydrophobic) | |
| Aliphatic: | A L I V P |
| Aromatic: | F W Y |
| Sulfur-containing: | M |
| Borderline: | G Y |
| Uncharged-polar | |
| Hydroxyl: | S T Y |
| Amides: | N Q |
| Sulfhydryl: | C |
| Borderline: | G Y |
| Positively Charged (Basic): | K R H |
| Negatively Charged (Acidic): | D E |

Alternately, exemplary conservative substitutions are set out in Table C.

TABLE C

Conservative Substitutions III

| Original Residue | Exemplary Substitution |
|---|---|
| Ala (A) | Val Leu Ile Met |
| Arg (R) | Lys His |
| Asn (N) | Gln |
| Asp (D) | Glu |
| Cys (C) | Ser Thr |
| Gln (Q) | Asn |
| Glu (E) | Asp |
| Gly (G) | Ala Val Leu Pro |
| His (H) | Lys Arg |
| Ile (I) | Leu Val Met Ala Phe |
| Leu (L) | Ile Val Met Ala Phe |
| Lys (K) | Arg His |

TABLE C-continued

Conservative Substitutions III

| Original Residue | Exemplary Substitution |
|---|---|
| Met (M) | Leu Ile Val Ala |
| Phe (F) | Trp Tyr Ile |
| Pro (P) | Gly Ala Val Leu Ile |
| Ser (S) | Thr |
| Thr (T) | Ser |
| Trp (W) | Tyr Phe Ile |
| Tyr (Y) | Trp Phe Thr Ser |
| Val (V) | Ile Leu Met Ala |

It should be understood that the polypeptides comprising polypeptide sequences associated with the extracellular matrix described herein are intended to include polypeptides bearing one or more insertions, deletions, or substitutions, or any combination thereof, of amino acid residues as well as modifications other than insertions, deletions, or substitutions of amino acid residues.

As used herein, the term "prognosing" means determining the probable course and outcome of a disease.

As used herein, the term "functional fragment" means any portion of a polypeptide that is of a sufficient length to retain at least partial biological function that is similar to or substantially similar to the wild-type polypeptide function upon which the fragment is based. In some embodiments, a functional fragment of a polypeptide associated with the function of a metabolic enzyme is a polypeptide that comprises at least 70%, 75%, 80, 85, 90, 95, 96, 97, 98, or 99% sequence identity of any polypeptide disclosed in Table 3 and has sufficient length to retain at least partial binding affinity to one or a plurality of ligands that bind to the polypeptide. In some embodiments, the fragment is a fragment of any polypeptide disclosed in Table 3 and has a length of at least about 10, about 20, about 30, about 40, about 50, about 60, about 70, about 80, about 90, or about 100 contiguous amino acids. In some embodiments, the fragment is a fragment of any polypeptide disclosed in Table 3 and has a length of at least about 50 amino acids. In some embodiments, the fragment is a fragment of any polypeptide disclosed in Table 3 and has a length of at least about 100 amino acids. In some embodiments, the fragment is a fragment of any polypeptide disclosed in Table 3 and has a length of at least about 150 amino acids. In some embodiments, the fragment is a fragment of any polypeptide disclosed in Table 3 and has a length of at least about 200 amino acids. In some embodiments, the fragment is a fragment of any polypeptide disclosed in Table 3 and has a length of at least about 250 amino acids.

As used herein, the terms "polypeptide sequence associated with the metabolic enzyme" means any polypeptide or fragment thereof, modified or unmodified by any macromolecule (such as a sugar molecule or macromolecule), that is produced naturally by cells in any multicellular organism and is a metabolic enzyme as disclosed herein or a functional fragment thereof. In some embodiments, a polypeptide sequence associated with the extracellular matrix is any polypeptide which sequence comprises any of the polypeptides disclosed in Table 3. In some embodiments, a polypeptide sequence associated with the metabolic enzyme is any polypeptide sequence comprising any of the polypeptides disclosed in Table 3 or a sequence that shares 85, 90, 95, 96, 97, 98, or 99% sequence identity with the polypeptides disclosed in Table 3 or a functional fragment thereof. In some embodiments, a polypeptide sequence associated with the metabolic enzyme consists of any of the polypeptides disclosed in Table 3 or a sequence that shares 85, 90, 95, 96, 97, 98, or 99% sequence identity with the polypeptides disclosed in Table 3.

As used herein, the term "light source" refers to any device that emits electromagnetic radiation. In some embodiments, the biosensor or system disclosed herein comprises one or a plurality of light sources. Such light source may be LEDS, incandescent lamps, lasers, or the like or any other device that can excite wavelengths of light.

As used herein, the term "light detector" refers to any device that can detect or quantify the presence of electromagnetic radiation. In some embodiments, the biosensor or system disclosed herein comprises one or a plurality of light detectors. Such light detectors may include one of a combination of photodiodes, cameras (such as CMOS or CCD cameras), or spectrophotometers. In some embodiments, a filter and/or current accelerator is used in conjunction with the light detector.

As used herein, the term "antibody" refers to any immunoglobulin, whether natural or wholly or partially synthetically produced. In some embodiments, an antibody is a complex comprised of 4 full-length polypeptide chains, each of which includes a variable region and a constant region, e.g., substantially of the structure of an antibody produced in nature by a B cell. In some embodiments, an antibody is a single chain. In some embodiments, an antibody is cameloid. In some embodiments, an antibody is an antibody fragment. In some embodiments, an antibody is chimeric. In some embodiments, an antibody is bi-specific. In some embodiments, an antibody is multi-specific. In some embodiments, an antibody is monoclonal. In some embodiments, an antibody is polyclonal. In some embodiments, an antibody is conjugated (i.e., antibodies conjugated or fused to other proteins, radiolabels, cytotoxins). In some embodiments, an antibody is a human antibody. In some embodiments, an antibody is a mouse antibody. In some embodiments, an antibody is a rabbit antibody. In some embodiments, an antibody is a rat antibody. In some embodiments, an antibody is a donkey antibody. In some embodiments, the biosensor or system described herein comprises an antibody or plurality of antibodies.

Characteristic: As is used herein, the term "characteristic" refers to any detectable feature of a sample of bodily fluid that allows it to be distinguished from a comparable sample of bodily fluid. In some embodiments, a characteristic is an amount or identity of an amino acid. In some embodiments, a characteristic is an amount or sequence of a gene transcript. In some embodiments, a characteristic is an amount, sequence of, or modification of an amino acid. In some embodiments a characteristic is an amount of a carbohydrate. In some embodiments, a characteristic is an amount of a small molecule.

Comparable: As is used herein, the term "comparable" is used to refer to two entities that are sufficiently similar to permit comparison, but differing in at least one feature.

Metabolic Enzyme: As is used herein, the term "metabolic enzyme" means an enzyme responsible for catalysis of at least one step in the metabolic pathway of one or more amino acids. In some embodiments, the metabolic enzyme is phenylalanine dehydrogenase, glutamate dehydrogenase, respective functional fragments or a combination thereof or a fusion protein thereof.

As used herein the terms "metabolic disease" is any one of a group of disorders caused by a defect in an enzymatic step in the metabolic pathway of one or more amino acids or in a protein mediator necessary for transport of certain amino acids into or out of cells. In some embodiments, the metabolic disease is chosen from: Argininemia (ARG, arginase deficiency) Argininosuccinate acidemia (ASA, argininosuccinase) Citrullinemia type I (CIT-I, argininosuccinate synthetase) Citrullinemia type II (CIT-II, citrin deficiency) Defects of biopterin cofactor biosynthesis (BIOPT-BS) Defects of biopterin cofactor regeneration (BIOPT-RG) Homocystinuria (HCY, cystathionine beta synthase) Hyperphenylalaninemia (H-PHE) Hypermethioninemia (MET) Maple syrup urine disease (MSUD, branched-chain ketoacid dehydrogenase) Phenylketonuria (PKU, phenylalanine hydroxylase) Tyrosinemia type I (TYR-1, fumarylacetoacetate hydrolase), Tyrosinemia type II (TYR-II, tyrosine aminotransferase), and Tyrosinemia type III (TYR-III, hydroxyphenylpyruvate dioxygenase) where the parenthetical phrases after each disease state represent an abbreviation for the disease accompanies by the enzyme that is generally defective in the subject suffering from the disease state.

Polypeptide: The term "polypeptide", as used herein, generally has its art-recognized meaning of a polymer of at least three amino acids. Those of ordinary skill in the art will appreciate that the term "polypeptide" is intended to be sufficiently general as to encompass not only polypeptides having the complete sequence recited herein, but also to encompass polypeptides that represent functional fragments (i.e., fragments retaining at least one activity) of such complete polypeptides. Moreover, those of ordinary skill in the art understand that protein sequences generally tolerate some substitution without destroying or significantly reducing activity. Thus, any polypeptide that retains activity and shares at least about 30-40% overall sequence identity, often greater than about 50%, 60%, 70%, 75%, 80%, or 85%, and further usually including at least one region of much higher identity, often greater than 90% or even 95%, 96%, 97%, 98%, or 99% in one or more highly conserved regions, usually encompassing at least 3-4 and often up to 20 or more amino acids, with another polypeptide of the same class, is encompassed within the relevant term "polypeptide" as used herein.

As used herein, the term "threshold value" is the concentration of amino acid in a sample of bodily fluid that indicates whether the amount of amino acid in the sample is considered abnormally high or low resulting in a diagnosis or suspected diagnosis of a particular disorder, such as a metabolic disease. For instance, in the case of a blood sample, known threshold values for certain aminoacidopathies are indicated in Table 1 below:

TABLE 1

Aminoacidopathies and their associated amino acid markers detectable in a sample

| Disorder | Marker | Abnormal Range |
|---|---|---|
| ARG | Arginine | >100 umol/L |
| ASA | Argininosuccinic acid | >4.0 umol/L |
|  | ASA/Arg | >0.75 |
| CIT-I and CIT-II | Citrulline | >60 umol/L |
|  | Cit/Tyr | >1.0 |
|  | Cit/Arg | >6.0 |

TABLE 1-continued

Aminoacidopathies and their associated amino acid
markers detectable in a sample

| Disorder | Marker | Abnormal Range |
|---|---|---|
| HCY and MET | Methionine | >70 umol/L |
| | Met/Phe | >1.2 |
| MSUD | Leucine | >250 umol/L |
| | Valine | >250 umol/L |
| | Leu/Phe | >4.0 |
| | Val/Phe | >3.5 |
| PKU, H-PHE | Phenylalanine | >130 umol/L |
| BIOPT-BS and BIOPT-RG | Phe/Tyr | >2.0 |
| TYR-I, TYR-II, and TYR-III | Tyrosine | >250 umol/L |

In some embodiments, information about a threshold value or reference sample of bodily fluid is obtained prior to or simultaneously with information about an experimental sample of bodily fluid. In some embodiments, information about a threshold value or reference sample of bodily fluid is obtained prior to or simultaneously with concentration calculation or detection about an experimental sample of bodily fluid. In some embodiments, information about a reference cell or cell type is historical. In some embodiments, information about a threshold value or reference sample of bodily fluid is stored for example in a computer-readable storage medium. In some embodiments, comparison of a particular concentration value with a threshold value or reference sample of bodily fluid differentiates the concentration values of one or more amino acids in an experimental sample of bodily fluid with the threshold values thereby allowing a comparison that results in diagnosing a subject with one or more metabolic diseases or a change in severity of one or more metabolic diseases.

Reference electrode: As will be understood from context, a reference electrode or control electrode is an electrically conductive support such as an electrode placed in a circuit with an at least one electrically conductive support comprising hydrogel and/or immobilized enzymes disclosed herein, to permit a relevant comparison of voltage difference between the reference or control electrode and the at least one electrically conductive support at which the experimental sample will be measured. In some embodiments, the experimental electrode or electrode comprise hydrogel and/or immobilized enzymes disclosed herein. In some embodiments, the reference electrode does not comprise immobilized enzyme.

Reference surface: As will be understood from context, a reference surface or control surface is such as portion of a microfluidic chamber upon which the a control reaction is run. In some embodiments, the reference surface permits a relevant comparison of light detector measurements between the reference or control electrode and the at least one experimental surface where an sample will be measured. In some embodiments, the experimental surface comprises immobilized enzymes disclosed herein. In some embodiments, the reference electrode does not comprise immobilized enzyme.

Sample: As used herein, the term "sample" refers to a biological sample obtained or derived from a source of interest, as described herein. In some embodiments, a source of interest comprises an organism, such as an animal or human. In some embodiments, a biological sample comprises biological tissue or fluid. In some embodiments, a biological sample may be or comprise bone marrow; blood; blood cells; ascites; tissue or fine needle biopsy samples; cell-containing body fluids; free floating nucleic acids; sputum; saliva; urine; cerebrospinal fluid, peritoneal fluid; pleural fluid; feces; lymph; gynecological fluids; skin swabs; vaginal swabs; oral swabs; nasal swabs; washings or lavages such as a ductal lavages or broncheoalveolar lavages; aspirates; scrapings; bone marrow specimens; tissue biopsy specimens; surgical specimens; feces, other body fluids, secretions, and/or excretions; and/or cells therefrom, etc. In some embodiments, a biological sample is or comprises bodily fluid. In some embodiments, a sample is a "primary sample" obtained directly from a source of interest by any appropriate means. For example, in some embodiments, a primary biological sample is obtained by methods selected from the group consisting of biopsy (e.g., fine needle aspiration or tissue biopsy), surgery, collection of body fluid (e.g., blood, lymph, feces etc.), etc. In some embodiments, as will be clear from context, the term "sample" refers to a preparation that is obtained by processing (e.g., by removing one or more components of and/or by adding one or more agents to) a primary sample. For example, filtering using a semi-permeable membrane. Such a "processed sample" may comprise, for example nucleic acids or proteins extracted from a sample or obtained by subjecting a primary sample to techniques such as amplification or reverse transcription of mRNA, isolation and/or purification of certain components, etc. In some embodiments, the methods disclosed herein do not comprise a processed sample. In some embodiments, the sample is unprocessed or unfiltered whole blood or plasma from a mammal.

The disclosure relates to a biosensor for measuring a total concentration of one or a plurality of specific amino acids and kits comprising the same. In some embodiments, the amino-acid biosensor comprises an outer housing comprising at least one or at least two layers of a barrier material (such as plastic or metal) that separates the reaction surface from a point external to the biosensor. In some embodiments, the outer housing comprises one plastic rectangular frame or two rectangular frames that, when adjacent to each other, form a cartridge. At least one of the layers may have a opening on its face that exposes a divet, well, application site or other fluid opening designed to receive a sample. The housing may also comprise a slit or tab or a movable portion that exposes an opening to receive a filter paper and/or any other component of the internal portion of the biosensor. In some embodiments, for instance, the cartridge may be rechargeable with a access point such that the access point allows the removal and insertion of filter paper and/or a new microfluidic chamber in the internal portion of the biosensor. In this way, the cartridge or housing provides a solid support that separate the external environment from the reaction surface and, in some cases, the rest of the microfluidic chamber. In some embodiments the one or two layers of plastic are laminate plastic. In some embodiments, the entire housing comprising the microfluidic chamber and the filter paper is no more than about 10 cubic inches. In some embodiments, the entire housing comprising the microfluidic chamber and the filter paper is no more than about 10 cubic inches. In some embodiments, the entire housing comprising the microfluidic chamber and the filter paper is no more than about 10 cubic inches. In some embodiments, the entire housing comprising the microfluidic chamber and the filter paper is no more than about 9 cubic inches. In some embodiments, the entire housing comprising the microfluidic chamber and the filter paper is no more than about 8 cubic inches. In some embodiments, the entire housing comprising the microfluidic chamber and the filter paper is no more than about 7 cubic inches. In some embodiments, the entire housing comprising the microfluidic chamber and the filter paper is no more than about 6 cubic inches. In some embodiments, the entire housing comprising the microfluidic chamber and the filter paper is no more than about 5 cubic inches. In some embodiments, the entire housing comprising the microfluidic chamber and the filter paper is no more than about 4 cubic inches. In some embodiments, the entire housing comprising the microfluidic chamber and the filter paper is no more than about 3 cubic inches. In some embodiments, the entire housing comprising the microfluidic chamber and the filter paper is no more than about 2 cubic inches. In some embodiments, the entire housing comprising the microfluidic chamber and the filter paper is no more than about 1 cubic inch. In some embodiments, the width of the housing comprising the microfluidic chamber and the filter paper is from about 1 inch to about 3 inches. In some embodiments, the width of the housing comprising the microfluidic chamber and the filter paper is from about 0.5 inches to about 5 inches. In some embodiments, the length of the housing comprising the microfluidic chamber and the filter paper is from about 1 inch to about 3 inches. In some embodiments, the length of the housing comprising the microfluidic chamber and the filter paper is from about 0.5 inches to about 5 inches. In some embodiments, the height or thickness of the housing comprising the microfluidic chamber and the filter paper is from about 0.1 inch to about 1.5 inches. In some embodiments, the height or thickness of the housing comprising the microfluidic chamber and the filter paper is from about 0.2 inches to about 1 inch.

In some embodiments, a filter paper is adjacent to at least one layer of plastic of the housing and the filter paper is in fluid communication with at least one microfluidic chamber positioned adjacent to or proximate to the filter paper. In one embodiment, the biosensor comprises a housing comprising one plastic layer with a first fluid opening for receiving a sample and a second plastic layer such as a plastic test strip support that, when assembled allow a space therebetween in which at least one filter paper and one microfluid chamber are positioned. In some embodiments, the housing comprises a slit on at least one edge through which filter paper and/or at least one microfluidic chamber may be removed or exchanged with a new filter paper or microfluidic chamber after a filter paper and/or a microfluidic chamber has been used for analyzing a sample. In this way and in some embodiments, a housing in the form of a cartridge may be reused and unused filter papers and/or microfluidic chambers may be replaced after each use of the device with one sample. in some embodiments, the internal reaction may be performed only once and in series. In some embodiments, the biosensor or any system disclosed herein In some embodiments, the filter paper comprises or consists of one or a combination of materials set forth in Table 2. In some embodiments, the filter paper is of sufficient width and length to adequately coat at least one side or surface of the divet, well, application site or other fluid opening designed to receive a sample of bodily fluid. In some embodiments the thickness of filter paper is from about 1 micron to about 1000 microns. In some embodiments the thickness of filter paper is from about 10 microns to about 900 microns. In some embodiments the thickness of filter paper is from about 10 microns to about 800 microns. In some embodiments the thickness of filter paper is from about 10 microns to about 700 microns. In some embodiments the thickness of filter paper is from about 10 microns to about 600 microns. In some embodiments the thickness of filter paper is from about 10 microns to about 500 microns. In some embodiments the thickness of filter paper is from about 10 microns to about 400 microns. In some embodiments the thickness of filter paper is from about 10 microns to about 300 microns. In some embodiments the thickness of filter paper is from about 10 microns to about 200 microns. In some embodiments the thickness of filter paper is from about 10 microns to about 100 microns. In some embodiments, the thickness of the filter paper is of sufficient thickness to allow both: (i) separation of fluid components from solid components in the sample; and (ii) capillary action of the fluid components from the divet, well, application site or other fluid opening to the at least one microfluidic chamber. Effective capillary action through the filter paper encourages capillary action of the fluid component of the sample throughout the microfluidic chamber and facilitates exposure of the fluid component of the sample to the at least one reaction surface in the microfluidic chamber.

Figure 16:
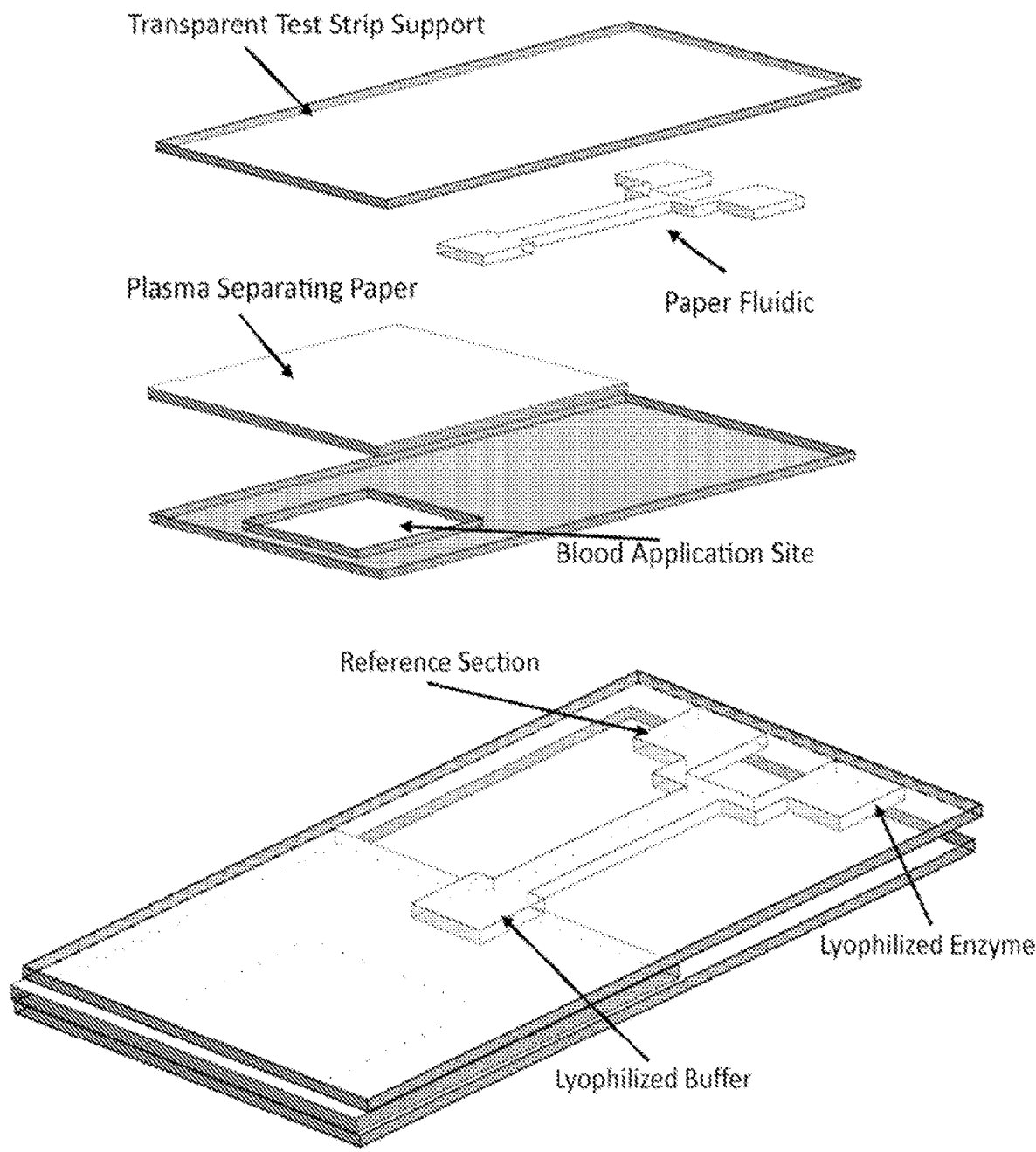
FIG. 16 depicts a paper microfluidic test strip chamber which separates plasma from whole blood, then draws the plasma onto a test strip.

The microfluidic chamber of the present disclosure may include one or a plurality of channels or branches through which a fluid component of a sample may flow upon contact to the channels or branches, wherein one end of the channel is in fluid communication with that portion of the microfluidic chamber most proximate to the interface between the divet, well, application site or other fluid opening and the filter paper, and the other end of the channel may be in fluid communication with one or a plurality of reaction surfaces. In some embodiments, the one or plurality of channels of the microfluidic chambers may be in fluid communication with one or a plurality of experimental reaction surface or a reference surfaces of the microfluidic chamber. In this way a fluid component of one sample applied to the biosensor may used for both a control or reference measurement and an experimental measurement. It is contemplated that in some embodiments the reference surface is free of lyophilized enzyme or functional fragments thereof. The microfluidic chamber may be of any width sufficient for a fluid component of one sample applied to the biosensor to move from the section of the microfluidic chamber most proximate to the filter paper to a portion of the microfluidic chamber that is most proximate to a reaction surface. In some embodiments, the width of a channel is from about 1 to about 5000 microns. In some embodiments, the width of a channel is from about 250 to about 2000 microns. In some embodiments, the width of a channel is from about 250 to about 1800 microns. In some embodiments, the width of a channel is from about 250 to about 1600 microns. In some embodiments, the width of a channel is from about 250 to about 1400 microns. In some embodiments, the width of a channel is from about 250 to about 1200 microns. In some embodiments, the width of a channel is from about 250 to about 1000 microns. In some embodiments, the width of a channel is from about 250 to about 800 microns. In some embodiments, the width of a channel is from about 250 to about 600 microns. In some embodiments, the width of a channel is from about 250 to about 400 microns. In some embodiments, the width of a channel is from about 250 to about 350 microns. In some embodiments, the microfluidic chamber comprises channels with variable widths across the length of each channel. In some embodiments, the channels comprise equal widths or dimensions across each of its sides. In some embodiments, the channels comprise a width equal to the width of the portion of the microfluidic chamber that comprises one or a plurality of reaction surfaces. In such a case, the microfluidic chamber may appear as it does in FIG. 18, whereby a portion of the microfluidic chamber most distal from the portion of the microfluidic chamber most proximate to the filter paper comprises a reaction surface with a width equal to the width of the channel portion. In this case, the microfluidic chamber creates a uniform pattern of channels that appear to create a "Y" or "T" in the case of the depicted embodiment. In some embodiments, the microfluidic chamber is branched but comprises a reaction portion comprising at least one, reaction surface with dimensions greater than the width of the channel. An embodiment of this type is depicted in FIG. 16. In some embodiments, the filter paper comprises one or a combination of: nitrocellulose, glass fiber, cellulose, polyester. In some embodiments the filter paper is free of cellulose, glass fiber, nitrocellulose or polyester. In some embodiments the filter paper is free of polystyrene.

In some embodiments, the microfluidic chamber of the disclosure comprises one or a plurality of reaction surfaces. In some embodiments, if the reaction surface is for collection of experimental data as compared to a surface used as a reference surface, the reaction surface comprises a lyophilized metabolic enzyme disclosed herein and one or a plurality of sugar species. In some embodiments the sugar is trehalose. In some embodiments, the enzyme or functional fragment thereof is lyophilized in the presence of a sugar at a concentration of from about 1 μM to about 500 μM. In some embodiments, the metabolic enzyme or functional fragment thereof is lyophilized in a sugar solution with a concentration from about 1 nM to about 999 mM. In some embodiments, the metabolic enzyme or functional fragment thereof is lyophilized in a sugar solution with a concentration from about 100 nM to about 999 mM. In some embodiments, the metabolic enzyme or functional fragment thereof is lyophilized in a sugar solution with a concentration from about 1000 nM to about 999 mM. In some embodiments, the metabolic enzyme or functional fragment thereof is lyophilized in a sugar solution with a concentration from about 1 μM to about 1 mM. In some embodiments, the metabolic enzyme or functional fragment thereof is lyophilized in a sugar solution with a concentration from about 1 M to about 500 μM. In some embodiments, the metabolic enzyme or functional fragment thereof is lyophilized in a sugar solution with a concentration from about 100 μM to about 500 μM. In some embodiments, the sugar solution comprises sucrose and/or trehalose. In some embodiments, the sugar solution is free of or substantially free of a salt. In some embodiments, the sugar solution comprises a Tris buffer.

The disclosure also relates to a system comprising the biosensors disclosed herein and a computer processor and a display. In some embodiments, the disclosure relates to a computer-implemented method of quantifying amino acid concentration in a sample. The equipment necessary to measure the quantity or intensity of light at a certain wavelength includes a light detector. A light detector can be a microscope, camera, photodiode, CCD or CMOS camera, spectrophotometer or any other device that collects light and can either image light or transmute the light collected to an analog and/or digital signal in the presence or absence of a controller (a device that changes an analog signal to a digital signal). In some embodiments, the system comprises a light detector positioned a distance from the reaction surface sufficient for the light) detector to receive light from the reaction surface after irradiating the surface with a light source. In some embodiments, the light detector is in electrical communication to a circuit that that comprises at least one controller (such as a voltmeter or amperometer) and a display through which a digital signal displayed to a user.

In some embodiments, the disclosure relates to a system comprising a processor that performs a computer-implemented method of quantifying amino acid concentration in a sample of a subject. In some embodiments, the processor is a component of a controller in operable communication with one or a plurality of circuits attached to the light detector. Any algorithm that can receive current or analog signal and create a graph to represent the presence, quantity, intensity or absorbance of light can be used with the biosensor. In some embodiments the system utilizes an algorithm In some embodiments, the system comprises a processor optionally located at or proximate to the location where the reaction is performed. In some embodiments, the processor is accessible by internet connection, operably connected to a computer storage memory that stores subject's concentration values over one or a plurality of time periods.

Algorithms for transmuting a electromagnetic radiation such as light to a quantitative output are generally known but can be found in tSensors and Actuators 8 196 (2014): 156-160. Briefly, measures electromagnetic radia-tion from the colored test zones with the complementarymetal-oxide-semiconductor (CMOS) sensor present in the smart-phone camera. The algorithm processes this information as concentrations of the analytes in each test zone and then the app displays the corresponding value on the smartphone screen. The sensitivity of the colorimetric measurement is based on the accuracy of the camera's CMOS sensor, on the color uniformity of the colorimetric reactions, and on the number of calibration points.

The calibration step collects the calibration curve for a given colorimetric sensor and ambient light conditions. Here, the user inputs (i) sensor type, (ii) target analytes, (iii) units of the concentration, and (iv) number of reference data points to be stored. Once this information is entered, the user captures the images of the calibration points. The smartphone is perpendicularly positioned over the assay at a fixed distance of 5 cm at a given ambient condition. The distance was kept constant in order to match the colorimetric zones with the evaluation area defined by the software. The measurements were performed at ambient temperature (24° C.). Capturing calibration points was achieved within ~1 min, and the calibration was stored in the smartphone memory for later use. The app was cali-brated for measurements in pH, glucose and protein, based on 5, 4 and 5 data points, respectively. The app locates the reference col-ors (100 pixels) and transforms and averages the CMOS data intonon-linear RGB (red, green, blue) values (Rc, Ge, Bc) for each pixel. Subsequently, the app linearizes the RGB values (R1, G1, B1) through the following set of equations:

$$R_l = \left(\frac{0.55 + R_a}{1.055}\right)^{2.4}$$

$$G_l = \left(\frac{0.55 + G_a}{1.055}\right)^{2.4}$$

$$B_l = \left(\frac{0.55 + B_a}{1.055}\right)^{2.4}$$

$R_1$ is the new linear value for red, $G_1$ for green, $B_1$ for blue.

$R_a$ is the raw measured red levels, $G_{a1}$ for green, $B_a$ for blue

Next, linear RGB values are converted to tristimulus values, X, Y, Z by the following relationships:

$$X = 0.1805 B_l + 0.3576 G_l + 0.4124 R_l \qquad (4)$$

$$Y = 0.0722 B_l + 0.7152 G_l + 0.2126 R_l \qquad (5)$$

$$Z = 0.9505 B_l + 0.1192 G_l + 0.0193 R_l \qquad (6)$$

Finally, X, Y, Z tristimulus values are converted into the 2D (x, y) CIE 1931 chromaticity space [17] using:

$$x_j = \frac{X}{X+Y+Z} \quad (7)$$

$$y_j = \frac{Y}{X+Y+Z} \quad (8)$$

After defining the values of xj and yj for the jth concentration data point Cj, the app saves the data points in an internal database to complete the calibration, before returning to the main screen of an mobile phone device.

Fluorescence to Colorimetric Measurements.

The user captures the image of the target assay using exactly the same conditions as for the calibration points (e.g. distance, lighting and temperature), and the app follows the same steps per-formed for the calibration. Briefly, the app converts the CMOS data to RGB, which are linearized, converted to tristimulus values that are finally expressed as measured 2D chromaticity values ($x_m$, $y_m$).

Then, the app computes the final measurement by comparing the target data values with respect to the calibration curve. This is achieved by an interpolation algorithm similar to the nearest neighbor problem in computational geometry. For each point in the calibration curve (j), the shortest distance from the measurement value to the calibration point is determined by:

$$d_k = \sqrt{1(x_k-x)^2+(y_k-Y)^2} \quad (9)$$

where k is an integer and goes from 1 to the number of stored x and y pairs (points) in the calibration curve, i.e. k=j. The algorithm stores two shortest distances to the sample point: dks and dkss, respectively, obtained by Eq. (9). Their x and y values obtained by Eqs. (7) and (8), together with their concentrations C are stored in the software memory. The concentration range, dc, of the nearest two datapoints is calculated as:

$$d_C = |C_{ks} - C_{kss}| \quad (10)$$

where Cks and Ckss are the concentrations of the points corresponding to dks and dkss. The distance in x and y coordinates on the chromaticity space between the two nearest points on the calibration curve to the measurement point is calculated as $$d_{xy} = \sqrt{(x_{ks}-x_{kss})^2+(y_{ks}-y_{kss})^2} \quad (11)$$

The app then calculates the shortest distance from that measurement point to the line between the two calibration points, dsd, using the following expression:

$$d_{sd} = \frac{|(x_{kss}-x_{ks})(y_{ks}-y_m)-(x_{kss}-x_m)(y_{ks}-y_{kss})|}{\sqrt{(x_{kss}-x_{ks})^2+(y_{kss}-y_{ks})^2}} \quad (12)$$

The largest among $d_{ks}$, $d_{kss}$, $d_{sd}$ is determined and stored. The ± variation, v±, is calculated as a ratio or proportion, given the concentration range dc for the largest distance as:

$$v \pm \frac{d_m d_c}{d_{xy}} \quad (13)$$

where $d_m$ is the largest among $d_{ks}$, $d_{kss}$ and $d_{sd}$. By using a similar proportionality approach, the distance from one of the correspond-ing calibration points to the point on the line to where $d_{sd}$ is measured, is computed as the concentration (Cm).

$$C_m = \frac{d_p d_c}{d_{xy}} \quad (14)$$

$$d_p = \sqrt{d_{ks}^2 - d_{sd}^2} \quad (15)$$

The computed concentration, Cm, is located within the concentration range previously calculated, but it varies based on the distance between the measurement point and the calibration curve. After the algorithm ends, the software displays the diagnostic results for the calculated analyte concentrations. The display can be sent to the biosensor display or be integrated within the system as a component of the mobile phone device that collected the colorimetric data.

In some embodiments, the subject of the subject' healthcare provider or the subject may access the internet to communicate with a server linked to the computer storage memory. Subject data reports may be generated and obtained by the subject after initiating a retrieve command through the processor. In some embodiments, the system comprises a computer program-product that performs a function convert current signals generated by a biosensor to concentration of a particular amino acid in a sample. In some embodiments, the disclosure relates to a system including at least one processor and a computer readable memory, said computer readable memory having stored thereon program code for quantifying amino acid concentration in a sample of bodily fluid comprising: means for storing data associated with a subject; means for, responsive to receiving a level of current response from a biosensor or its computer storage memory, presenting a concentration value to a user as part of a user interface. In some embodiments, the user is the subject or healthcare provider of the subject. In some embodiments, the disclosure relates to a system that comprises at least one processor, a program storage, such as memory, for storing program code executable on the processor, and one or more input/output devices and/or interfaces, such as data communication and/or peripheral devices and/or interfaces. In some embodiments, the user device and computer system or systems are communicably connected by a data communication network, such as a Local Area Network (LAN), the Internet, or the like, which may also be connected to a number of other client and/or server computer systems. The user device and client and/or server computer systems may further include appropriate operating system software.

An enzyme selectively acts on one or a plurality of specific amino acids each serving as a substrate. In some embodiments, the enzyme or a functional fragment thereof has a substrate affinity to each of the plurality of specific amino acids with which it comes into contact. The enzyme is operable to catalyze a reaction in each of the plurality of specific amino acids as a substrate so as to form a reaction product. In some embodiments comprising an electrode having a mediator, the mediator is operable, during amino-acid concentration measurement, to carry electrons between the reaction product and the measuring electrode. Further, the amino-acid biosensor is designed to apply a voltage between a measuring electrode and a counter electrode at a measurement point in such a manner that, in an analytical curve representing a relationship between an applied voltage and a current value in a specific concentration for each of the plurality of specific amino acids, the applied voltage is a voltage allowing the variety of the current values for the amino acids in the same concentration and at the same applied voltage. In some embodiments, the biosensor or the system is free of an electrode or electrically conductive support at the reaction surface.

In some embodiments, a biosensor or system disclosed herein is used in conjunction with the following:
1. a power source in electrical connection with the electrodes and capable of supplying an electrical potential difference between the electrodes sufficient to cause diffusion limited electro-oxidation of the reduced form of the mediator at the surface of the working electrode; and
2. at least one meter, (such as a voltmeter and/or amperometer) in electrical connection with a circuit and capable of measuring the diffusion limited current produced by oxidation of the reduced form of the mediator with the above-stated electrical potential difference is applied.

The meter will normally be adapted to apply an algorithm to the current measurement, whereby an analyte concentration is provided and visually displayed. Improvements in such power source, meter, and biosensor system are the subject of commonly assigned U.S. Pat. No. 4,963,814, issued Oct. 16, 1990; U.S. Pat. No. 4,999,632, issued Mar. 12, 1991; U.S. Pat. No. 4,999,582, issued Mar. 12, 1991; U.S. Pat. No. 5,243,516, issued Sep. 7, 1993; U.S. Pat. No. 5,352,351, issued Oct. 4, 1994; U.S. Pat. No. 5,366,609, issued Nov. 22, 1994; White et al, U.S. Pat. No. 5,405,511, issued Apr. 11, 1995; and White et al., U.S. Pat. No. 5,438,271, issued Aug. 1, 1995, the disclosures of which are hereby expressly incorporated by reference.

Many fluid samples may be analyzed. For example, human and non-human body fluids such as whole blood, plasma, sera, lymph, bile, urine, semen, cerebrospinal fluid, spinal fluid, lacrimal fluid and stool specimens as well as other biological fluids readily apparent to one skilled in the art may be measured. Fluid preparations of tissues from humans and non-human animals can also be assayed, along with foods, fermentation products and environmental substances, which potentially contain environmental contaminants. In some embodiments, human serum is assayed with this disclosure.

After reaction is complete, a power source (e.g., a battery) applies a current through a circuit in electrical communication with a light detector. In some embodiments, the power source When the potential difference is applied, the amount of oxidized form of the mediator at the auxiliary electrode and the potential difference must be sufficient to cause diffusion-limited electro-oxidation of the reduced form of the at least one mediator at the surface of the working electrode. In some embodiments, the working electrode comprises a hydrogel disclosed herein. A current measuring meter (not shown) measures the diffusion-limited current generated by the oxidation of the reduced form of the mediator at the surface of the working electrode. The measured current may be accurately correlated to the concentration of one or more amino acids in sample when the following requirements are satisfied:
1. The rate of oxidation of the reduced form of the mediator is governed by the rate of diffusion of the reduced form of the mediator to the surface of the working electrode.
2. The current produced is limited by the oxidation of reduced form of the mediator at the surface of the working electrode.

To manufacture biosensor a roll of metallized film is fed through guide rolls into an ablation/washing and drying station. A laser system capable of ablating bottom plate element 14 is known to those of ordinary skill in the art. Non-limiting examples of which include excimer lasers, with the pattern of ablation controlled by mirrors, lenses, and masks. A non-limiting example of such a system is the LPX-300 or LPX-200 both commercially available from LPKF Laser Electronic GmbH, of Garbsen, Germany.

In the laser ablator, the metallic layer of the metallized film is ablated in a pre-determined pattern; to form a ribbon of isolated electrode sets. The metallized film is further ablated, after the isolated electrode sets are formed to create recesses positioned adjacent the electrochemical area. The ribbon is then passed through more guide rolls, with a tension loop and through an optional inspection camera. The camera is used for quality control in order to check for defects.

Reagent is compounded and applied in a liquid form to the center of the electrochemical area at a dispensing and drying station. Reagent application techniques are well known to one of ordinary skill in the art as described in U.S. Pat. No. 5,762,770, the disclosure of which is expressly incorporated herein by reference. It is appreciated that reagent may be applied to array in a liquid or other form and dried or semi-dried onto the center of the electrochemical area in accordance with this disclosure.

In addition, a roll or top plate element material is fed into an assembly station along with a roll of spacer material. Liners on either side of the spacer material are removed in that station and the top plate element or surface scaffold is applied to one side of the spacer material to form a top plate element/spacer subassembly. The top plate element/spacer subassembly is slit into the appropriate width for a row of biosensors. Next, a new release liner is added to the side of the spacer material opposite the cover and the subassembly is wound into a roll.

The ribbon of the reagent-coated bottom plate element is unwound and fed into a sensor assembly station along with the top plate element/spacer subassembly. The liner is removed from the spacer and the subassembly is placed on bottom plate element to cover reagent. Next, the assembled material is cut to form individual biosensors, which are sorted and packed into vials, each closed with a stopper, to give packaged sensor test strips.

Although ablating recesses is described herein, it is appreciated that the method of forming recesses in bottom plate element is also not limited. For example, the recesses may be formed by etching (e.g., using photoligographic methods) or otherwise removing a portion of the surface of top plate element. The nearest electrode edge is approximately 10 (mi to 500 (im from the recess, preferably 100 (im to 400 (im from the recess, most preferably 200 (im to 300 (im from the recess. Biosensors that are formed with recesses in accordance with this disclosure yield a reagent profile with generally uniform thickness of chemistry. A generally uniform thickness of chemistry allows for more accurate sample analysis.

The processes and products described above include a disposable biosensor, especially for use in diagnostic devices.

Electrode

In some embodiments, the biosensor, system or test strip disclosed herein comprise one or more electrodes. In some embodiments, the biosensor, system or test strip disclosed herein do not comprise one or more electrodes at or near a reaction surface. In some embodiments, the biosensor, system or test strip disclosed herein do not comprise one or more electrodes. In some embodiments, the one or more electrodes transmit current variation generated by the reaction between the metabolic enzyme or functional fragment thereof and its one or more substrates. In some embodiments, the one or more substrates are one or more amino acids. In some embodiments, the electrodes comprise metal. In some embodiments, the electrodes comprise a carbon scaffold upon which a metal is deposited. In some embodiments, the electrodes comprise a carbon scaffold of carbon nanotubes.

Electrode structures which are suitable for the present disclosure and methods for the production of such structures have already been suggested in biosensor technology for other purposes. In this regard, reference is made to U.S. Pat. No. 6,645,359 and its content is incorporated herein by reference in its entirety. Electrodes or Electrically conductive tracks are created or isolated on first surface. Tracks represent the electrodes of biosensor. As used herein, the phrase "electrode set" is a set of at least two electrodes, for example 2 to 200, or 3 to 20, electrodes. These electrodes may, for example, be a working (or measuring) electrode and an auxiliary electrode. In some embodiments, tracks cooperate to form an interdigitated electrode array positioned within the periphery of recesses and leads that extend from array and between recesses toward end.

Tracks are constructed from electrically conductive materials. Non-limiting examples of electrically-conductive materials include aluminum, carbon (such as graphite), cobalt, copper, gallium, gold, indium, iridium, iron, lead, magnesium, mercury (as an amalgam), nickel, niobium, osmium, palladium, platinum, rhenium, rhodium, selenium, silicon (such as highly doped polycrystalline silicon), silver, tantalum, tin, titanium, tungsten, uranium, vanadium, zinc, zirconium, mixtures thereof, and alloys, oxides, or metallic compounds of these elements. Preferably, tracks include gold, platinum, palladium, iridium, or alloys of these metals, since such noble metals and their alloys are unreactive in biological systems. In some embodiments, the track is a working electrode made of silver and/or silver chloride, and track is an auxiliary electrode that is also made of silver and/or silver chloride and is substantially the same size as the working electrode.

Tracks are isolated from the rest of the electrically conductive surface by laser ablation. Techniques for forming electrodes on a surface using laser ablation are known. Techniques for forming electrodes on a surface using laser ablation are known. See, for example, U.S. patent application Ser. No. 09/411,940, filed Oct. 4, 1999, and entitled "LASER DEFINED FEATURES FOR PATTERNED LAMINATES AND ELECTRODE", the disclosure of which is expressly incorporated herein by reference. Tracks are preferably created by removing the electrically conductive material from an area extending around the electrodes. Therefore, tracks are isolated from the rest of the electrically-conductive material on a surface by a gap having a width of about 5 (im to about 500 (im, preferably the gap has a width of about 100 (im to about 200 (im. Alternatively, it is appreciated that tracks may be created by laser ablation alone on bottom substrate. Further, tracks may be laminated, screen-printed, or formed by photolithography.

Multi-electrode arrangements are also possible in accordance with this disclosure. For example, it is contemplated that a biosensor may be formed that includes an additional electrically conductive track. In a three-electrode arrangement such as the arrangement depicted in FIG. 4, the first track is a working electrode, the second is a counter electrode, and the third electrode is a reference electrode. It is also appreciated that an alternative three-electrode arrangement is possible where tracks are working electrodes and a third electrode is provided as an auxiliary or reference electrode. It is appreciated that the number of tracks, as well as the spacing between tracks in array may vary in accordance with this disclosure and that a number of arrays may be formed as will be appreciated by one of skill in the art. in some embodiments, the electrodes are embedded on or attached to a solid support, such as a test strip comprising a plastic and/or paper material.

Micro-electrode arrays are structures generally having two electrodes of very small dimensions, typically with each electrode having a common element and electrode elements or micro-electrodes. If "interdigitated" the arrays are arranged in an alternating, finger-like fashion (See, e.g., U.S. Pat. No. 5,670,031). These are a sub-class of micro-electrodes in general. Interdigitated arrays of micro-electrodes, or ID As, can exhibit desired performance characteristics; for example, due to their small dimensions, ID As can exhibit excellent signal to noise ratios.

Interdigitated arrays have been disposed on non-flexible substrates such as silicon or glass substrates, using integrated circuit photolithography methods. ID As have been used on non-flexible substrates because ID As have been considered to offer superior performance properties when used at very small dimensions, e.g., with feature dimensions in the 1-3 micrometer range. At such small dimensions, the surface structure of a substrate (e.g., the flatness or roughness) becomes significant in the performance of the IDA. Because non-flexible substrates, especially silicon, can be processed to an exceptionally smooth, flat, surface, these have been used with ID As. In some embodiments, the at least one electrode is a component of any IDA disclosed herein.

Filter Paper

One embodiment of the disclosure relates to a method of using a biosensor disclosed herein for determining the concentration of amino acid in a sample. In some embodiments, the biosensor comprises a filter paper to separate blood cells from plasma after applying the blood sample to the filter paper. In some embodiments, the biosensor comprises filter paper but does not comprise an electrode connected to or attached to the reaction surface. In such embodiments, the reaction product will be a reduction product similar to the redux reaction described below and the way to measure the amount of reduction product will be performed through measurement of light. One of ordinary skill in the art may know how to measure the amount of light emitted from a reaction surface comprising a reduction product, but, without an electrode, the operator may use absorbance measurements through use of a spectrophotometer or fluorescence measurements after excitation of the reduction product at the reaction surface. While an electrode may be present in such embodiments as part of a circuit for the light detector, the electrode may be wholly absent or not physically connected or positioned at or near the reaction surface.

TABLE 2

Description of Plasma Separation Choices

1. Vivid Membrane ® by Pall Corporation
   a. Separation by size exclusion and capillary action
   b. Poly(ethyl sulfone) membrane
2. Blood Separators by GE
   a. Fusion 5

TABLE 2-continued

Description of Plasma Separation Choices b. GF/DVA - bound glass fiber filter
 c. LF1 - bound glass fiber
 d. MF1 - bound glass fiber
 e. VF2 - Bound glass fiber
3. A solid surface comprising one or a pluirality of hemagglutination antbodies to immobilize red blood cells and separate plasma from whole blood.

Hydrogel

In some embodiments, the biosensor is free of a hydrogel. In some embodiments, if a hydrogel is present, the hydrogel may be a cross-linked polymeric material that swells in aqueous fluid, such as water or plasma, but does not dissolve. It is envisioned that the hydrogel may be capable of absorbing at least about 1 to about 10 times, and in one embodiment at least about 100 times, its own weight of a liquid. The hydrogel chosen for use in the biosensor should depend directly on the method of functionalization. It is envisioned that the hydrogel may be biocompatible. In some embodiments, the hydrogel comprises sodium alginate. In some embodiments, the hydrogel comprises from about 0.1% to about 5% alginate weight/volume. In some embodiments, the hydrogel comprises from about 0.1% to about 4% alginate weight/volume. In some embodiments, the hydrogel comprises from about 0.1% to about 3% alginate weight/volume. In some embodiments, the hydrogel comprises from about 0.1% to about 2% alginate weight/volume. In some embodiments, the hydrogel comprises from about 0.1% to about 1% alginate weight/volume. In some embodiments, the hydrogel comprises from about 0.1% to about 1% alginate weight/volume. In some embodiments, the hydrogel comprises from about 0.2% to about 1% alginate weight/volume. In some embodiments, the hydrogel comprises sodium alginate. In some embodiments, the hydrogel comprises from about 0.3% to about 1% alginate weight/volume. In some embodiments, the hydrogel comprises from about 0.4% to about 1% alginate weight/volume In some embodiments, the hydrogel comprises from about 0.5% to about 1% alginate weight/volume. In some embodiments, the hydrogel comprises from about 0.6% to about 1% alginate weight/volume. In some embodiments, the hydrogel comprises from about 0.7% to about 1% alginate weight/volume. In some embodiments, the hydrogel comprises from about 0.8% to about 1% alginate weight/volume. In some embodiments, the hydrogel comprises from about 0.9% to about 1% alginate weight/volume. In some embodiments, the hydrogel comprises from about 1.0% to about 3.0% alginate weight/volume. In some embodiments, the hydrogel comprises from about 1.0% to about 2.0% alginate weight/volume. In some embodiments, the hydrogel comprises from about 1.0% to about 1.5% alginate weight/volume. In some embodiments, the hydrogel comprises about 1%, about 2%, or about 3% alginate weight/volume. In some embodiments, the hydrogel comprises sodium alginate. The aliginate may be any individual polymer of alginate used in bulk form or respective pattern of monomers, G blocks, M blocks, and/or GM blocks. In some embodiments the aliginate comprises the formula:

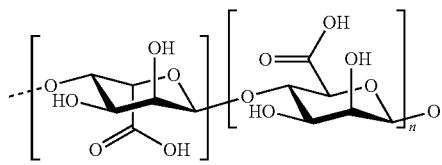

where m and n are any positive integer. In some embodiments, the hydrogel may be polymerized from acrylic monomers. The acrylic monomer may be one or a combination of the following: acrylamido-glycolic acid, acrylamido-methyl-propa-ne-sulfonic acid, acrylamido-ethylphosphate, diethyl-aminoethyl-acrylamide-, trimethyl-amino-propyl-methacrylamide, N-octylacrylamide, N-phenyl-acrylamide and tert-butyl-acrylamide. In embodiments in which the device contains a cross-linking agent, exemplary cross-linking agents may be N,N'-methylene-bis-acrylamide, N,N'-methylene-bismethacrylamide, diallyltatardiamide and poly(ethylene glycol)dimethacrylate. Examples of suitable hydrogels may also include silicon wafers, borosilicate glass substrates, 2-hydroxyethyl methacrylate (HEMA), N-Isopropylacrylamide (NIPAAm), and polyethylene glycol (PEG).

The hydrogel may include any number of molecules. For example, the hydrogel may include a polymerized monomer or hydrogel a cross linking agent and optionally a chemical or UV-light activated inducer agent. Examples of such monomers or dimers include vinyl acetates, vinyl pyrrolidones, vinyl ethers, olefins, styrenes, vinyl chlorides, ethylenes, acrylates, methacrylates, nitriles, acrylamides, maleates, epoxies, epoxides, lactones, ethylene oxides, ethylene glycols, ethyloxazolines, amino acids, saccharides, proteins, anhydrides, amides, carbonates, phenylene oxides, acetals, sulfones, phenylene sulfides, esters, fluoropolymers, imides, amide-imides, etherimides, ionomers, aryletherketones, amines, phenols, acids, benzenes, cinnamates, azoles, silanes, chlorides, and epoxides, N,N'-methylenebisacrylamide, methylenebismethacrylamide ethyleneglycol-dimethacrylate, N,N'-methylenebisacrylamide, polyethyleneglycoldiacrylate (PEGDA), polyethyleneglycoldimethacrylate (PEGDMA), polyethyleneglycoldiacrylate (PEGDA), polyethyleneglycoldimethacrylate (PEGDMA), poly(vinyliden fluoride) (PVdF) based polymer, a polyacrylonitrile (PAN) based polymer, a polymethylmethacrylate (PMMA) based polymer, a polyvinyl chloride (PVC) based polymer, and a mixture of the poly(vinyliden fluoride) (PVdF) based polymer, polyacrylonitrile (PAN) based polymer, polymethylmethacrylate (PMMA) based polymer, and polyvinyl chloride (PVC) based polymer, and mixtures of any two or more thereof. IN some, embodiments, the hydrogel does not comprise 3,4-dihydroxybenzoic acid (3, 4-DHB) or an analog thereof.

Cross linking agents and optionally the chemical or UV-light activated inducer agent may include N,N'-methylenebisacrylamide, methylenebismethacrylamide ethyleneglycol-dimethacrylate and agent N,N'-methylenebisacrylamide. Irgacure 2959 (Ciba); 2,2-dimethoxy-2-phenylacetophenone, 2-methoxy-2-phenylacetone, benzyl-dimethyl-ketal, ammonium sulfate, benzophenone, ethyl benzoin ether, isopropyl benzoin ether, .alpha.-methyl benzoin ether, benzoin phenyl ether, 2,2-diethoxy acetophenone; 1,1-dichloro acetophenone, 2-hydroxy-2-methyl-1-phenylpropane 1-on, 1-hydroxy cyclohexyl phenyl ketone, antraquinone, 2-ethyl antraquinone, 2-chloroantraquinone, tioxantone, isopropyltioxantone, chloro tioxantone, 2,2-chlorobenzophenone, benzyl benzoate, and benzoyl benzoate, TEMED, and ammonium persulfate (APS). In some embodiments, hydrogel comprises a protein, peptide, glycoprotein, proteoglycans, glycosaminoglycans, and/or carbohydrate that is secreted by cells into the extracellular environment. In some embodiments, the secreted protein, peptide, glycoprotein, proteoglycans, glycosamainoglycans, and/or carbohydrate, or structures composed thereof.

In some embodiments, the disclosure relates to a coated biosensor device comprising at least one reaction surface, wherein the biosensor comprises a metabolic enzyme or functional fragment thereof covalently bound or immobilized to the reaction surface, wherein the metabolic enzyme shares at least 70% sequence identify to SEQ ID NO:1 or SEQ ID NO:2 or shares at least 70% sequence identify to functional fragments of SEQ ID NO:1 or SEQ ID NO:2. In some embodiments, the disclosure relates to a coated biosensor device comprising at least one coating, wherein the biosensor comprises a metabolic enzyme or functional fragment thereof covalently bound or immobilized within the coating, wherein the coating comprises a composition comprising a sugar, and a bulking agent, such as a glycine/Tris buffer. In some embodiments, the disclosure relates to a biosensor device comprising at least one surface, wherein the biosensor surface comprises a metabolic enzyme or a functional fragment thereof covalently bound or immobilized to the surface, wherein the surface comprises a composition comprising a hydrogel matrix, said matrix comprising any one or combination of: poly(ethylene glycol) dimethylacrylate with a molecular weight of about 1000 (PEGDMA-1000), 2-hydroxy-2 methyl propiophenone (HMPP) and at least one acrylate, wherein the acrylate is selected from the group consisting of methacrylic acid (MAA) and methyl methacrylate (MMA), wherein the ratio of PEGDMA:Acrylate is from about 10:90 mol % to about 70:30 mol %, and said HMPP is at a concentration of from about 0.2% to about 0.6%, total weight. In some embodiments, the disclosure relates to a biosensor device comprising at least one surface, wherein the biosensor surface comprises a metabolic enzyme or a functional fragment thereof covalently bound or immobilized to the surface, wherein the surface comprises a sugar, and a bulking agent, and a metabolic enzyme or a functional fragment thereof. In some embodiments, the components of the reaction surface are lyophilized or desiccated onto the reaction surface prior to use. In some embodiments, the reaction surface is free of or substantially free of a salt, whether the enzyme or functional fragment is desiccated or in lyophilized form.

In some embodiments, the reaction surface comprises a hydrogel. The hydrogel solution prior to curing comprises trehalose or an analog thereof at a concentration from about 1 nM to about 999 mM. In some embodiments, the hydrogel solution prior to curing comprises trehalose at a concentration from about 1 nM to about 10 mM. In some embodiments, the hydrogel solution prior to curing comprises trehalose at a concentration from about 1 M to about 9 mM. In some embodiments, the hydrogel solution prior to curing comprises trehalose at a concentration from about 1 µM to about 8 mM. In some embodiments, the hydrogel solution prior to curing comprises trehalose at a concentration from about 1 µM to about 7 mM. In some embodiments, the hydrogel solution prior to curing comprises trehalose at a concentration from about 1 M to about 6 mM. In some embodiments, the hydrogel solution prior to curing comprises trehalose at a concentration from about 1 µM to about 5 mM. In some embodiments, the hydrogel solution prior to curing comprises trehalose at a concentration from about 1 µM to about 4 mM. In some embodiments, the hydrogel solution prior to curing comprises trehalose at a concentration from about 1 µM to about 3 mM. In some embodiments, the hydrogel solution prior to curing comprises trehalose at a concentration from about 1 µM to about 2 mM. In some embodiments, the hydrogel solution prior to curing comprises trehalose at a concentration from about 1 µM to about 1 mM. In some embodiments, the hydrogel solution prior to curing comprises trehalose at a concentration from about 10 µM to about 1 mM. In some embodiments, the hydrogel solution prior to curing-comprises trehalose at a concentration from about 100 µM to about 1 mM. In some embodiments, the hydrogel solution prior to curing comprises trehalose at a concentration from about 200 µM to about 1 mM. In some embodiments, the hydrogel solution prior to curing comprises trehalose at a concentration from about 300 µM to about 1 mM. In some embodiments, the hydrogel solution prior to curing comprises trehalose at a concentration from about 400, M to about 1 mM. In some embodiments, the hydrogel solution prior to curing comprises trehalose at a concentration from about 500 µM to about 1 mM. In some embodiments, the hydrogel solution prior to curing comprises trehalose at a concentration from about 600 µM to about 1 mM. In some embodiments, the hydrogel solution prior to curing comprises trehalose at a concentration from about 700 µM to about 1 mM. In some embodiments, the hydrogel solution prior to curing comprises trehalose at a concentration from about 800 µM to about 1 mM. In some embodiments, the hydrogel solution (prior to contacting with the electrode) comprises trehalose at a concentration from about 900 µM to about 1 mM.

The disclosure relates to a biosensor or system described herein that has a sensitivity from about 125 micromolar to about 1000 micromolar of amino acid in a sample. In some embodiments, the biosensor or system described herein has a reduced degree of error. In some embodiments, the sensitivity of the biosensor or system has an error of no more than about 10% of the calculated value of amino acid concentration. In some embodiments, the sensitivity of the biosensor or system has an error of no more than about 9% of the calculated value of amino acid concentration. In some embodiments, the sensitivity of the biosensor or system has an error of no more than about 8% of the calculated value of amino acid concentration. In some embodiments, the sensitivity of the biosensor or system has an error of no more than about 7% of the calculated value of amino acid concentration. In some embodiments, the sensitivity of the biosensor or system has an error of no more than about 6% of the calculated value of amino acid concentration. In some embodiments, the sensitivity of the biosensor or system has an error of no more than about 5% of the calculated value of amino acid concentration and is capable of differentiating concentrations of 1000, 500, 250 and 125 micromolar amino acid in unprocessed, whole blood samples.

In some embodiments, the biosensor housing has a capacity for an unfolded swatch or piece of filter paper.

Mediators

In some embodiments, the biosensor is free of an electron mediator. in some embodiments, the biosensor is free of at least one or a combination of electron mediators selected from: thionine, o-phenylenediamine, methylene blue, and toluidine blue.

In some embodiments, the reaction surface comprises an electron mediator. The mediator facilitates transport of electrons to the electrode. In some embodiments, the mediator is attached to the electrode. In some embodiments, the mediator is embedded in the hydrogel. In some embodiments, the hydrogel comprises one or a combination of mediators chosen from: mediator 2-Acrylamido-2-methylpropanel, sulfonic acid IV, ethacrylic acid, 2-Sulfoethyl methacrylate, and 2-Propene-1-sulfonic acid. U.S. Pat. No. 4,254,222 (1981; Owen) and U.S. Pat. No. 4,351,899 (1982; Owen) disclose an assay for .beta.-hydroxybutyrate where 3-hydroxybutyrate is oxidized to acetoacetate by .beta.-hydroxybutyrate dehydrogenase (HBDH) in the presence of nicotinamide adenine dinucleotide (NAD.sup.+). The reduced NADH produced from this reaction, in turn, reacts with a tetrazolium dye to form a colored formazan compound. The degree and intensity of the color transition correlate's to the concentration of .beta.-hydroxybutyrate in the sample solutions. U.S. Pat. No. 5,510,245 (1996; Magers) and U.S. Pat. No. 5,326,697 (1994; Magers) disclose an improved calorimetric method that utilizes a reductive pathway based on lipoamide dehydrogenase (LADH) and a thiol-sensitive indicator dye such as Ellman's reagent. It was found the NADH, produced from the .beta.-hydroxybutyrate dehydrogenase enzyme reaction, can interact with lipoamide dehydrogenase (LADH) and D,L-lipoamide to form a thiol compound (6,8-dimercaptooctamide). The 6,8-dimercaptooctamide then interacts with a thiol-responsive indicator dye such as Ellman's reagent. Upon reaction, the thiol-sensitive indicator dye undergoes a detectable color transition that can be used to measure the level of 3-hydrobutyrate in the blood sample. The colorimetric methods for 3-hydrobutyrate suffer the disadvantages of poor stability, interference from co-existing species such as ascorbate, glutathione etc. in the blood, and insufficient sensitivity and accuracy. NAD- and NADP-dependent enzymes are of great interest insofar as many have substrates of clinical value, such as glucose, D-3-hydroxybutyrate, lactate, ethanol, and cholesterol. Amperometric electrodes for detection of these substrates and other analytes can be designed by incorporating this class of enzymes and establishing electrical communication with the electrode via the mediated oxidation of the reduced co factors NADH and NAD PH. NAD- and NADP-dependent enzymes are generally intracellular oxidoreductases. The oxidoreductases are further classified according to the identity of the donor group of a substrate upon which they act. The category of oxidoreductases is also broken down according to the type of acceptor utilized by the enzyme. The enzymes of relevance have NAD+ or NADP+ as acceptors. These enzymes generally possess sulphydryl groups within their active sites and hence can be irreversibly inhibited by thiol-reactive reagents such as iodoacetate. An irreversible inhibitor forms a stable compound, often through the formation of a covalent bond with a particular amino acid residue that is essential for enzymatic activity. U.S. Pat. No. 6,541,216 (2003; Wilsey et al.) discloses a biosensor and method to test blood ketone bodies using an amperometric meter. The test strip has a reagent that is reactive with β-hydroxybutyrate in sample solution to generate an electrical output signal, which is related to the concentration of .beta.-hydroxybutyrate in the sample solution. The reagent in this method includes ferricyanide salt as mediator, .beta.-hydroxybutyrate dehydrogenase as the first enzyme operative to catalyze the oxidation of .beta.-hydroxybutyrate, NAD+ as a cofactor corresponding to the first enzyme, and diaphorase as the second enzyme operative to catalyze the oxidation of a reduction form of the cofactor (NADH). The oxidation form of the mediator will accept the electron from the second enzyme and generates an electrical signal at the electrode surface, which is related to the concentration level of .beta.-hydroxybutyrate. U.S. Pat. No. 6,736,957 (2004; Forrow et al.) and a research paper (N. J. Forrow et.al, Biosensors & Bioelectronics, 2005, 20, 1617-1625) disclose an amperometric biosensor for .beta.-hydroxybutyrate based on the discovery of NAD+ and NADP- mediator compounds that do not bind irreversibly to thiol groups in the active sites of intracellular dehydrogenase enzymes. These mediator compounds such as 1,10-phenanthroline quinone (1,10-PQ), which is used as an electron mediator in their electrochemical measurement system, can increase the stability and reliability response in amperometric electrodes constructed from NAD- and NADP-dependent enzyme. The dry reagents include 1,10-phenanthroline quinone (1,10-PQ), .beta.-hydroxybutyrate dehydrogenase and NAD+ as the cofactor. This sensor shows reliable and sensitive response to the concentration levels of .beta.-hydroxybutyrate in blood samples. Meldola's Blue (MB) was also studied as a mediator in the system, but it was found that MB did not work well in their electrochemical test system due to the inhibition of .beta.-hydroxybutyrate dehydrogenase enzyme activity by MB and poor long term stability of the test strips.

The dehydrogenase enzymes such as, for example, glucose dehydrogenase, D-3-hydroxybutyrate dehydrogenase (HBDH), and lactate dehydrogenase et.al are known to be common dehydrogenases for construction of biosensors. As disclosed by Forrow et al., there are certain mediators that are considered efficient mediators for NADH but are irreversible enzyme inhibitors such as Meldola's blue, 4-methyl-1,2-benzoquinone (4-MBQ), 1-methoxy phenazine methosulphate (1-Meo-PMS) and 2,6-dichloroindophenol (DCIP), which cause losing the activity of enzymes, insensitive response and poor stability in sensors containing dehydrogenase enzymes. In some embodiments, the biosensor, system, or test strip comprise any one or more of the mediators disclosed herein. In some embodiments, the mediator is chosen from one or a combination of: ortho-quinones, para-quinones and quinoneimines in their basic structural elements. The representative examples of the quinoid structure type include, but are not limited to, benzo-.alpha.-phenazoxonium chloride, Meldola's Blue (MB), 3,4-methyl-1,2-benzoquinone, 1-methoxy phenazine methosulphate, 1,10-phenanthroline quinone (1,10-PQ). in some embodiments, the at least one mediator is selected from one or a mixture of the following compounds:

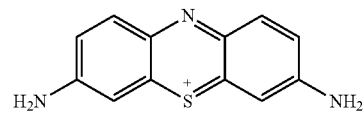

Thionine

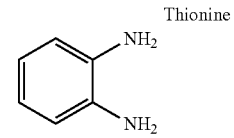

o-phenylenediamine

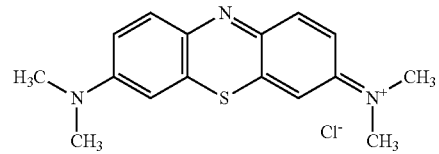

Methyfene Ste

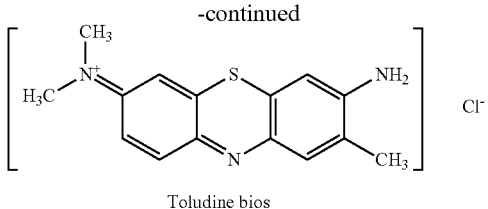

Toludine bios

Cofactors/Reduction Agent
  NAD+
  FAD+
  Ascorbic Acid
  Flavin mononucleotide
  Flavin adenine dinucleotide
  Coenzyme F420
  Glutathione
  Heme
  Pyrroloquinoline quinone
Enzymes Any one or more metabolic enzymes may be chosen to be used with the present disclosure. Metabolic enzymes that can be used individually or in combination with the biosensor, system or test strip disclosed herein include: any bacterial clone of phenylalanine dehydrogenase, histidine ammonia lyase, mistidine oxidase, pheylalanine lyase, glutamate dehydrogenase. In some embodiments the enzyme is chosen from any one or combination of enzymes disclosed below or their respective functional fragments that are at least 70%, 80%, 85%, 90%, 95%, 96%, 97%, 98%, or 99% homolgous to the full-length enzyme or nucleic acid encoding such enzyme.

TABLE 3

| Organism | Enzyme | GenBank Accession | SEQ ID NO |
| --- | --- | --- | --- |
| Thermoactinomyces intermedius | phenylalanine dehydrogenase | D00631.1 | 2 |
| Solanum lycopersicum | phenylalanine ammonia- | XM004246602 | 7 |
| Thermoactinomyces intermedius | phenylalanine dehydrogenase | DD421709.1 | 8 |
| Caenorhabditis remanei | phenylalanine | XM_003102740 | 9 |
| Arabidopsis thaliana | glutamate dehydrogenase | NMJ.21822.3 | 10 |
| Spirochaeta africana | Hisitidine ammonia lyase | NC_017098.1 | |

SEQ ID NO: 2

```
MRDVFEMMDRYGHEQVIFCRHPQTGLKAIIALHNTTAGPALGGC

RMIPYASTDEALEDVLRLSKGMTYKCSLADVDFGGGKMVIIGDPKKDKSP

ELFRVIGRFVGGLNGRFYTGTDMGTNPEDFVHAARESKSFAGLPKSYGGK

GDTSIPTALGVFHGMRATARFLWGTDQLKGRVVAIQGVGKVGERLLQLLV

EVGAYCKIADIDSVRCEQLKEKYGDKVQLVDVNRIHKESCDIFSPCAKGG

VVNDDTIDEFRCLAIVGSANNQLVEDRHGALLQKRSICYAPDYLVNAGGL

IQVADELEGFHEERVLAKTEAIYDMVLDIFHRAKNENITTCEAADRIVME

RLKKLTDIRRILLEDPRNSARR
```

SEQ ID NO: 7

```
MASSIVQNGHVNGEAMDLCKKSINVNDPLNWEMAAESLRGSHLD

EVKKMVDEFRKPIVKLGGETLTVAQVASIANVDNKSNGVKVELSESARAG

VKASSDWVMDSMGKGTDSYGVTTGFGATSHRRTKNGGALQKELIRFLNAG

VFGNGTESSHTLPHSATRAAMLVRINTLLQGYSGIRFEILEAITKLINSN

ITPCLPLRGTITASGDLVPLSYIAGLLTGRPNSKAVGPNGEKLNAEEAFR

VAGVTSGFFELQPKEGLALVNGTAVGSGMASMVLFESNILAVMSEVLSAI

FAEVMNGKPEFTDYLTHKLKHHPGQIEAAAIMEHILDGSSYVKAAQKLHE

MDPLQKPKQDRYALRTSPQWLGPQIEVIRAATKMIEREINSVNDNPLIDV

SRNKALHGGNFQGTPIGVSMDNTRLALASIGKLMFAQFSELVNDYYNNGL

PSNLTAGRNPSLDYGLKGAEIAMASYCSELQFLANPVTNHVQSAEQHNQD

VNSLGLISARKTAEAVDILKLMSSTYLVALCQAIDLRHLEENLRSAVKNT

VSQVAKRTLTMGANGELHPARFCEKELLRVVDREYVFAYADDPCSSTYPL

MQKLRQVLVDHAMKNGESEKNVNSSIFQKIVAFEDELKAVLPKEVESARA

VVESGNPAIPNRITECRSYPLYRLVRQELGSELLTGEKVRSPGEEIDKVF

TAMCNGQIIDPLLECLKSWNGAPLPIC
```

SEQ ID NO: 8

```
atgcgcgacg tgtttgaaat gatggaccgc tatggccacg agcaggtcat tttttgccgt    61
catccgcaaa ccggtctcaa agcgatcatc gccttgcata atacaaccgc ggggccggct   121
ttgggtggat gccgcatgat cccgtatgct tcgacggacg aagccttgga ggatgttttg   181
cggttgtcca aaggcatgac ctataaatgc agtctggcgg atgtggactt ggcggggga    241
aaaatggtta tcatcggcga tccgaaaaaa gataaatcgc cggagttgtt tcgcgtgatc   301
ggccgttttg tgggcgggtt aaacggccgt ttctataccg gaaccgacat gggaaccaat   361
ccggaagatt ttgtccatgc cgccagggaa tcgaaatctt ttgccggatt gccgaaatcg   421
tacggcggaa aggggacac atccattccc accgcgctcg gggtgtttca cggaatgcgg    481
gccaccgccc ggtttttatg ggggacggat cagctgaaag gcgtgtggt tgccatccaa    541
ggagtcggca aggtgggaga gcgcttgttg cagcttttgg tcgaagtggg ggcttactgc   601
aaaattgccg acatcgattc ggtgcgatgc gaacagctga agaaaagta tggcgacaag    661
gtccaattgg tggatgtgaa ccggattcac aaggagagtt gcgatatttt ctcgccttgc   721
gccaaaggcg gcgtggtcaa tgatgacacc attgacgagt ccgttgcct ggccattgtc    781
ggatccgcca caaccaact ggtggaagac cggcatgggg cactgcttca aaaacggagc    841
atttgttatg cacccgatta tctggtgaat gccggcgggc tgattcaagt ggctgatgaa   901
ctggaaggct tccatgaaga gagtgctc gccaaaaccg aagcgattta tgacatggtc     961
ctggatattt ttcaccgggc gaaaaatgag aatattacca cttgtgaggc agcggaccgg  1021
atcgtgatgg agcgtttgaa aaagttaacc gatattcgcc ggatcttgtt ggaggatccc  1081
cgcaacagcg caaggaggta a
```

SEQ ID NO: 9

MDFKAKLLAEMAKKRKAVSGLEVKEGGAKFVRGADLESKRTQEY

EAKQEELAIKKRKADDEILQESTSRAKIVPEVPEAEFDEKTPMPEIHARLRQRGQPIL

LFGESELSVRKRLHQLEIEQPELNEGWENEMQTAMKFIGKEMDKAVVEGTADSATRHD

IALPQGYEEDNWKSIEHASTLLGVGDEMKRDCDIILSICRYILARWARDLNDRPLDVK

KTAQGMHEAAHHKQTTMHLKSLMTSMEKYNVNNDIRHHLAKICRLLVIERNYLEANNA

YMEMAIGNAPWPVGVTRSGIHQRPGSAKAYVSNIAHVLNDETQRKYIQAFKRLMTKLQ

EYFPTDPSKSVEFVKKSV

SEQ ID NO: 10

MNALAATNRNFKLAARLLGLDSKLEKSLLIPFREIKVECTIPKD

DGTLASFVGFRVQHDNARGPMKGGIRYHPEVDPDEVNALAQLMTWKTAVAKIPYGGAK

GGIGCDPSKLSISELERLTRVFTQKIHDLIGIHTDVPAPDMGTGPQTMAWILDEYSKF

HGYSPAVVTGKPIDLGGSLGRDAATGRGVMFGTEALLNEHGKTISGQRFVIQGFGNVG

SWAAKLISEKGGKIVAVSDITGAIKNKDGIDIPALLKHTKEHRGVKGFDGADPIDPNS

ILVEDCDILVPAALGGVINRENANEIKAKFIIEAANHPTDPDADEILSKKGVVILPDI

YANSGGVTVSYFEWVQNIQGFMWEEEKVNDELKTYMTRSFKDLKEMCKTHSCDLRMGA

FTLGVNRVAQATILRGWGA

There are many forms of amino acid measuring devices; one common type is represented by hand-held electronic meters which receive blood samples via enzyme-based test strips. In using these systems, the patient may for example lances a finger or alternate body site to obtain a blood sample, the strip is inserted into a test strip opening in the meter housing, the sample is applied to the test strip, microfluidic chamber, and/or filter paper and, after exposure to light from a light source, the reaction products of the redox reaction (particularly the reduction agent) can be detected by the known wavelength of light being emitted at the reaction surface. Electronics in a light detector positioned at a distance form the reaction surface sufficient to obtain electromagnetic radiation from the reduction reagent or reaction products convert a light measurement in the biosensor to a current. A normalized reading of a current can be changed to a digital signal corresponding to an amino acid concentration value.

Solid supports of the disclosure may be solid state but are a flexible substrate. According to the disclosure, the filter paper and/or microfluidic chamber disposed proximal to, e.g., on, a flexible substrate. To act as a flexible substrate, a material must be flexible and also insulating, and is typically relatively thin. The substrate should be capable of adhering components of an IDA, or additional components of a sensor, to its surface. Such thin, insulative, flexible substrates are known in the art of flexible circuits and flex circuit photolithography. "Flexible substrates" according to the present disclosure can be contrasted to non-flexible substrates used in integrated circuit (IC) photolithography but not in flexible circuit photolithography. Examples of non-flexible substrates used in IC photolithography include silicon, aluminum oxide, and other ceramics. These non-flexible substrates are chosen to be processable to a very flat surface. Typical flexible substrates for use in the disclosure are constructed of thin plastic materials, e.g., polyester, especially high temperature polyester materials; polyethylene naphthalate (PEN); and polyimide, or mixtures of two or more of these. Polyimides are available commercially, for example under the trade name Kapton®, from I.E. duPont de Nemours and Company of Wilmington, Del. (duPont). Polyethylene naphthalate is commercially available as Kaladex®, also from duPont. A particularly preferred flexible substrate is 7 mil thick Kaladex® film.

The filter paper and/or microfluidic chamber can, for example, be used in conjunction with an electrochemical sensor used in combination with known electrochemical detection methods. Electrochemical detection methods operate on principles of electricity and chemistry, or electrochemistry, e.g., on principles of relating the magnitude of a current flowing through a substance, the resistance of a substance, or a voltage across the substance given a known current, to the presence of a chemical species within the substance. Some of these methods can be referred to as potentiometric, chronoamperometric, or impedance, depending on how they are practiced, e.g., whether potential difference or electric current is controlled or measured. The methods and sensors, including sensors of the disclosure, can measure current flowing through a substance due directly or indirectly to the presence of a particular chemical compound (e.g., an analyte or an electroactive compound), such as a compound within blood, serum, interstitial fluid, or another bodily fluid, e.g., to identify levels of amino acids, blood urea, nitrogen, cholesterol, lactate, and the like. Adaptations of some electrochemical methods and electrochemical sensors, and features of their construction, electronics, and electrochemical operations, are described, for example, in U.S. Pat. Nos. 5,698,083, 5,670,031, 5,128,015, and 4,999,582, each of which is incorporated herein by reference.

Methods

The disclosure relates to a method of diagnosing or prognosing a clinical outcome of a subject with PKU, maple syrup urine disease, or hyperammonemia, comprising contacting a sensor, system, or test strip disclosed herein with a sample of bodily fluid from the subject, and quantifying a level of amino acid in the sample; and comparing the level of amino acid in the sample to a threshold value of what is considered normal level of amino acid level in the bodily fluid. In some embodiments, the method relates to a method of diagnosing or prognosing a clinical outcome of a subject suspected of having or having been previously diagnosed with at least one aminoacidopathy. In some embodiments, the method relates to a method of diagnosing or prognosing a clinical outcome of a subject suspected of having or having been previously diagnosed with at least one PKU, maple syrup urine disease, or hyperammonemia.

The disclosure relates to a method of detecting the presence or absence of amino acids in bodily fluids, the disclosure also relates to a method of quantifying the concentration of amino acids in bodily fluids of a subject. Quantification can occur at the point-of-care due to the quick enzymatic reaction readout caused by the generation of a detectable current within a circuit after exposure of a sample to a reaction surface. In some embodiments, the device or system described herein may be utilized to detect if a person has abnormally high levels of amino acids in the blood, after which an electronic message or display may then be provided to the user of the device or system or activated on a display by one or more processors that remotely or directly access one or more storage memories comprising one or more concentration values of the subject. In some embodiments, multiple concentration values may be obtained either simultaneously or in series, compared or analyzed by the one or more processors operably connected to the device or system disclosed herein. In some embodiments, multiple concentration values of a subject over a time period may be compared or analyzed by the one or more processors operably connected to the device or system disclosed herein, after which a message comprising the concentration value and/or threshold values are displayed. In some embodiments, the message optionally includes a signal indicating that the subject should seek medical treatment or alter diet to control amino acid levels in the subject.

The present disclosure relates generally to definition and/or use of concentration values that characterize a subject's modification of behavior, in some embodiments, the concentration values corresponding to the concentration of amino acids in a sample of bodily fluid may characterize the degree to which a subject is advised to modify a diet or seek medical treatment.

In some embodiments, the present disclosure provides biosensors or test strips for use in diagnostic assays. In some embodiments the biosensor and/or test strips are provided as part of a diagnostic or detection kit. In certain embodiments, kits for use in accordance with the present disclosure may include one or more reference samples; instructions (e.g., for processing samples, for performing tests, for interpreting results, etc.); media; and/or other reagents necessary for performing tests.

The disclosure provides a test strip comprising: a solid support and a microfluidic chamber, wherein the microfluidic chamber comprises at least one or a plurality of reaction surfaces. In some embodiments, the solid support is a slide optionally coated with a polymer. In some embodiments, the solid support is coated with a polymer. In some embodiments, the polymer is polyacrylamide. In some embodiments, the solid support is a material chosen from: polystyrene (TCPS), glass, quarts, quartz glass, poly(ethylene terephthalate) (PET), polyethylene, polyvinyl difluoride (PVDF), polydimethylsiloxane (PDMS), polytetrafluoroethylene (PTFE), polymethylmethacrylate (PMMA), polycarbonate, polyolefin, ethylene vinyl acetate, polypropylene, polysulfone, polytetrafluoroethylene, silicones, poly(meth)acrylic acid, polyamides, polyvinyl chloride, polyvinylphenol, and copolymers and mixtures thereof. In some embodiments, the test strip is a paper product. In some embodiments, solid support is free of an electrode.

According to some embodiments, the disclosure provides a software component or other non-transitory computer program product that is encoded on a computer-readable storage medium, and which optionally includes instructions (such as a programmed script or the like) that, when executed, cause operations related to the calculation of amino acid concentration values. In some embodiments, the computer program product is encoded on a computer-readable storage medium that, when executed: quantifies one or more amino acid concentration values; normalizes the one or more amino acid concentration values over a control set of data; creates an amino acid profile or signature of a subject; and displays the profile or signature to a user of the computer program product. In some embodiments, the computer program product is encoded on a computer-readable storage medium that, when executed: calculates one or more amino acid concentration values, normalizes the one or more amino acid concentration values, and creates an amino acid signature, wherein the computer program product optionally displays the amino acid signature and/or one or more amino acid concentration values on a display operated by a user. In some embodiments, the disclosure relates to a non-transitory computer program product encoded on a computer-readable storage medium comprising instructions for: quantifying one or more amino acid concentration values; and displaying the one or more amino acid concentration values to a user of the computer program product. The computer product product may be integrated any system disclosed herein and may be digitally accessible through direct attachment to the circuit disclosed herein or by the internet on a processor accessible to the internet. In some embodiments, the software is stored on a memory accessible through the internet, wherein the memory and/or software is on a mobile phone.

In some embodiments, the step of calculating one or more amino acid concentration values comprises quantifying an average and standard deviation of counts on replicate trials of contacting the device or test strip with one or more samples of bodily fluids. In some embodiments, the step of normalizing one or more amino acid concentration values comprises quantifying an average and standard deviation of counts on replicate trials of contacting the device or test strip with one or more samples of bodily fluids.

In some embodiments, the one or more test strips, filter papers or microfluidic chambers are attached to a solid phase support. In some embodiments, a solid phase support comprises any solid or semi-solid surface. In some embodiments, a solid phase comprises any traditional laboratory material for growing or maintaining cells in culture including petri dishes, beakers, flasks, test tubes, microtitre plates, and/or culture slides. In some embodiments, a solid phase comprises a glass slide, a plastic slide, a paper test strip, or combination thereof.

In some embodiments, the one or more test strips, filter papers or microfluidic chambers are attached to discrete addressable sites on a solid phase support. In some embodiments, a solid phase comprises polyamides, polyesters, polystyrene, polypropylene, polyacrylates, polyvinyl compounds (e.g., polyvinylchloride), polycarbonate, polytetrafluoroethylene (PTFE), nitrocellulose, cotton, polyglycolic acid (PGA), cellulose, dextran, gelatin, glass, fluoropolymers, fluorinated ethylene propylene, polyvinylidene, polydimethylsiloxane, polystyrene, silicon substrates (such as fused silica, polysilicon, or single silicon crystals) or combinations thereof.

In some embodiments, the disclosure relates to a catalogue of medical records relating to a subject comprising test results from the one or plurality of methods described herein. Such catalogue, in some embodiments, being stored on a computer readable medium being accessible remotely through a wireless internet connection.

As described above, certain embodiments of the present disclosure may be used to distinguish between samples of bodily fluid obtained from a subject who does or is suspected of having an aminoacidopathy and a subject who does not have a metabolic disease. This system is potentially useful, for example, when testing blood samples of a subject to determine whether disease is present. Diagnosing a patient using one or more amino acid concentration values would include, for example, comparing one or more amino acid concentration values of a sample from a subject with the measured reference values or threshold values of a subject.

The disclosure relates to a method of adhering any one or plurality of enzymes or functional fragments thereof to a reaction surface by desiccating or lyophilizing a sample of an enzyme or functional fragment thereof in the presence of a sugar and, optionally in the presence of a bulking agent.

In some embodiments in which the biosensor comprises a paper-based detection system, the method of detecting concentration of an amnio acid within a sample doe not comprises a step of centrifugation.

In some embodiments, the methods of the disclosure do not require any operator action except for the application of a sample to the application site of the biosensor.

Kits

In some embodiments, kits in accordance with the present disclosure may be used to quantify amino acid concentration is samples of bodily fluid. In some embodiments, kits in accordance with the present disclosure may be used to interrogate an addressable surface with a light emitter, such that light from the light emitter excites a reaction surface. In some embodiments, the kits are used to isolate plasma from whole blood samples and prepare the plasma samples for interrogation or excitation of light emitted from a light source. in some embodiments, the kit comprises a container that comprises one or a plurality of UV light emitters or a light-emitting diode (LED). In some embodiments, the kit comprises one or a plurality of test strips that comprise one or a plurality of immobilized metabolic enzymes or functional fragments thereof. Any array, system, or component thereof disclosed may be arranged in a kit either individually or in combination with any other array, system, or component thereof. The disclosure provides a kit to perform any of the methods described herein. In some embodiments, the kit comprises at least one container comprising one or a plurality of polypeptides comprising a polypeptide sequence associated with a test strip or filter paper. In some embodiments, the kit comprises at least one container comprising any of the polypeptides or functional fragments described herein. In some embodiments, the polypeptides are in solution (such as a buffer with adequate pH and/or other necessary additive to minimize degradation of the polypeptides during prolonged storage). In some embodiments, the polypeptide are lyophilized or desiccated for the purposes of resuspension after prolonged storage. In some embodiments, the kit comprises: at least one container comprising one or a plurality of polypeptides comprising a polypeptide sequence associated with or coated in sugar molecules (or functional fragments thereof); and a reaction surface upon which the one or plurality of polypeptides may be affixed.

In some embodiments, the kit optionally comprises instructions to perform any or all steps of any method described herein. In some embodiments, the kit comprises an array or system described herein and instructions for implementing one or a plurality of steps using a computer program product disclosed herein. It is understood that one or a plurality of the steps from any of the methods described herein can be performed by accessing a computer program product encoded on computer storage medium directly through one or more, computer processors or remotely through one or more computer processors via an internet connection or other virtual connection to the one or more computer processors. In some embodiments, the kit comprises a computer-program product described herein or requisite information to access a computer processor comprising the computer program product encoded on computer storage medium remotely. In some embodiments, the computer program product, when executed by a user, collects imaging data and quantitates the level of light at a certain wavelength that corresponds with the amount of amino acid in a sample exposed to the reaction surface. In some embodiments, the quantities of light that correspond to the amount of amino acid in a sample exposed to the reaction surface are normalized to the one or more normalized light values, and the processor generates one or more probability scores that indicates a concentration level or range of concentration levels of amino acid in a sample as compared to a control value. In some embodiments, the kit provides for a system that generates a signature or one or more amino acid concentrations to provide a real-time indication of the amount of amino acid in the blood at a particular time period. In some embodiments, the kit provides for a system that provides a user a profile of the user's amino acid levels in a sample, such as whole blood. The system may display the profile, and/or displays any one or more of the normalized light values, raw data or signatures, amino acid concentration profiles over a time period to a user.

In some embodiments, the kit comprises a computer program product encoded on a computer-readable storage medium that comprises instructions for performing any of the steps of the methods described herein. In some embodiments, the disclosure relates to a kit comprising instructions for providing one or more quantity or amount of light at certain wavelengths. In some embodiments, the kit comprises a filter that is positioned between the reaction surface and the light detector which that light being light from the reaction surface travels to the filter and only one or a range of wavelengths corresponding to the amount of amino acid in a sample at the reaction surface is calculated by a processor. In some embodiments, the kit comprises a computer program product encoded on a computer storage medium that when, executed on one or a plurality of computer processors, quantifies a normalized light value, determines an amino acid signature or amino acid profile of s subject, and/or displays the amino acid signature, normalized light value, amino acid concentration, and/or any combination thereof. In some embodiments, the kit comprises a computer program product encoded on a computer storage medium that, when executed by one or a plurality of computer processors, correlates the absorbance of light at a certain wavelength with the level of amino acid in a sample exposed to the reaction surface. In some embodiments, the kit comprises a processor that quantifies absorbance levels and/or fluorescence levels of one or more samples and determines a signature based at least partially upon the absorbance levels and/or the fluorescence levels. In some embodiments, kit comprises one or more cameras upon which the biosensor may be adapted. In some embodiments, the kit provides a biosensor configured for use with a cellular phone or camera embedded within a cellular phone. In some embodiments, the kit provides a camera to act as a light detector such that image data of the reaction surface is collected and analyzed for the amount of light collected at a particular wavelength that corresponds to the amount of amino acid in a sample.

In some embodiments, instructions for accessing the computer storage medium, quantifying amino acid concentration values, normalizing amino acid concentration values, determining an amino acid signature of sample (such as whole blood), and/or any combination of steps thereof. In some embodiments, the computer-readable storage medium comprises instructions for performing any of the methods described herein. In some embodiments, the kit comprises an array or system disclosed herein and a computer program product encoded on computer storage medium that, when executed, performs any of the method steps disclosed herein individually or in combination and provides instructions for performing any of the same steps. In some embodiments, the instructions comprise an instructions on how to reconstitute or immobilize any one or plurality of polypeptides disclosed herein to a reaction surface such as a filter paper.

The disclosure further provides for a kit comprising one or a plurality of containers that comprise one or a plurality of the metabolic enzymes or fragments thereof disclosed herein. In some embodiments, the kit comprises vial or other container into which a blood sample may be collected and temporarily stored before exposure to the reaction surface. In some embodiments, the kit comprises: a biosensor disclosed herein, a filter paper or reaction surface disclosed herein, and a computer program product disclosed herein optionally comprising instructions to perform any one or more steps of any method disclosed herein. In some embodiments, the kit comprises a solid support free of any one individual pair of polypeptides disclosed herein. In some embodiments, the kit comprises a device such as a lance or needle to draw blood from a subject.

The kit may contain two or more containers, packs, or dispensers together with instructions for preparation and/or usage of the biosensor. In some embodiments, the kit comprises at least one container comprising biosensor described herein and a second container comprising a one or a plurality of filter papers disclosed herein. In some embodiments, the kit comprises a container comprising any polypeptide disclosed herein in solution or lyophilized or dried and accompanied by a rehydration mixture. In some embodiments, the polypeptides and rehydration mixture may be in one or more additional containers.

Compositions included in the kit may be supplied in containers of any sort such that the shelf-life of the different components are preserved, and are not adsorbed or altered by the materials of the container. For example, suitable containers include simple bottles that may be fabricated from glass, organic polymers, such as polycarbonate, polystyrene, polypropylene, polyethylene, ceramic, metal or any other material typically employed to hold reagents or food; envelopes, that may consist of foil-lined interiors, such as aluminum or an alloy. Other containers include test tubes, vials, flasks, and syringes. The containers may have two compartments that are separated by a readily removable membrane that upon removal permits the components of the compositions to mix. Removable membranes may be glass, plastic, rubber, or other inert material.

Kits may also be supplied with instructional materials. Instructions may be printed on paper or other substrates, and/or may be supplied as an electronic-readable medium, such as a flash drive, CD-ROM, DVD-ROM, zip disc, videotape, audio tape, or other readable memory storage device. Detailed instructions may not be physically associated with the kit; instead, a user may be directed to an internet web site specified by the manufacturer or distributor of the kit, or supplied as electronic mail.

Figure 10:
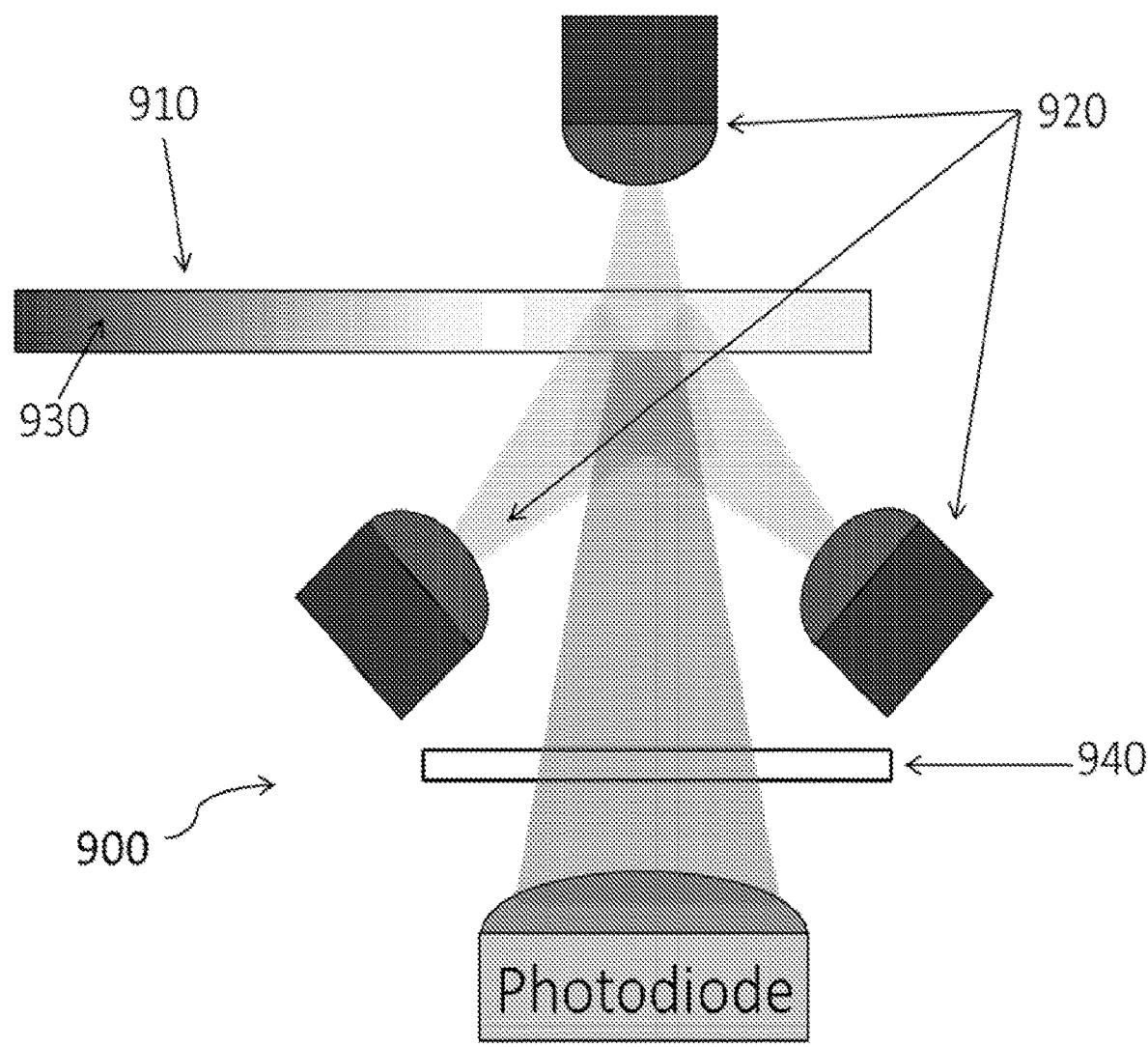
FIG. 10 depicts a compact design to use UV light and a photodiode to detect NADH on filter paper.

FIG. 10 depicts a schematic of a biosensor 900 in accordance with the present disclosure. Biosensor 900 includes a plasma separating filter 910 coated at one end with a lyophilized metabolic enzyme or a functional fragment thereof 930. Light emitted from three light sources (in this case LEDs) 920 emit light onto the reaction surface where redux reaction products such as NAD for NADH+. When excited, the NADH+ emits a blue light which is sent through a bandpass filter 940 and then captured by a photodiode. Specialty filter paper can separation plasma from blood cells through capillary action. The enzyme and cofactor will be lyophilized on this paper. The reaction will proceed producing NADH which fluoresces at an excitation of 340-370 nm and an emission of ~450 nm. The generated 450 nm light passes through a bandpass filter which prevents other wavelengths of light from passing through. The 450 nm light passing through the bandpass filter then strikes a photodiode which generates an electrical current proportional to the concentration of NADH present which can be correlated to phenylalanine or other biochemical factor present.

Any and all journal articles, patent applications, issued patents, or other cited references disclosed herein are incorporated by reference in their respective entireties.

EXAMPLES

Example 1: Phenylalanine Processing Enzyme

Two biosensors are fabricated from either phenylalanine dehydrogenase cloned from *Geobacillus thermoglucosidasius* or phenylalanine ammonia lyase.

Example 2: Phenylalanine Separating Membrane

Figure 8:
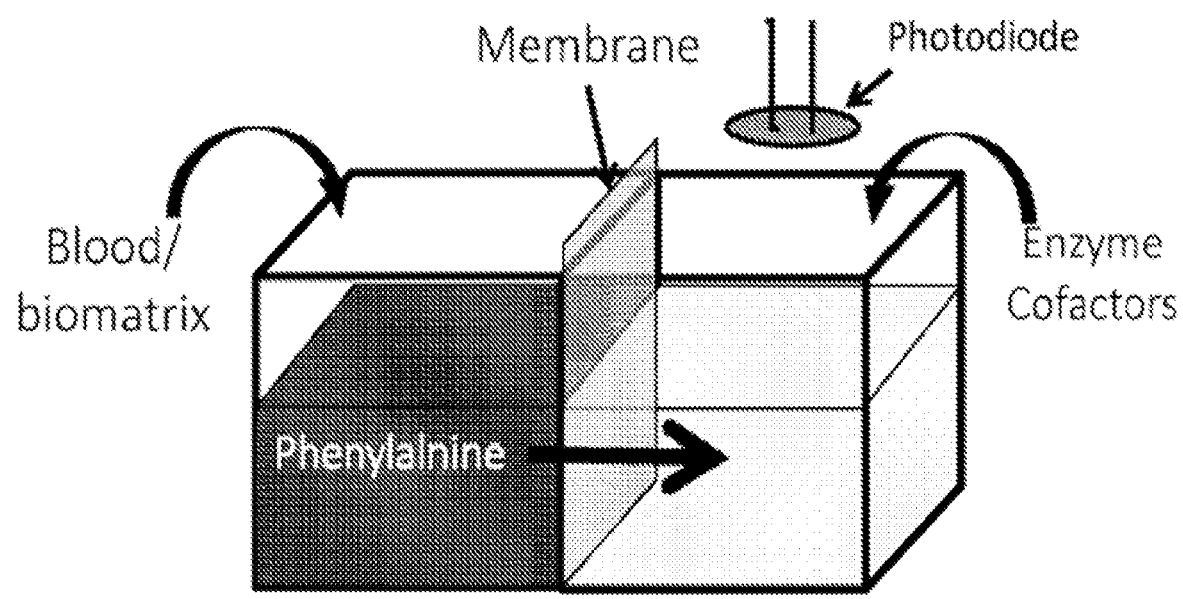
FIG. 8 depicts a bisected well for the extraction of phenylalanine and it's detection by a photodiode.
Figure 9:
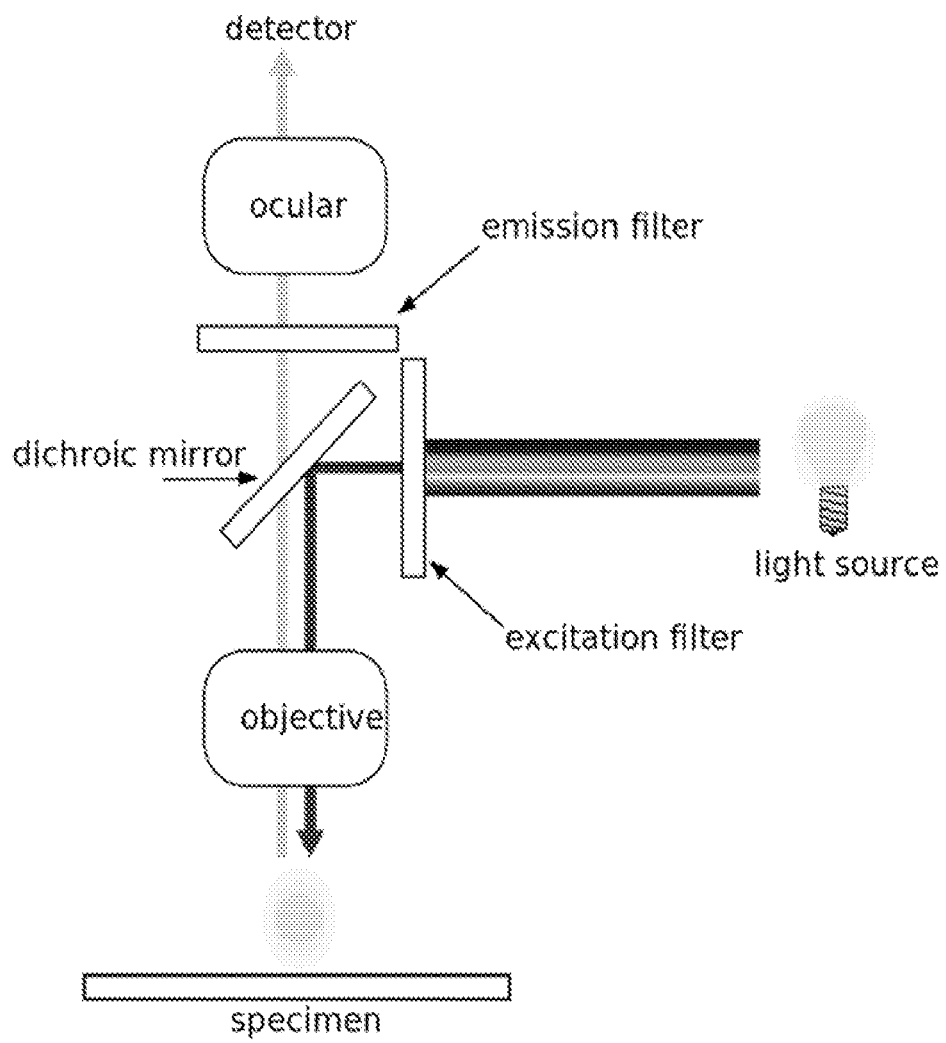
FIG. 9 depicts an example of a traditional fluorescence microscope.

To separate out interfering small molecules, proteins and cells a filter membrane is utilized which allows for permeation of phenylalanine but prevents interfering species. This membrane can comprised of poly(ether sulfone), Nafion, polytetrafluoroethylene, cellulose acetate, cellulose, polypropylene, cellulose ether or other dialysis or filter membranes. An embodiment is depicted in FIG. 8. The presented design shall allow for rapid, effective point-of-care detection of phenylalanine. The sensor depicted utilizes a phenylalanine processing enzyme including but not limited to phenylalanine dehydrogenase as well as thermophilic derivations of the enzyme. The sensor shall consist of a well, microfluidic or other fabrication subdivided by a membrane filter. One division would contain the enzyme and any necessary cofactor or other reagents. The biomatrix analyzed, which includes but is not limited to blood, urine, saliva, feces or other serum, would be added to the other division. Phenylalanine would pass through the membrane rapidly while other interfering molecules, proteins or cells would be inhibited from passing through the membrane. As the phenylalanine is processed by the sensing enzyme the resulting products of the enzyme reaction shall be measured using a photodiode, photoresistor or other electromagnetic measurement device.

Example 3: Sensor Housing Fabrication

To fabricate the sensor housing a subdivided well shall be produced from injection molding, 3D printing, soft lithography or stereolithography of silicone polymers, polystyrene, acrylonitrile butadiene styrene or other polymers.

Example 4: Sensor Fabrication

To fabricate the sensor a well, channel or fluidic was prepared. The system was subdivided by a filter membrane such as cellulose acetate. On the reaction side of the well, a solution of 40 units of phenylalanine dehydrogenase and 5 mM of ~-nicotinamide adenine dinucleotide hydrate was added. On the analyte side of the well, the phenylalanine containing blood was added. The phenylalanine was allowed to diffuse across the membrane to the side containing the enzyme for at least 10 minutes. The solution containing the enzyme was then probed to measure the concentration of the reduced form of the ~-nicotinamide adenine dinucleotide hydrate by measuring the absorbance or transmittance of 340 nm wavelength light using a photodiode. The volume of both the reaction solution and the analyte can vary between 10 and 100 microliters.

Example 5: Phenylalanine Dehydrogenase Cloning

To address shortcomings of long day-long wait times for diagnosing PKU, a sensor analogous to a blood glucometer would greatly improve detection time and quality of life for the patient. Development of this type of sensor for ammonia and various amino acids is being currently undergoing. The first metabolite to be investigated will be phenylalanine. High serum levels of phenylalanine are generally associated with the aminoacidopathy, phenylketonuria. To determine concentrations of phenylalanine an enzyme based amperornetric electrochemical sensor will be employed. The specific enzyme that will be examined is phenylalanine dehydrogenase.

Figure 18:
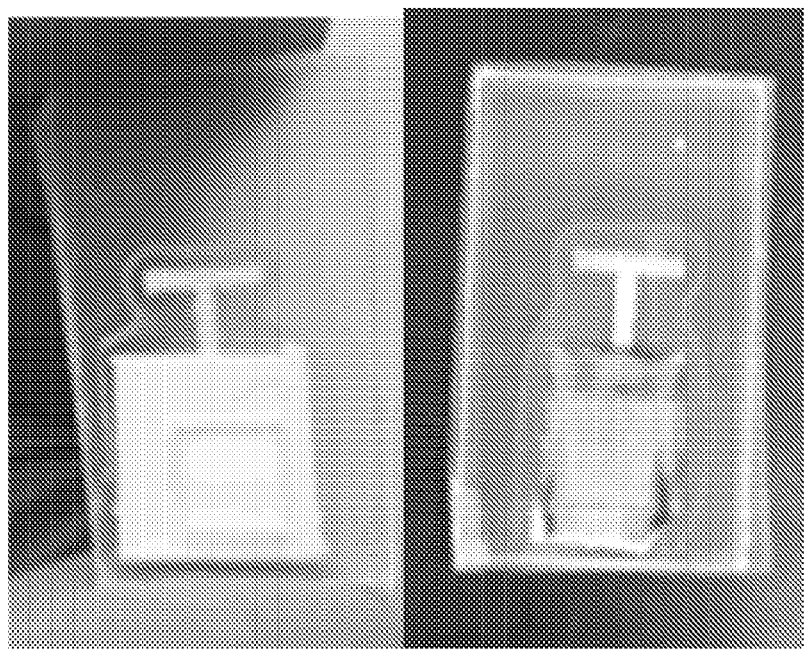
FIG. 18 depicts a test strip in a chamber with and without the application of blood.
Figure 19A:
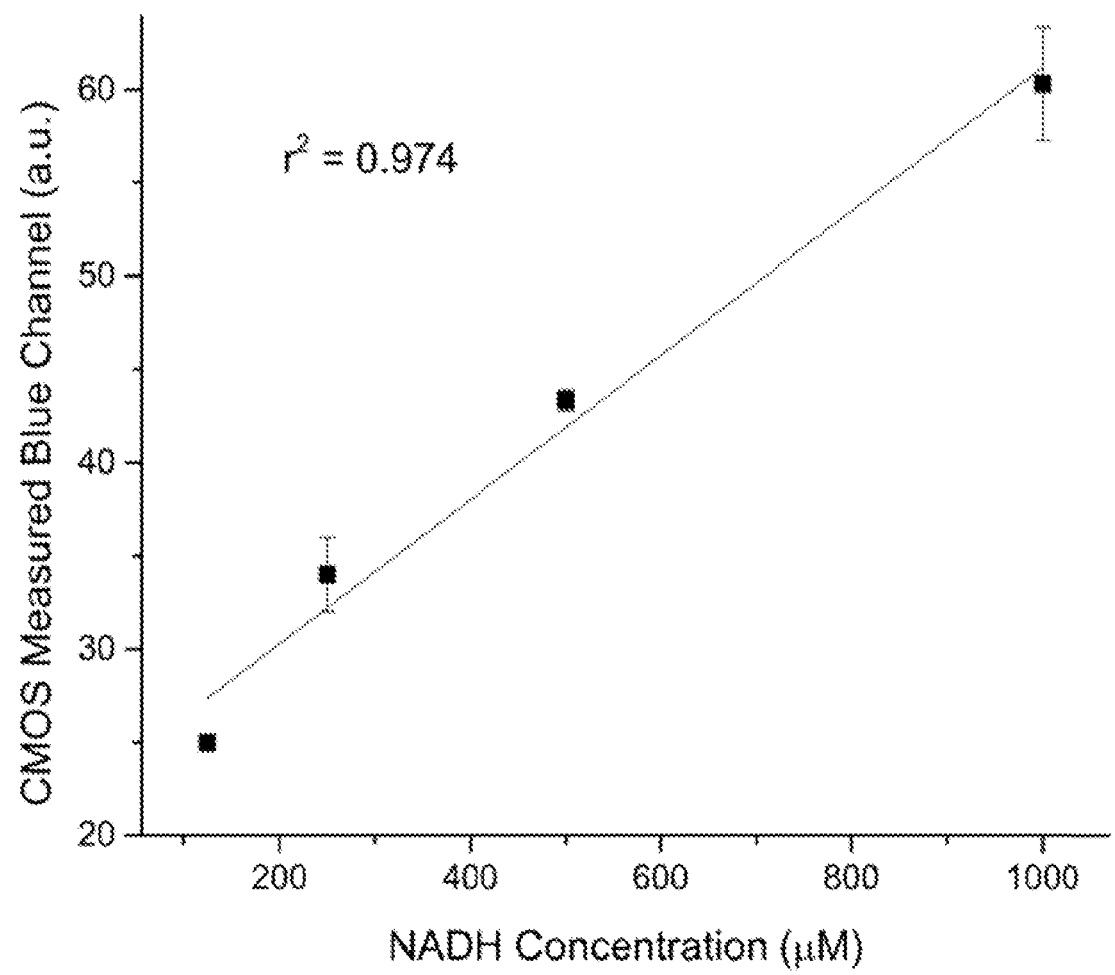
FIGS. 19A, and 19B depict CMOS and linearized blue channel measurements of increasing NADH concentration.

The gene coding for the phenylalanine dehydrogenase (PheDH) from *Geobacillus thermoglucosidasius* C56-YS93 was cloned and the protein will be expressed using a bacterial cloning/expression system as shown in FIGS. 18 and 19. Three different versions of the enzyme were generated: N-His tag, C-His tag and No tag by using custom designed primers and different expression vectors (pET24a and pET28a).

Briefly, DNA from *Geobacillus thermoglucosidasius* was isolated and the PheDH gene was amplified by PCR using the following primers:

```
Foward
                                        (SEQ ID NO: 3)
5'-TGTGCTAGCATGAATACCGTTACCAATCAGTGGAAAGC-3'

Reverse
                                        (SEQ ID NO: 4)
5'-CTCGAGTCATTACCGGCGGATATCCCACTTCG-3'
```

Forward primer introduces a NheI restriction site and the reverse primer introduces two extra STOP codons along with a XhoI restriction site. Amplification product size was determined by agarose electrophoresis. The DNA sequence cloned from the isolated genome sequence encodes the following amino acid sequence that is the PheDH protein from *Geobacillus thermoglucosidasius*:

(SEQ ID NO: 1)
```
MNTVTNQWKAVDIFTQIRDHEQVVFCNDKNTGLKAIIAIHDTTL
GPALGGCRMYPYATVEDALFDVLRLSKGMTYKCLAADVDFGGGKAVIIG
DPHKDKTPELFRAFGQFVESLNGRFYTGTDMGTTPDDFVHAMKETNCIV
GVPEEYGGSGDSSVPTALGVIYGIQATNKVIWGSDELHGKTYAIQGLGK
VGRKVAERLLKEGADLYVCDIHPTAIEAIVSYAKKLGANVKVVQGTEIY
RTDADIFVPCAFGNVVNDNTIHVLKVKAIVGSANNQLLDVRHGQLLKEK
GILYAPDYIVNAGGLIQVADELYGLNKERVLQKTKAIYSTLLHIYSRAE
ADHITTIEAANRFCEERLQQRSRRNDFFTHRKQPKWDIRR.
```

PCR product was purified directly from the PCR reaction mixture using the Qiagen® kit using the manufacturer's instructions and subsequently used for subcloning onto pCR-BluntII TOPO vector using the Invitrogen kit with manufacturer's instructions. Subcloning reaction was used to transform TOP10 chemically competent cells (Invitrogen®) and positive colonies were selected by resistance to the antibiotic kanamycin. The plasmids presents in the kanamycin resistant colonies were isolated using the Qiagen® kit using the manufacturer's instructions and screened for the presence of the insert in the plasmid by restriction enzymes (NheI and XhoI). Positive colonies were identified by the presence of a band corresponding to the PCR product size after digestion with the restriction enzymes. One positive colony was selected for isolation of larger amount of plasmid DNA using the Qiagen® maxiprepr kit in accordance with manufacturer's instructions. For cloning of the desired gene, destination vectors (expression vectors) pET24a and pET28a (FIGS. 18 and 19) were digested at the same time as the selected positive plasmid with the restriction enzymes NheI and XhoI and the digested fragments to be used were isolated from the agarose gel in which they were separated. For cloning of the gene onto the expression vectors we used a ratio 1:3 vector to insert for the ligation reaction. Once the ligation reaction was concluded it was used directly to transform TOP10 chemically competent cells. Plasmid containing colonies were selected by resistance to the antibiotic kanamycin and positive colonies (those that had the gene inserted onto the plasmid) were screened by digestion with restriction enzymes and the resulting fragments were separated by agarose electrophoresis. On positive colony was selected for isolation of larger amount of plasmid DNA using the Qiagen® maxiprepr kit in accordance with manufacturer's instructions.

Positive plasmid was introduced by transformation onto the expressing cell line Rosetta 2 commercially available from Novagen®. Protein production was induced when cells reached mid-log phase by adding a final concentration of 100 μM of IPTG. Protein was purified from inclusion bodies after induction and its activity tested by determining the amount of phenylalanine consumed after 30 minutes at 37° C. by amino acid analysis.

pET24a Vector Sequence (SEQ ID NO: 5)
```
   1  atccggatat agttcctcct ttcagcaaaa aaccccctcaa gacccgttta gaggccccaa
  61  ggggttatgc tagttattgc tcagcggtgg cagcagccaa ctcagcttcc tttcgggctt
 121  tgttagcagc cggatctcag tggtggtggt ggtggtgctc gagtgcggcc gcaagcttgt
 181  cgacggagct cgaattcgga tcctagaggg gaattgttat ccgctcacaa ttccctata
 241  gtgagtcgta ttaatttcgc gggatcgaga tctcgatcct ctacgccgga cgcatcgtgg
 301  ccggcatcac cggcgccaca ggtgcggttg ctggcgccta tatcgccgac atcaccgatg
 361  gggaagatcg ggctcgccac ttcgggctca tgagcgcttg tttcggcgtg ggtatggtgg
 421  caggccccgt ggccggggga ctgttgggcg ccatctcctt gcatgcacca ttccttgcgg
 481  cggcggtgct caacggcctc aacctactac tgggctgctt cctaatgcag gagtcgcata
 541  agggagagcg tcgagatccc ggacaccatc gaatggcgca aaacctttcg cggtatggca
 601  tgatagcgcc cggaagagag tcaattcagg gtggtgaatg tgaaaccagt aacgttatac
 661  gatgtcgcag agtatgccgg tgtctcttat cagaccgttt cccgcgtggt gaaccaggcc
 721  agccacgttt ctgcgaaaac gcgggaaaaa gtggaagcgg cgatggcgga gctgaattac
 781  attcccaacc gcgtggcaca acaactggcg ggcaaacagt cgttgctgat tggcgttgcc
 841  acctccagtc tggccctgca cgcgccgtcg caaattgtcg cggcgattaa atctcgcgcc
 901  gatcaactgg gtgccagcgt ggtggtgtcg atggtagaac gaagcggcgt cgaagcctgt
 961  aaagcggcgg tgcacaatct tctcgcgcaa cgcgtcagtg ggctgatcat taactatccg
1021  ctggatgacc aggatgccat tgctgtggaa gctgcctgca ctaatgttcc ggcgttattt
1081  cttgatgtct ctgaccagac acccatcaac agtattattt tctcccatga agacggtacg
1141  cgactgggcg tggagcatct ggtcgcattg gtcaccagc aaatcgcgct gttagcgggc
1201  ccattaagtt ctgtctcggc gcgtctgcgt ctggctggct ggcataaata tctcactcgc
```

-continued

```
1261  aatcaaattc agccgatagc ggaacgggaa ggcgactgga gtgccatgtc cggttttcaa
1321  caaaccatgc aaatgctgaa tgagggcatc gttcccactg cgatgctggt tgccaacgat
1381  cagatggcgc tgggcgcaat gcgcgccatt accgagtccg ggctgcgcgt tggtgcggat
1441  atctcggtag tgggatacga cgataccgaa gacagctcat gttatatccc gccgttaacc
1501  accatcaaac aggattttcg cctgctgggg caaaccagcg tggaccgctt gctgcaactc
1561  tctcaggggcc aggcggtgaa gggcaatcag ctgttgcccg tctcactggt gaaaagaaaa
1621  accaccctgg cgcccaatac gcaaaccgcc tctccccgcg cgttggccga ttcattaatg
1681  cagctggcac gacaggtttc ccgactggaa agcgggcagt gagcgcaacg caattaatgt
1741  aagttagctc actcattagg caccgggatc tcgaccgatg cccttgagag ccttcaaccc
1801  agtcagctcc ttccggtggg cgcggggcat gactatcgtc gccgcactta tgactgtctt
1861  ctttatcatg caactcgtag gacaggtgcc ggcagcgctc tgggtcattt tcggcgagga
1921  ccgctttcgc tggagcgcga cgatgatcgg cctgtcgctt gcggtattcg aatcttgca
1981  cgccctcgct caagccttcg tcactggtcc cgccaccaaa cgtttcggcg agaagcaggc
2041  cattatcgcc ggcatggcgg ccccacgggt gcgcatgatc gtgctcctgt cgttgaggac
2101  ccggctaggc tggcggggtt gccttactgg ttagcagaat gaatcaccga tacgcgagcg
2161  aacgtgaagc gactgctgct gcaaaacgtc tgcgacctga gcaacaacat gaatggtctt
2221  cggtttccgt gtttcgtaaa gtctggaaac gcggaagtca gcgccctgca ccattatgtt
2281  ccggatctgc atcgcaggat gctgctggct accctgtgga acacctacat ctgtattaac
2341  gaagcgctgg cattgaccct gagtgatttt tctctggtcc cgccgcatcc ataccgccag
2401  ttgtttaccc tcacaacgtt ccagtaaccg ggcatgttca tcatcagtaa cccgtatcgt
2461  gagcatcctc tctcgtttca tcggtatcat tacccccatg aacagaaatc ccccttacac
2521  ggaggcatca gtgaccaaac aggaaaaaac cgcccttaac atggcccgct ttatcagaag
2581  ccagacatta acgcttctgg agaaactcaa cgagctggac gcggatgaac aggcagacat
2641  ctgtgaatcg cttcacgacc acgctgatga gctttaccgc agctgcctcg cgcgtttcgg
2701  tgatgacggt gaaaacctct gacacatgca gctcccggag acggtcacag cttgtctgta
2761  agcggatgcc gggagcagac aagcccgtca gggcgcgtca gcgggtgttg gcgggtgtcg
2821  gggcgcagcc atgacccagt cacgtagcga tagcggagtg tatactggct taactatgcg
2881  gcatcagagc agattgtact gagagtgcac catatatgcg gtgtgaaata ccgcacagat
2941  gcgtaaggag aaaataccgc atcaggcgct cttccgcttc ctcgctcact gactcgctgc
3001  gctcggtcgt tcggctgcgg cgagcggtat cagctcactc aaaggcggta atacggttat
3061  ccacagaatc aggggataac gcaggaaaga acatgtgagc aaaaggccag caaaaggcca
3121  ggaaccgtaa aaaggccgcg ttgctggcgt ttttccatag gctccgcccc cctgacgagc
3181  atcacaaaaa tcgacgctca agtcagaggt ggcgaaaccc gacaggacta taaagatacc
3241  aggcgtttcc ccctggaagc tccctcgtgc gctctcctgt tccgaccctg ccgcttaccg
3301  gatacctgtc cgcctttctc ccttcgggaa gcgtggcgct ttctcatagc tcacgctgta
3361  ggtatctcag ttcggtgtag tcgttcgct ccaagctggg ctgtgtgcac gaaccccccg
3421  ttcagcccga ccgctgcgcc ttatccggta actatcgtct gagtccaac ccggtaagac
3481  acgacttatc gccactggca gcagccactg gtaacaggat tagcagagcg aggtatgtag
3541  gcggtgctac agagttatg aagtggtggc ctaactacgg ctacactaga aggacagtat
3601  ttggtatctg cgctctgctg aagccagtta ccttcggaaa aagagttggt agctcttgat
3661  ccggcaaaca aaccaccgct ggtagcggtg gtttttttgt ttgcaagcag cagattacgc
```

-continued

```
3721  gcagaaaaaa aggatctcaa gaagatcctt tgatcttttc tacggggtct gacgctcagt
3781  ggaacgaaaa ctcacgttaa gggattttgg tcatgaacaa taaaactgtc tgcttacata
3841  aacagtaata caaggggtgt tatgagccat attcaacggg aaacgtcttg ctctaggccg
3901  cgattaaatt ccaacatgga tgctgattta tgggtata atgggctcg cgataatgtc
3961  gggcaatcag gtgcgacaat ctatcgattg tatgggaagc ccgatgcgcc agagttgttt
4021  ctgaaacatg gcaaaggtag cgttgccaat gatgttacag atgagatggt cagactaaac
4081  tggctgacgg aatttatgcc tcttccgacc atcaagcatt ttatccgtac tcctgatgat
4141  gcatggttac tcaccactgc gatccccggg aaaacagcat tccaggtatt agaagaatat
4201  cctgattcag gtgaaaatat tgttgatgcg ctggcagtgt tcctgcgccg gttgcattcg
4261  attcctgttt gtaattgtcc ttttaacagc gatcgcgtat tcgtctcgc tcaggcgcaa
4321  tcacgaatga ataacggttt ggttgatgcg agtgattttg atgacgagcg taatggctgg
4381  cctgttgaac aagtctggaa agaaatgcat aaacttttgc cattctcacc ggattcagtc
4441  gtcactcatg gtgatttctc acttgataac cttatttttg acgaggggaa attaataggt
4501  tgtattgatg ttggacgagt cggaatcgca gaccgatacc aggatcttgc catcctatgg
4561  aactgcctcg gtgagttttc tccttcatta cagaaacggc ttttcaaaa atatggtatt
4621  gataatcctg atatgaataa attgcagttt catttgatgc tcgatgagtt tttctaagaa
4681  ttaattcatg agcggataca tatttgaatg tatttagaaa ataaacaaa taggggttcc
4741  gcgcacattt ccccgaaaag tgccacctga aattgtaaac gttaatattt tgttaaaatt
4801  cgcgttaaat ttttgttaaa tcagctcatt ttttaaccaa taggccgaaa tcggcaaaat
4861  cccttataaa tcaaaagaat agaccgagat agggttgagt gttgttccag tttggaacaa
4921  gagtccacta ttaaagaacg tggactccaa cgtcaaaggg cgaaaaaccg tctatcaggg
4981  cgatggccca ctacgtgaac catcacccta atcaagtttt tggggtcga ggtgccgtaa
5041  agcactaaat cggaacccta agggagcccc cgatttaga gcttgacggg gaaagccggc
5101  gaacgtggcg agaaaggaag ggaagaaagc gaaaggagcg ggcgctaggg cgctggcaag
5161  tgtagcggtc acgctgcgcg taaccaccac acccgccgcg cttaatgcgc cgctacaggg
5221  cgcgtcccat tcgcca
``` pET28a Vector Sequence
(SEQ ID NO: 6)

```
  1   atccggatat agttcctcct ttcagcaaaa aaccccctcaa gacccgttta gaggccccaa
 61   ggggttatgc tagttattgc tcagcggtgg cagcagccaa ctcagcttcc tttcgggctt
121   tgttagcagc cggatctcag tggtggtggt ggtggtgctc gagtgcggcc gcaagcttgt
181   cgacggagct cgaattcgga tccgcgaccc atttgctgtc caccagtcat gctagccata
241   tggctgccgc gcggcaccag gccgctgctg tgatgatgat gatgatggct gctgcccatg
301   gtatatctcc ttcttaaagt taaacaaaat tatttctaga ggggaattgt tatccgctca
361   caattcccct atagtgagtc gtattaattt cgcgggatcg agatctcgat cctctacgcc
421   ggacgcatcg tggccggcat caccggcgcc acaggtgcgg ttgctggcgc ctatatcgcc
481   gacatcaccg atggggaaga tcgggctcgc cacttcgggc tcatgagcgc ttgtttcggc
541   gtgggtatgg tggcaggccc cgtggccggg ggactgttgg gcgccatctc cttgcatgca
601   ccattccttg cggcggcggt gctcaacggc ctcaacctac tactgggctg cttcctaatg
661   caggagtcgc ataagggaga gcgtcgagat cccggacacc atcgaatggc gcaaaacctt
721   tcgcggtatg gcatgatagc gcccggaaga gagtcaattc agggtggtga atgtgaaacc
```

-continued

```
 781   agtaacgtta tacgatgtcg cagagtatgc cggtgtctct tatcagaccg tttcccgcgt
 841   ggtgaaccag gccagccacg tttctgcgaa aacgcgggaa aaagtggaag cggcgatggc
 901   ggagctgaat tacattccca accgcgtggc acaacaactg gcgggcaaac agtcgttgct
 961   gattggcgtt gccacctcca gtctggccct gcacgcgccg tcgcaaattg tcgcggcgat
1021   taaatctcgc gccgatcaac tgggtgccag cgtggtggtg tcgatggtag aacgaagcgg
1081   cgtcgaagcc tgtaaagcgg cggtgcacaa tcttctcgcg caacgcgtca gtgggctgat
1141   cattaactat ccgctggatg accaggatgc cattgctgtg gaagctgcct gcactaatgt
1201   tccggcgtta tttcttgatg tctctgacca gacacccatc aacagtatta ttttctccca
1261   tgaagacggt acgcgactgg gcgtggagca tctggtcgca ttgggtcacc agcaaatcgc
1321   gctgttagcg ggcccattaa gttctgtctc ggcgcgtctg cgtctggctg gctggcataa
1381   atatctcact cgcaatcaaa ttcagccgat agcggaacgg aaggcgact ggagtgccat
1441   gtccggtttt caacaaacca tgcaaatgct gaatgagggc atcgttccca ctgcgatgct
1501   ggttgccaac gatcagatgc gctgggcgc aatgcgcgcc attaccgagt ccgggctgcg
1561   cgttggtgcg gatatctcgg tagtgggata cgacgatacc gaagacagct catgttatat
1621   cccgccgtta accaccatca acaggatttt cgcctgctg gggcaaacca gcgtggaccg
1681   cttgctgcaa ctctctcagg gccaggcggt gaagggcaat cagctgttgc ccgtctcact
1741   ggtgaaaaga aaaccaccc tggcgcccaa tacgcaaacc gcctctcccc gcgcgttggc
1801   cgattcatta atgcagctgg cacgacaggt ttcccgactg gaaagcgggc agtgagcgca
1861   acgcaattaa tgtaagttag ctcactcatt aggcaccggg atctcgaccg atgcccttga
1921   gagccttcaa cccagtcagc tccttccggt gggcgcgggg catgactatc gtcgccgcac
1981   ttatgactgt cttctttatc atgcaactcg taggacaggt gccggcagcg ctctgggtca
2041   ttttcggcga ggaccgcttt cgctggagcg cgacgatgat cggcctgtcg cttgcggtat
2101   tcggaatctt gcacgccctc gctcaagcct tcgtcactgg tcccgccacc aaacgtttcg
2161   gcgagaagca ggccattatc gccggcatgg cggccccacg ggtgcgcatg atcgtgctcc
2221   tgtcgttgag gacccggcta ggctggcggg gttgccttac tggttagcag aatgaatcac
2281   cgatacgcga gcgaacgtga agcgactgct gctgcaaaac gtctgcgacc tgagcaacaa
2341   catgaatggt cttcggtttc cgtgtttcgt aaagtctgga aacgcggaag tcagcgccct
2401   gcaccattat gttccggatc tgcatcgcag gatgctgctg gctaccctgt ggaacaccta
2461   catctgtatt aacgaagcgc tggcattgac cctgagtgat ttttctctgg tccgccgca
2521   tccataccgc cagttgttta ccctcacaac gttccagtaa ccggcatgt tcatcatcag
2581   taacccgtat cgtgagcatc ctctctcgtt tcatcggtat cattacccc atgaacagaa
2641   atcccccctta cacggaggca tcagtgacca acaggaaaa aaccgcccctt aacatggccc
2701   gctttatcag aagccagaca ttaacgcttc tggagaaact caacgagctg acgcggatg
2761   aacaggcaga catctgtgaa tcgcttcacg accacgctga tgagctttac cgcagctgcc
2821   tcgcgcgttt cggtgatgac ggtgaaaacc tctgacacat gcagctcccg gagacggtca
2881   cagcttgtct gtaagcggat gccgggagca gacaagcccg tcagggcgcg tcagcgggtg
2941   ttggcggggtg tcggggcgca gccatgaccc agtcacgtag cgatagcgga gtgtatactg
3001   gcttaactat gcggcatcag agcagattgt actgagagtc accatatat gcggtgtgaa
3061   ataccgcaca gatgcgtaag gagaaaatac cgcatcaggc gctcttccgc ttcctcgctc
3121   actgactcgc tgcgctcggt cgttcggctg cggcgagcgg tatcagctca ctcaaaggcg
3181   gtaatacggt tatccacaga atcaggggat aacgcaggaa agaacatgtg agcaaaaggc
```

```
3241  cagcaaaagg ccaggaaccg taaaaaggcc gcgttgctgg cgttttttcca taggctccgc
3301  cccccctgacg agcatcacaa aaatcgacgc tcaagtcaga ggtggcgaaa cccgacagga
3361  ctataaagat accaggcgtt tcccccctgga agctccctcg tgcgctctcc tgttccgacc
3421  ctgccgctta ccggatacct gtccgccttt ctcccttcgg aagcgtggc gctttctcat
3481  agctcacgct gtaggtatct cagttcggtg taggtcgttc gctccaagct gggctgtgtg
3541  cacgaacccc ccgttcagcc cgaccgctgc gccttatccg gtaactatcg tcttgagtcc
3601  aacccggtaa gacacgactt atcgccactg gcagcagcca ctggtaacag gattagcaga
3661  gcgaggtatg taggcggtgc tacagagttc ttgaagtggt ggcctaacta cggctacact
3721  agaaggacag tatttggtat ctgcgctctg ctgaagccag ttaccttcgg aaaaagagtt
3781  ggtagctctt gatccggcaa acaaaccacc gctggtagcg gtggttttt tgtttgcaag
3841  cagcagatta cgcgcagaaa aaaaggatct caagaagatc ctttgatctt ttctacgggg
3901  tctgacgctc agtggaacga aaactcacgt taagggattt tggtcatgaa caataaaact
3961  gtctgcttac ataaacagta atacaagggg tgttatgagc catattcaac gggaaacgtc
4021  ttgctctagg ccgcgattaa attccaacat ggatgctgat ttatatgggt ataaatgggc
4081  tcgcgataat gtcgggcaat caggtgcgac aatctatcga ttgtatggga agcccgatgc
4141  gccagagttg tttctgaaac atggcaaagg tagcgttgcc aatgatgtta cagatgagat
4201  ggtcagacta aactggctga cggaatttat gcctcttccg accatcaagc attttatccg
4261  tactcctgat gatgcatggt tactcaccac tgcgatcccc gggaaaacag cattccaggt
4321  attagaagaa tatcctgatt caggtgaaaa tattgttgat gcgctggcag tgttcctgcg
4381  ccggttgcat tcgattcctg tttgtaattg tccttttaac agcgatcgcg tatttcgtct
4441  cgctcaggcg caatcacgaa tgaataacgg tttggttgat gcgagtgatt ttgatgacga
4501  gcgtaatggc tggcctgttg aacaagtctg gaaagaaatg cataaacttt tgccattctc
4561  accggattca gtcgtcactc atggtgattt ctcacttgat aaccttattt ttgacgaggg
4621  gaaattaata ggttgtattg atgttggacg agtcggaatc gcagaccgat accaggatct
4681  tgccatccta tggaactgcc tcggtgagtt ttctccttca ttacagaaac ggcttttca
4741  aaaatatggt attgataatc ctgatatgaa taaattgcag tttcatttga tgctcgatga
4801  gttttttctaa gaattaattc atgagcggat acatatttga atgtatttag aaaaataaac
4861  aaataggggt tccgcgcaca tttccccgaa aagtgccacc taaattgtaa gcgttaatat
4921  tttgttaaaa ttcgcgttaa attttgtta aatcagctca tttttaacc aataggccga
4981  aatcggcaaa atcccttata aatcaaaaga atagaccgag atagggttga gtgttgttcc
5041  agtttggaac aagagtccac tattaaagaa cgtggactcc aacgtcaaag ggcgaaaaac
5101  cgtctatcag ggcgatggcc cactacgtga accatcaccc taatcaagtt tttggggtc
5161  gaggtgccgt aaagcactaa atcggaaccc taaagggagc ccccgattta gagcttgacg
5221  gggaaagccg gcgaacgtgg cgagaaagga agggaagaaa gcgaaggag cgggcgctag
5281  ggcgctggca agtgtagcgg tcacgctgcg cgtaaccacc acccgccg cgcttaatgc
5341  gccgctacag ggcgcgtccc attcgcca
```

Figure 11:
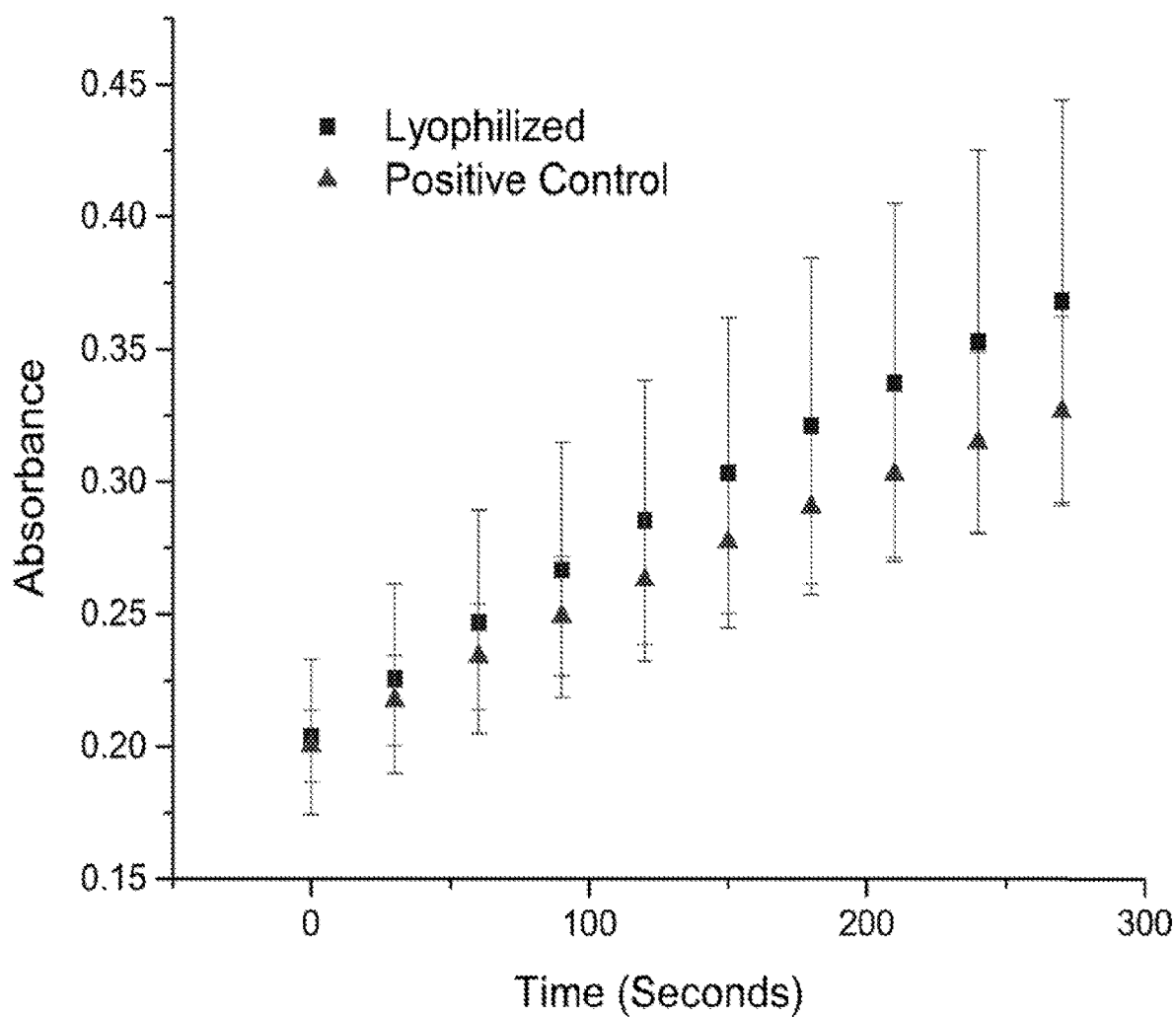
FIG. 11 depicts a graph showing the influence of sucrose on PheDH activity.
Figure 12:
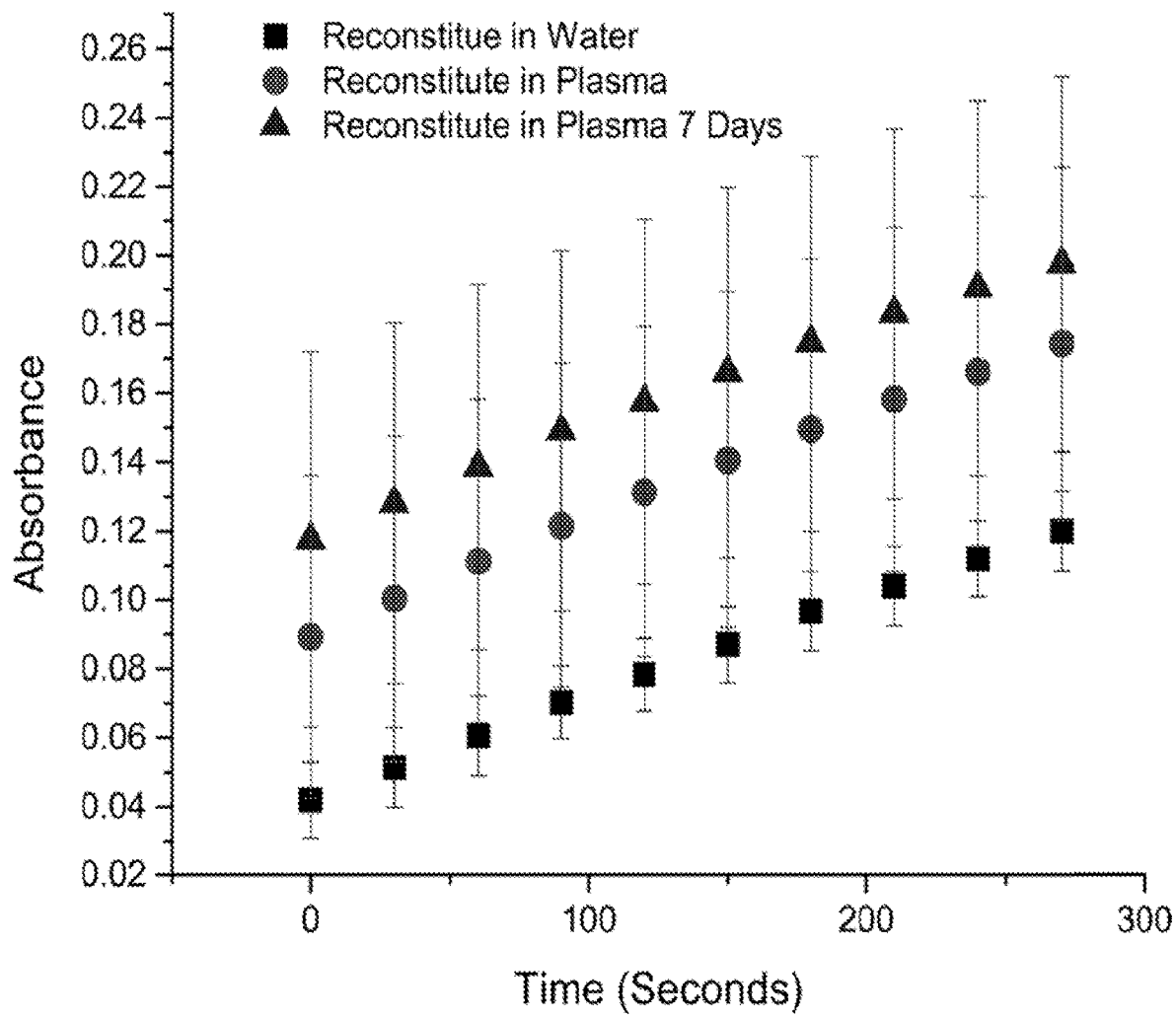
FIG. 12 depicts a graph showing the strength of PheDH when reconstituted in plasma and water.

A thermally stable form of phenylalanine dehydrogenase was cloned and used to generate NADH in presence of Phe (FIG. 11 and FIG. 12). The PheDh can be stored for a year with minimal activity loss and as a lyophilized powder if stored with sucrose. NADH produced by the reaction was quantified by fluorescent measurement Cloning Validation (Prophetic)

Cloned genes will be sequenced for confirmation prior to subcloning onto expression vectors. Proteins will be purified using nickel-affinity chromatography (His-tagged versions) or by precipitation of undesired proteins by heat (No-tagged versions). Enzyme activity will be improved, if necessary, by site directed mutagenesis to increase the affinity for the substrates or the stability. Such modifications will be made based on crystallographic and biochemical studies performed in other members of the dehydrogenases family of enzymes. We will isolate and purify two versions of each of phenylalanine dehydrogenase and glutamate dehydrogenase from *G. thermoglucosidasius* and *Thermus thermophilus* organisms, respectively. Purification can be completed for example after harvesting cell culture, lysing the cells and running the cellular lysate over a Nickel-tagged column that has affinity for His-tagged protein sequences followed by standard elution.

Example 6: Phenylalanine Sensor Fabrication with Combination Light Emission and Electrochemical Sensing (Prophetic)

Dehydrogenases generally affect amino acids by cleaving off the primary amine thereby generating ammonia. A cofactor to these enzymes is nicotinamide adenine dinucleotide (NAD+). During the catalytic event NAD+ is reduced to NADH. This is advantageous as NADH is a reducing agent that can be detected using electrochemistry. If this reaction is performed on an exposed electrode under a certain voltage, NADH will liberate electrons to the electrode producing a current. The magnitude of this current can then be correlated to the concentration of phenylalanine.

To fabricate a hydrogel matrix (the schematic for which appears in FIG. 5) a 1 mL stock solution in 1× phosphate buffered saline containing the following will be prepared as follows:
  a. 40 units of phenylalanine dehydrogenase
  b. 20 mL of 0.05M Toluidine Blue (the mediator)
  c. 5 mM β-Nicotinamide adenine dinucleotide, reduced dipotassium salt
  d. 1% weight/volume sodium alginate from brown algae 10 mL of the pre-gel solution will be spread onto a three electrode screen printed carbon electrode. The electrode contains both a counter and working electrode as well as a silver/silver chloride reference electrode. The working electrode acts as the sensing electrode. The pre-gel solution on the electrode will then be sprayed with a 0.1M $CaCl_2$ solution using a Badger 200N airbrush at 7.5 psi for 1 second, depositing ~5 mL of the $CaCl_2$ solution. The gel will be allowed to cure for 30 minutes in a humid environment.

The electrode above will be combined with the reaction surface described herein using either a cuvette or other solid support comprising reaction surface such as a filter paper and microfluidic chamber.

Additional components such as varying concentration of trehalose will be added to the hydrogel matrix mixture above. Additional component of the hydrogel may also include: one or more anionic monomers and crosslinkers.

Anionic Monomers (Prophetic)

Several candidates for enhancement of an anion filter have been identified, each of which contain a negative charge in order to repel any anions that may interfere with the electrode. 2-acrylamido-2-methylpropane sulfonic acid (AMPS) is a sulfonic acid containing monomer with a permanent negative charge that can be polymerized via radical polymerization in solution with the enzyme, cofactors and crosslinker. Other suitable anionic monomer candidates include methacrylic acid, 2-sulfoethyl methacrylate, and 2-propene-1-sulfonic acid. Enzyme activity will be verified in conjunction with the other hydrogel components through amperometric detection with a potentiostat for each composition.

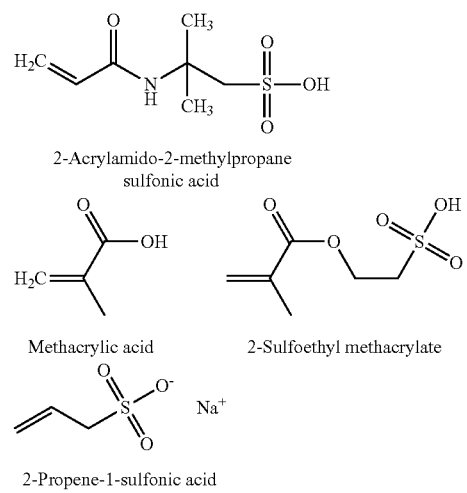

2-Acrylamido-2-methylpropane sulfonic acid

Methacrylic acid    2-Sulfoethyl methacrylate

2-Propene-1-sulfonic acid

Easily reduced molecules termed mediators can facilitate propagation of the electrochemical event. Mediators effectively shuttle electrons from the NADH to the electrode allowing for higher sensitivity and protection of the integrity of the electrode surface. Ideally mediator molecules are immobilized close to the electrode surface to eliminate diffusion as a rate-limiting step in the propagation of electrons. Common mediators for shuttling electrons from NADH include thionine, o-phenylenediamine, methylene blue and toluidine blue.

Toluidine blue will be immobilized onto the surface of the electrode by electropolymerization. Additionally if the enzyme is present during this electropolymerization event, the enzyme can be entrapped in the polymerized layer of the mediator and optional alginate solution. The advantage of such an immobilization lies in that the enzyme will produce NADH directly in the vicinity of the polymerized mediator layer, completely eliminating diffusion as a rate limiting step of propagation of the current response.

Crosslinkers (Prophetic)

Polyethylene glycol dimethacrylate (PEGDA) or tetraethylene glycol diacrylate (TEGDA) will be used as optional crosslinkers in the anionic and mediator polymers, creating a hydrogel that serves as a molecular weight cut off filter and an immobilizing mechanism for the enzyme and its cofactors.

Varying the amount and molecular weight of these polyethylene glycol derivatives will yield different enzyme stabilities and kinetics due to diffusion and steric hindrance as well as alter the molecular weight cut off filter mesh size. Polyethylene glycol derivatives are the choice for the crosslinker because they will minimize interactions and modifications with the enzyme preventing adsorption. Both PEGDA and TEGDA will be polymerized in the monomer solution that contains the enzyme and cofactors via free radical polymerization. Enzyme activity will be verified in conjunction with the other hydrogel components.

Upon successful production of phenylalanine dehydrogenase, electrochemical detection of phenylalanine will be performed under ideal conditions in buffered solution. Phenylalanine dehydrogenase concentrations, NAD+, and toluidine blue will be dissolved in phosphate buffered saline (PBS) and placed on screen printed carbon electrodes containing a silver/silver chloride reference electrode, working (or measuring) electrode, and counter electrode. After the electrode equilibrates, stock solutions of phenylalanine in PBS will be: directly added to the enzyme solution on the electrode and current will be measured by amperometric detection using a potentiostat. Detection will be carried out at an operating voltage determined by cyclic voltammetry. Concentrations of phenylalanine ranging in concentrations between 60 and 1200 mM will be used to generate a standard curve within the physiological range of healthy individuals and individuals with PKU. A variety of techniques for data analysis will be utilized to identify the most accurate and reproducible method of correlating current generation to phenylalanine concentration. This task will demonstrate the ability to detect physiological phenylalanine concentrations as well as determine the enzyme and cofactor concentrations necessary for accurate detection in this range.

After the best candidates for immobilization of phenylalanine dehydrogenase and its cofactors are identified, current generation will be quantified via amperometric detection of phenylalanine concentrations in the range of 60 and 1200 mM. This will be used to generate a standard curve within the physiological range of healthy individuals and individuals with PKU. A variety of techniques for data analysis will be utilized to identify the most accurate and reproducible method of corresponding current generation to phenylalanine concentration. Sensor stability will be assessed through long-term storage at room temperature, about 4 degrees Celsius, and about −20 degrees Celsius. Detection sustainability will then be determined at 1, 3, 5, and 10 weeks for each storage condition using stock solutions of phenylalanine in PBS.

Any phenylalanine dehydrogenase immobilized to a microfluidic chamber will be lyophilized or desiccated in a sugar/bulking agent solution comprising from about 100 micromolar to about 500 micromolar sugar in Tris/glycine buffer.

Example 7: Alternative Phenylalanine Sensor (Prophetic)

Rather than rely on only one method to measure the quantity of phenylalanine in a bodily fluid such as a blood sample or plasma, other embodiments of the device will be made utilizing the same deposition chemistry for microfluidic chambers. Phenylalanine dehydrogenase will be replaced in an embodiment with immobilization of phenylalanine ammonia-lyase (PAL), (SEQ ID NO:7 or functional fragments thereof that are at least 70% homolgous to SEQ ID NO:7). This enzyme will catalyze a reaction of phenylalanine and produce cinnamic acid and ammonia. Cinnamic acid can be measured spectrophotometrically since it produces a blue color in the presence of Fe and KOH. Ammonia release in the presence of hydrogen peroxide will produce an electron transfer to an electrode coated with hydrogel. Current from electron transfers similar to the above-described methods can be detected by the working electrode.

Example 8—Test Strip Platform for Plasma Separation and Sample Distribution

Microfluidics is a commonly investigated option for near-patient device construction. The micro-channels allow for the rapid processing of small volumes of blood. Their transition from the lab bench to mobile devices has been hindered by the requirement of hand or electrically operated pumps. Additionally their construction is cumbersome and can be difficult to mass-produce. Recently, paper microfluidics have garnered a growing interest due to distinct advantages over traditional microfluidics for test strip construction. Paper-based test strips rely on the passive capillary action of the hydrophilic polymer pores for fluid transport without the need of pumps or motors as required in traditional microfluidics. Coupling this with the low cost of filter paper, makes paper microfluidic test strips an attractive option.

Microfluidic test cassettes are traditionally constructed from silicone polymers and require electrically or hand driven pumps to process the sample. The silicone polymer construction requires complex techniques such as photolithography or ultra-high resolution 3D printing. Additionally the reliance on pumps results in large test cassettes requiring significant power consumption. These issues can easily be resolved by use of paper-based microfluidics which do not require pumps or motors as the hydrophilic pores of the paper allow for passive fluid transport through capillary action. A two part paper test strip will be investigated consisting of a plasma separating membrane and a paper fluidic for sample distribution and mixing with the PheDh enzyme. The plasma separating membrane utilizes increasingly smaller pores in the cross-section of the paper that draw up plasma through increasing capillary pressure while leaving blood cells behind. Separated plasma can then be extracted by use of the paper fluidic and distributed to sections for both reference and analyte measurements. The paper was patterned to include these channels and sections by use of $CO_2$ laser cutting, a common technique commonly used to cut thin sheet of acrylic. We have demonstrated that $CO_2$ laser cutting can be used to pattern paper effectively. The PheDh enzyme was lyophilized directly onto the paper fluidic. We have demonstrated that PheDh can be lyophilized with no loss in activity if done in the presence of 300 mM sucrose, which stabilizes the native enzyme structure.

The test strip was designed to contain a 1 $cm^2$ pad of the plasma separating paper. This corresponded to a maximum sample size of 20 mL (plasma separating paper void volume of ~20 mL/$cm^2$). A 40 W $CO_2$ laser cutter was utilized to pattern a separate piece of filter paper with both an absorbing pad that is in contact with the plasma separating membrane and channels to distribute plasma to a reference and measurement section, also patterned by the $CO_2$ laser. The resulting paper microfluidic had a total volume of 6 mL, approximately equal to the expected volume of plasma extracted (FIG. 16). Different materials were investigated for their efficiency in wicking plasma away from the blood separation paper. They included cellulose, nitrocellulose, and poly(ethylsulfone) treated cellulose. Extraction efficiency was measured using 2.5 $cm^2$ pieces of each material exposed to the blood separation paper after 20 mL of whole blood has been applied. The spot sized generated was measured and the resulting volume of plasma extracted calculated.

A major obstacle in low sample volume analysis on paper is rapid evaporation of the biomatrix. To circumvent this issue, the patterned paper test strips will be sandwiched between two pieces of 0.2 mm thick sheets of transparent acrylic. This will prevent sample evaporation as well as provide a stable support to increase durability of the paper test strip for ease of handling. The acrylic will be cut with a $CO_2$ laser to fashion it with a blood application window for access to the plasma separating membrane. The resulting test strip should have dimensions of 1 cm×2 cm, which is small and compact yet still easy to handle.

Figure 20:
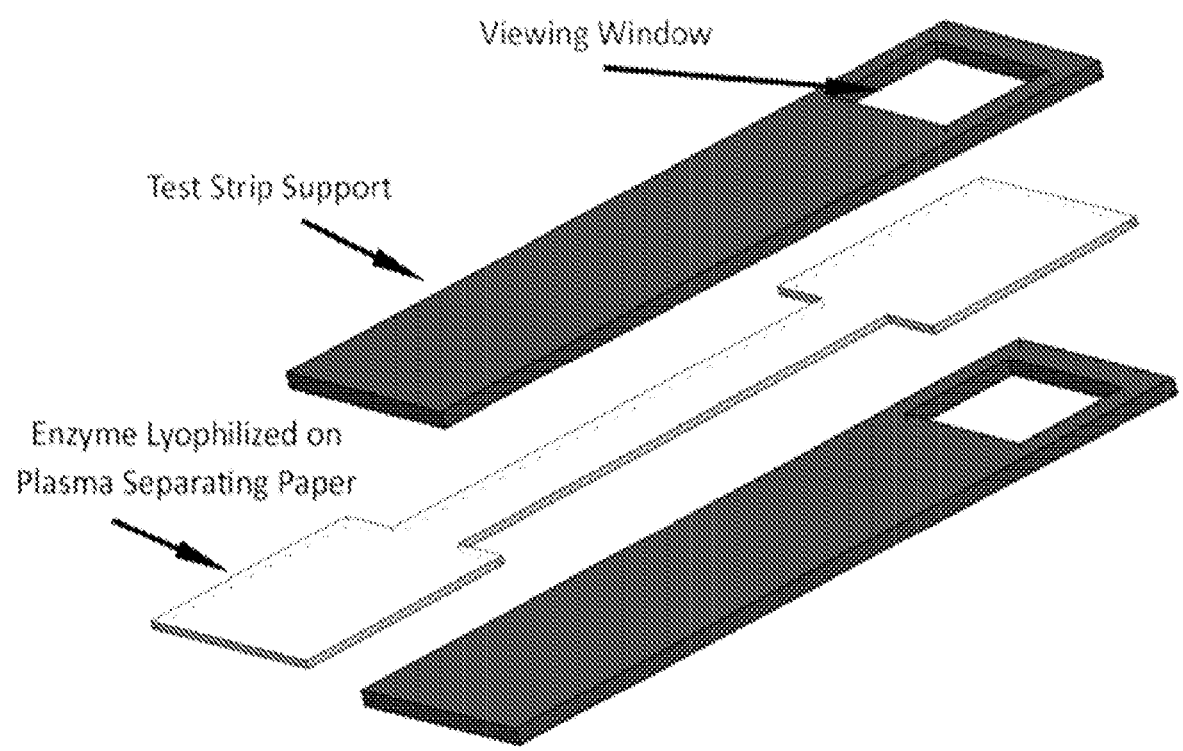
FIG. 20 depicts an alternative embodiment of a test strip.

Patterned filter paper test strips were loaded with 10 mL aliquots of a 300 mM solution of sucrose in 100 mM Tris-HCl containing 0.28 mg of the PheDh. The 300 mM sucrose solution assisted in the stable lyophilization of the enzyme. The loading took place in the measurement zone of the test strip. The assay buffer for the enzyme, 200 mM Glycine KOH KCl, was be loaded on the test strip. Two different patterns were created as depicted in FIG. 16 and FIG. 20.

Enzyme loaded test strip was challenged with whole human blood spiked with serially increasing phenylalanine concentrations ranging from 20-1200 mM. This representation of healthy to diseased concentrations of phenylalanine, allowed for evaluation of the test strip in tandem with the handheld fluorometer. 20 mL of the whole blood was applied to the sample application zone of the test strip. After 5 minutes the compact fluorometer will take a fluorescent image of both the reference zone and the sample zone containing the enzyme. The image will be processed and the red, green and blue channels will be extracted. A calibration curve will then be generated using this range of blood phenylalanine concentrations as an initial evaluation of the efficacy of the test strip.

Example 9—Quantitative Compact Fluorometer

Precise biochemical analysis is a ubiquitous challenge in the diagnosis and management of inborn errors of metabolism (IEMs). Newborn screenings for these genetic disorders allow healthcare workers to rapidly respond with treatment and management protocols, preventing neurodevelopmental complications from manifesting. Once the disorder is identified, regular biochemical analysis becomes a lifelong need for these patients and must be performed to ensure the toxic metabolites associated with the IEMs are kept to a minimum by dietary intervention and pharmaceuticals. Techniques currently being used for detecting and managing IEMs include enzymatic assays, high performance liquid chromatography (HPLC) and mass spectroscopy. These techniques require expensive equipment and professionally trained personnel, which lends themselves well to inpatient testing but not for outpatient clinics or at home. The time intensive task of either shipping samples or traveling to major hospitals and laboratories dramatically lowers patient compliance. In fact, it has been demonstrated that patients with phenylketonuria (PKU), an IEM for phenylalanine (Phe) metabolism, only had 40% of measured Phe levels within the prescribed range. In maple syrup urine disease, an IEM for branched amino acid metabolism, only 34% of the patients had leucine levels within the prescribed range. This is due to the currently unmanageable task of efficient and timely monitoring blood metabolites and responding with appropriate treatment.

There is a need for a platform that offers rapid biochemical analysis outside of the clinical setting providing a means for biomarker detection not only at home but in emergency scenarios as well, in a manner similar to a blood glucometer. An effective device should perform the analysis directly on whole blood with little to no training or decisions in its operation, while remaining compact enough to allow for handheld operation by the patient or near the patient by a caretaker. A near-patient device with such qualities can be accomplished by the proposed approach through investigation of paper microfluidics for blood sample processing in conjunction with handheld fluorometry for analyte detection. This approach was investigated to detect phenylalanine as a model for future devices for near-patient biochemical analysis. A phenylalanine processing enzyme, phenylalanine dehydrogenase (PheDh) will be utilized. PheDh reduces its cofactor, NAD+, to the energetic molecule NADH, as it processes Phe. The stoichiometrically produced NADH molecule is fluorescent and can be exploited for Phe quantification.

Photometric detection, is a commonly used technique in microfluidic research for the evaluation of enzymatic reactions, immunoassays or colorimetric chemical reactions. Recently, photometric, colorimetric and fluorescent detection in handheld devices have been made possible by advances in low power ultra-violet LED technology and compact imaging devices. There have been efforts to leverage these advances by measuring absorbance and reflectance on paper devices, but the fibrous nature of paper causes scattering of the probing light, resulting in poor signal to noise ratios. Alternatively, fluorescent techniques measure light emitted from the sample, rather than losses from a probing light source, and therefore have excellent signal-to-noise ratios for paper-based measurements.

Despite its superior signal to noise ratio, fluorescence measurements can potentially be hindered by endogenous molecules in blood that have similar fluorescent properties to NADH. To circumvent this obstacle, the fluorescent events will be quantified by use of a complementary metal-oxide semiconductor (CMOS) imaging device. By capturing an image, as opposed to measuring the emitted light directly, fluorescence intensity can be quantified in multiple sites on the paper microfluidic using the algorithm support beginning on page 23 of the specification. This would allow for the inclusion of reference regions that contain no sensing element (i.e. PheDh) and allow for simultaneous background measurements to be made.

Figure 13:
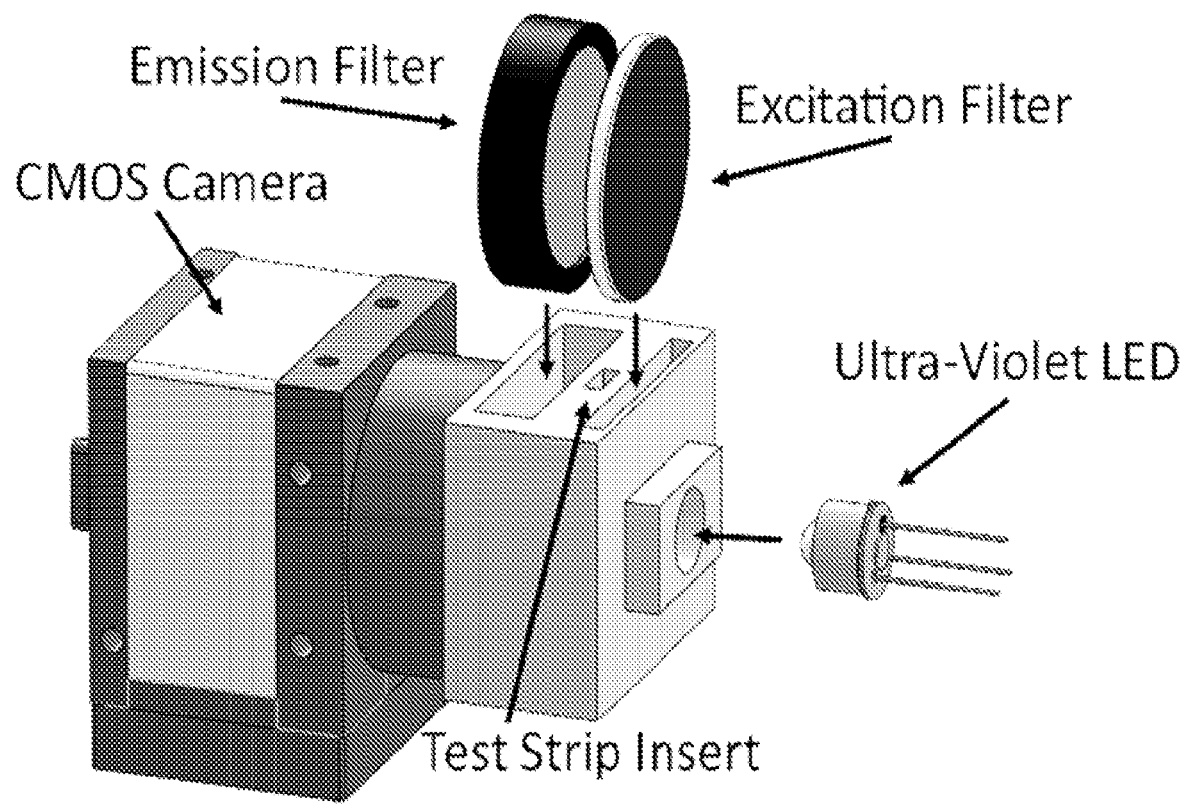
FIG. 13 depicts a UV light, filter, and CMOS camera fluorometer.
Figure 14:
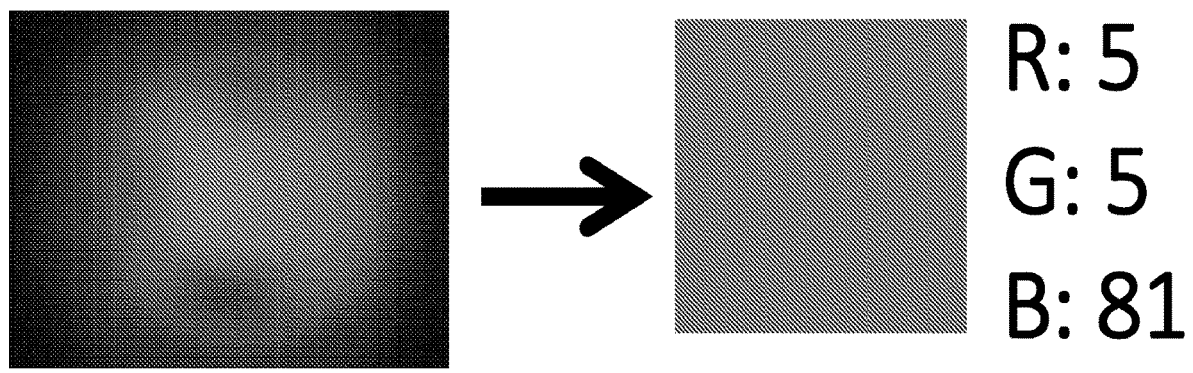
FIG. 14 depicts the signal processing and quantification of averaging RGB colors of a 100 pixel area.
Figure 15:
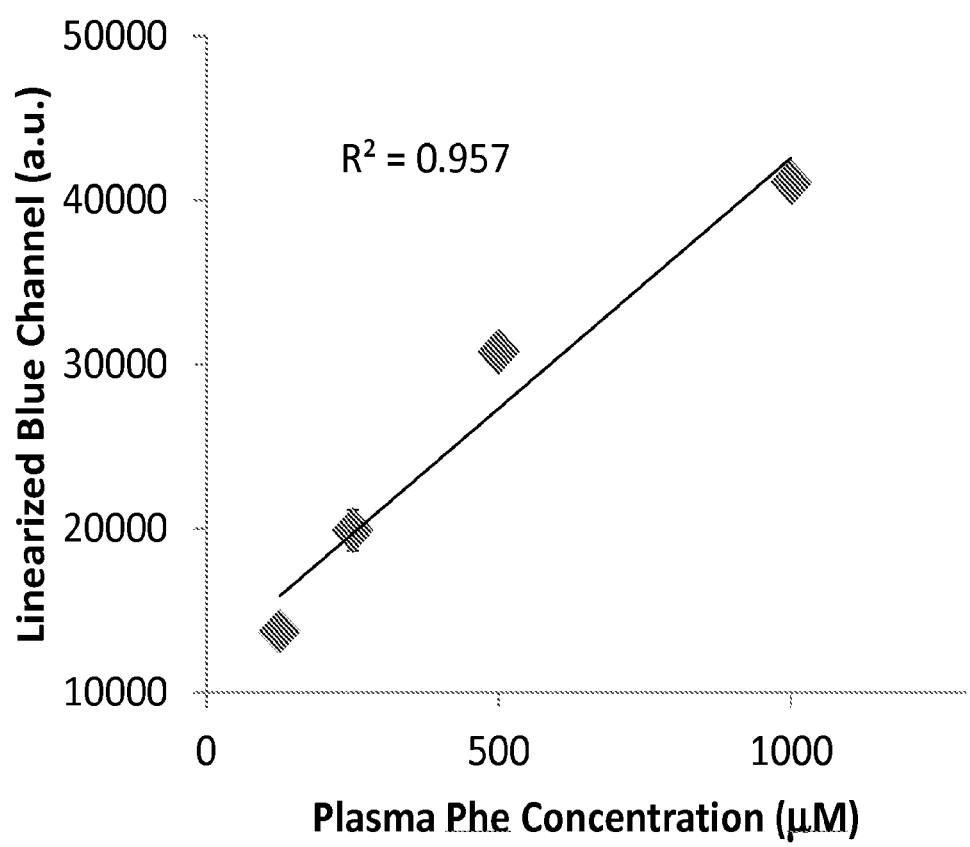
FIG. 15 depicts a graph showing plasma phenylalanine measurements at various concentrations of plasma phenylalanine.

An in-line fluorometer was constructed consisting of two bandpass filters, a UV-LED and a CMOS camera (FIG. 13). This design provides a compact device measuring only 2×1×1 inches. NADH was excited at 365 nm using a 50 mW, UV-LED. The LED has a low energy tail in emission and thus has a small output within the emission band of NADH, at approximately 450 nm. To circumvent this issue a colored glass optical filter with a spectral bandgap of 275-375 nm was used as an excitation filter. NADH produced within the paper-based test strip emitted blue light with a peak wavelength of 450 nm during excitation (FIG. 14—grey scaled image provides light hue in blue wavelength as compared to the red and green wavelengths). The emitted light passed through a dielectric bandpass filter with a peak transmittance wavelength of 457 nm with a 10 nm full-width-at-half-maximum. This emission filter prevented the excitation light source from reaching the CMOS device. Raw data from the CMOS device integrated on a smart phone captured the fluorescence event (FIG. 19A) and subsequent image analysis was used to determine normalized NADH concentration (see algorithms on page 23 of the specification). FIG. 15 is a graph of linearized fluorescence readings from the use of a CMOS camera mounted on a mobile phone using microfluidic chamber, housing and filter paper depicted in FIG. 16. FIG. 15 demonstrates the effectiveness of measuring phenylalanine in plasma samples by use of fluorescence on a paper-based test strip. Use of a camera allows for both multiplexed and reference measurement made simultaneously. Quantification of fluorescent event was performed by averaging the RGB colors of a 100 pixel area of the paper test strip.

The paper based Phe sensor utilizes fluorescence to detect the NADH molecules produced by the enzyme. NADH has a fluorescent excitation of 365 nm and an emission of 450 nm.

Figure 17:
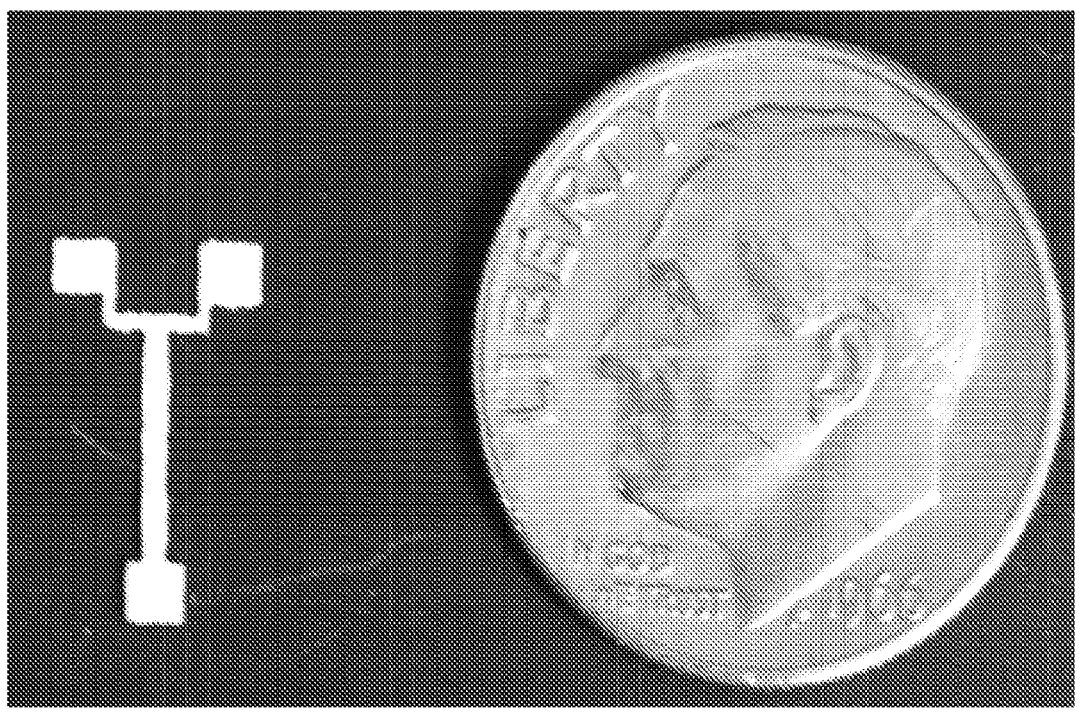
FIG. 17 depicts a test strip next to a United States dime for size comparison.
Figure 19B:
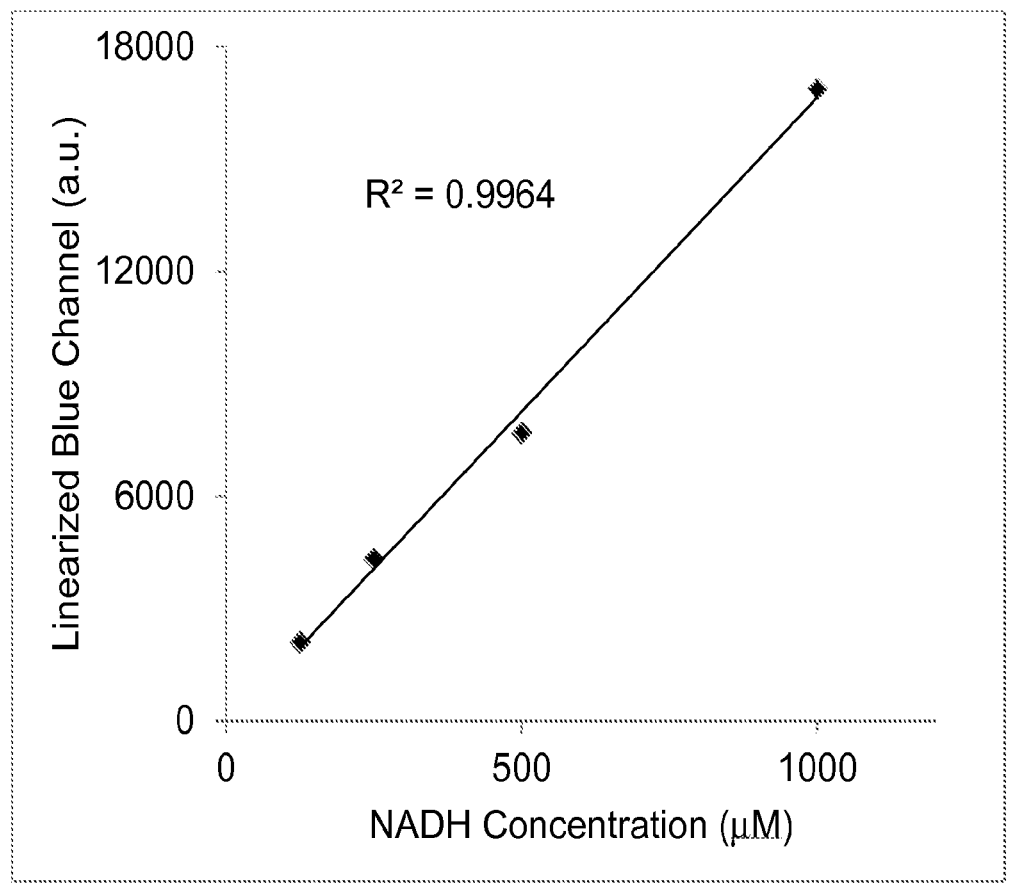

Fluorescence is advantageous as signal gain is being measured rather than signal loss, which is the case in absorbance and reflectance measurements. This is especially important for paper based measurements, where the paper can scattering probing light sources used in absorbance measurements, whereas in the case of fluorescence this issue does not exist. The fluorescence based device utilized a 365 nm 50 mW ultra-violet LED. The light shines light through an excitation filter to ensure that no light from the LED bleeds into the measurement region (450 nm) of the emission event. The light then reaches the paper-based test strip containing the enzyme. The fluorescently excited NADH produced by the enzyme then emits light with a wavelength of 450 nm. This emission even can be detected by a photodiode or by a complementary metal-oxide semiconductor camera or by a charge-coupled device camera. The use of a camera can be advantageous to the use of a photodiode as it allows multiple regions (i.e. reference) to be measured at the same time. The paper-based test strip itself consists of a plasma separating membrane and of a paper fluidic. Whole blood can be applied to the plasma separating membrane, and then the paper fluidic can extract plasma from this membrane by capillary action. The paper fluidic was loaded with the lyophilized enzyme and the buffer needed for the enzyme to operate. The plasma separating membrane and the paper fluidic will be bound to the surface of an optically transparent, plastic support (acrylic, polystyrene, polycarbonate, etc.). A top support can then be used to sandwich the components. Alternatively, the top support can be replaced by a lamination process or by optically transparent tape. Relevant size of the microfluidic chamber is depicted in FIG. 17. FIG. 19B depicts data collected and normalized using a slightly different microfluidic chamber depicted in FIG. 18. These measurements were taken using only 10 microliters of plasma. Concentrations ranging from 125-1000 micromolar were measured, with an errors as low as 5%. The constructed test strip in FIG. 18 could perform real-time separation of the plasma from a whole blood sample and distribute the plasma to different region on the paper fluidic containing the enzyme.

The distances between each component was varied between 0.5-5 mm. Shorter distances provided a stronger signal, but could potentially cause saturation of the excitation event. Signal-to-noise ratios were determined for each distance to optimize the setup. Precise modulation of the distances was performed using an optical table and filter paper charged with 10 mL of 100 mM NADH or deionized water.

The use of a CMOS device has distinct advantages over photodiodes for detecting emitted light from the fluorescent probe. Specifically, multiplexed and reference detection can be performed by analyzing various defined regions in the image of the test strip. Captured images by the CMOS device will be analyzed by averaging the 400 pixel areas of the analyte and reference sections. These algorithms will be computed by an onboard microcontroller. Once this quantification protocol has been established,-NADH was analyzed using 10 mL aliquots of concentrations ranging from 0.1-1000 mM.

This was performed in different biomatrices to demonstrate the effective use of a reference well in subtracting any intrinsic fluorescence of the sample (FIG. 16 microfluidic versus FIG. 18). This was performed using 5 samples of each concentration in water, serum and separated plasma.

Figure 2A:
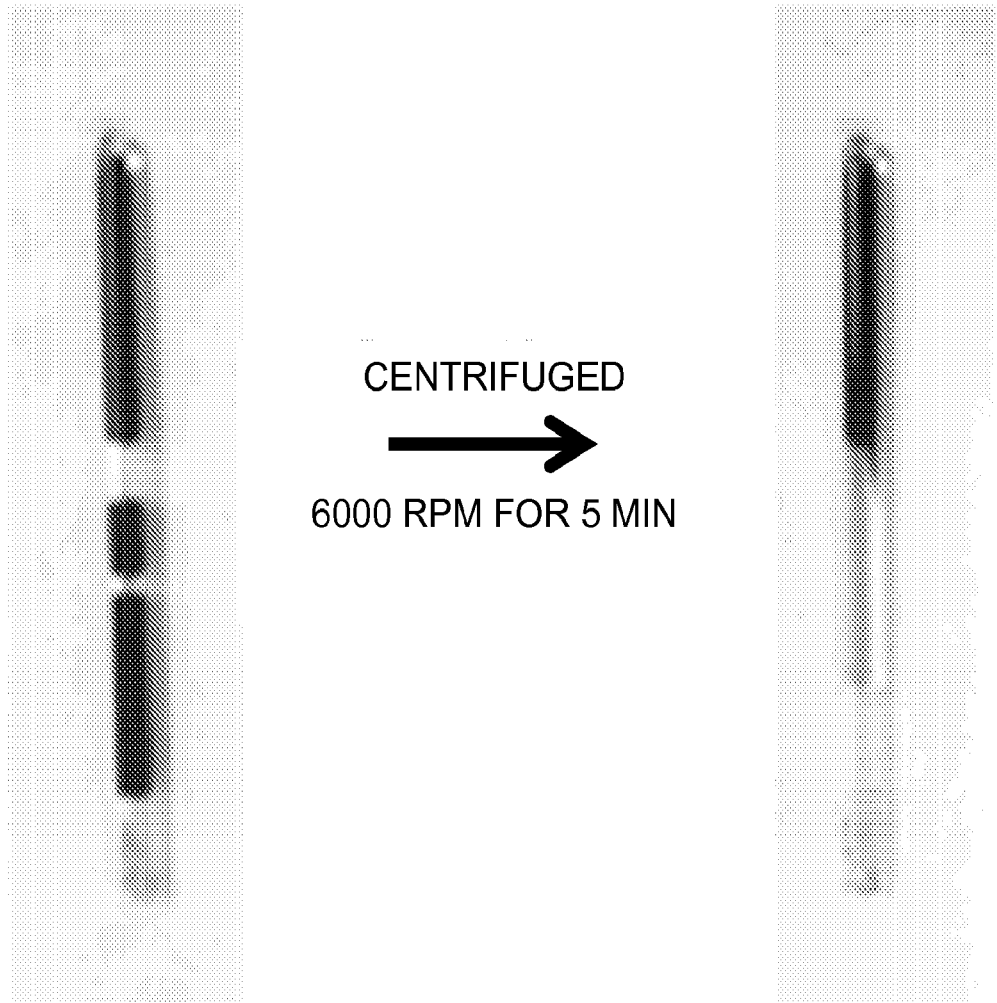
FIGS. 2A and 2B depict steps involved in the characterization of centrifuged blood using UV light.

Example 10—Centrifuging Disc Platform for Plasma Separation and Sample Distribution In addition to paper-based microfluidics, separating plasma from whole blood can be performed by centrifugation. A fast and proven method, centrifugation involves rapidly spinning blood sample to separate the lighter plasma from the heaver blood cells. Due to the need of a motor to work the centrifuge, power consumption should be held to a minimum. A centrifuging disc was investigated which consists of a microfluidic channel containing PheDh enzyme on one of side, and a counterweight on the other. The disc is constructed of a clear acrylic or other non-reactive, sturdy material (FIG. 2A). Whole blood was applied to a small hole in the channel side of the disc, and is dawn into the channel by capillary action (FIG. 2A). The disc was then placed in a small, brushless centrifuge and rapidly spun, allowing the heavier blood cells and other elements to be pushed to the far end of the channel. The lighter plasma separates from the rest of the blood and remains toward the center of the disc (FIG. 1).

Figure 21:
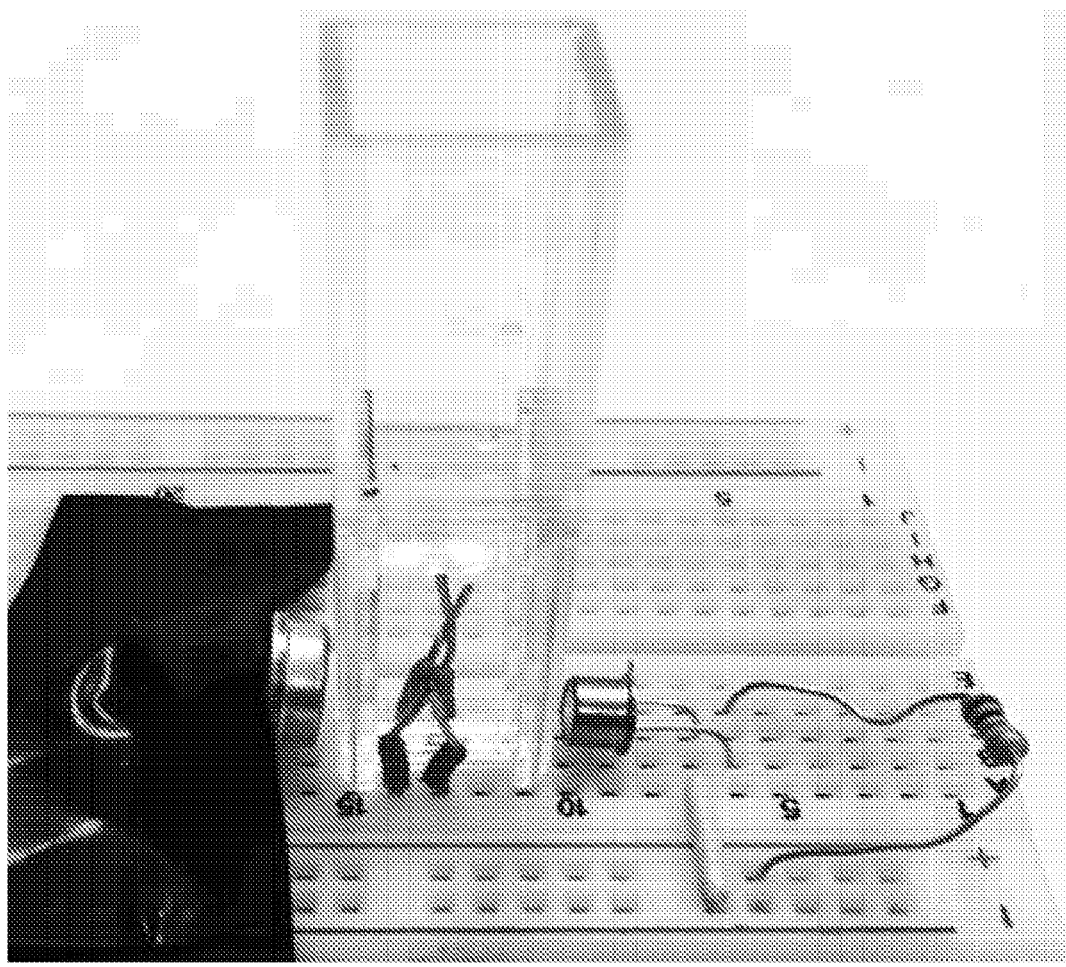
FIG. 21 depicts an embodiment of the disclosure in which a cuvette is centrifuged after application of the sample in a reaction vessel comprising a reaction surface.
Figure 22:
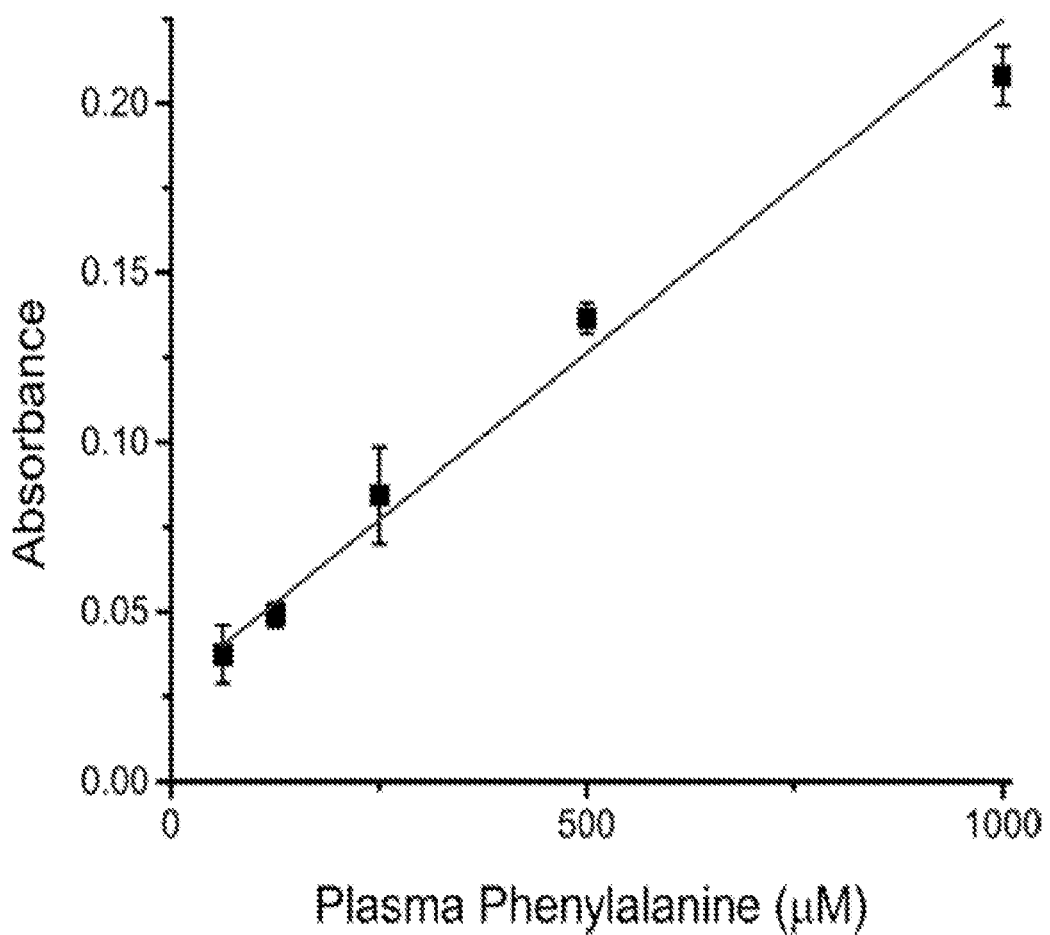
FIG. 22 depicts a linearized calibration curve of the phenylalanine detection achieved by use of the embodiment disclosed in FIG. 21.
Figure 23:
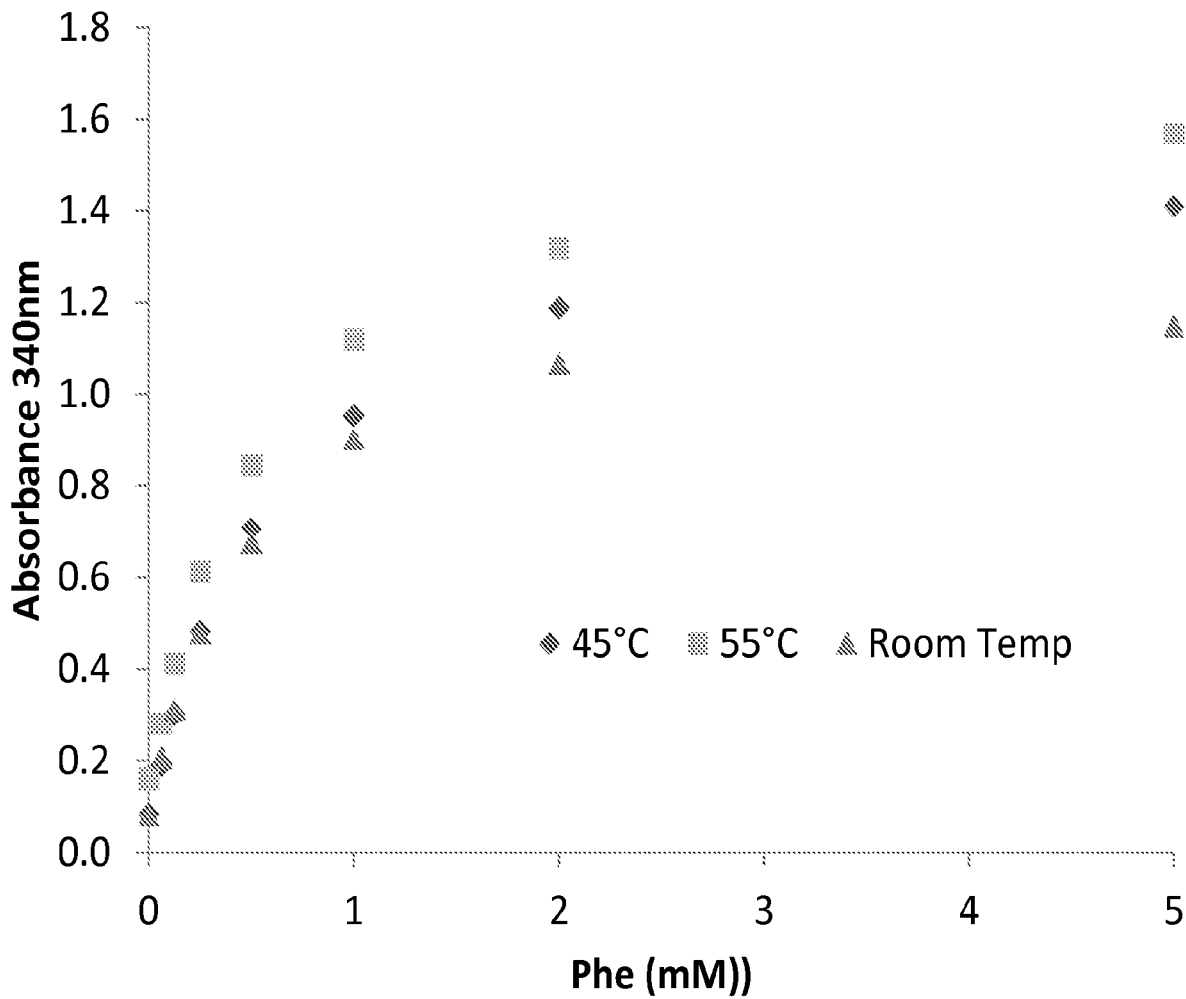
FIG. 23 depicts the temperature stability of the PheD enzyme. The enzyme was tested for activity at different temperatures in the assay buffer (200 mM Gly/KOH/KCl) in the presence of different concentrations of Phe ranging from 0 to 2.5 mM while keeping constant a 1 mM concentration of NAD. Initial activity was not affected by the temperature of the assay.
Figure 24:
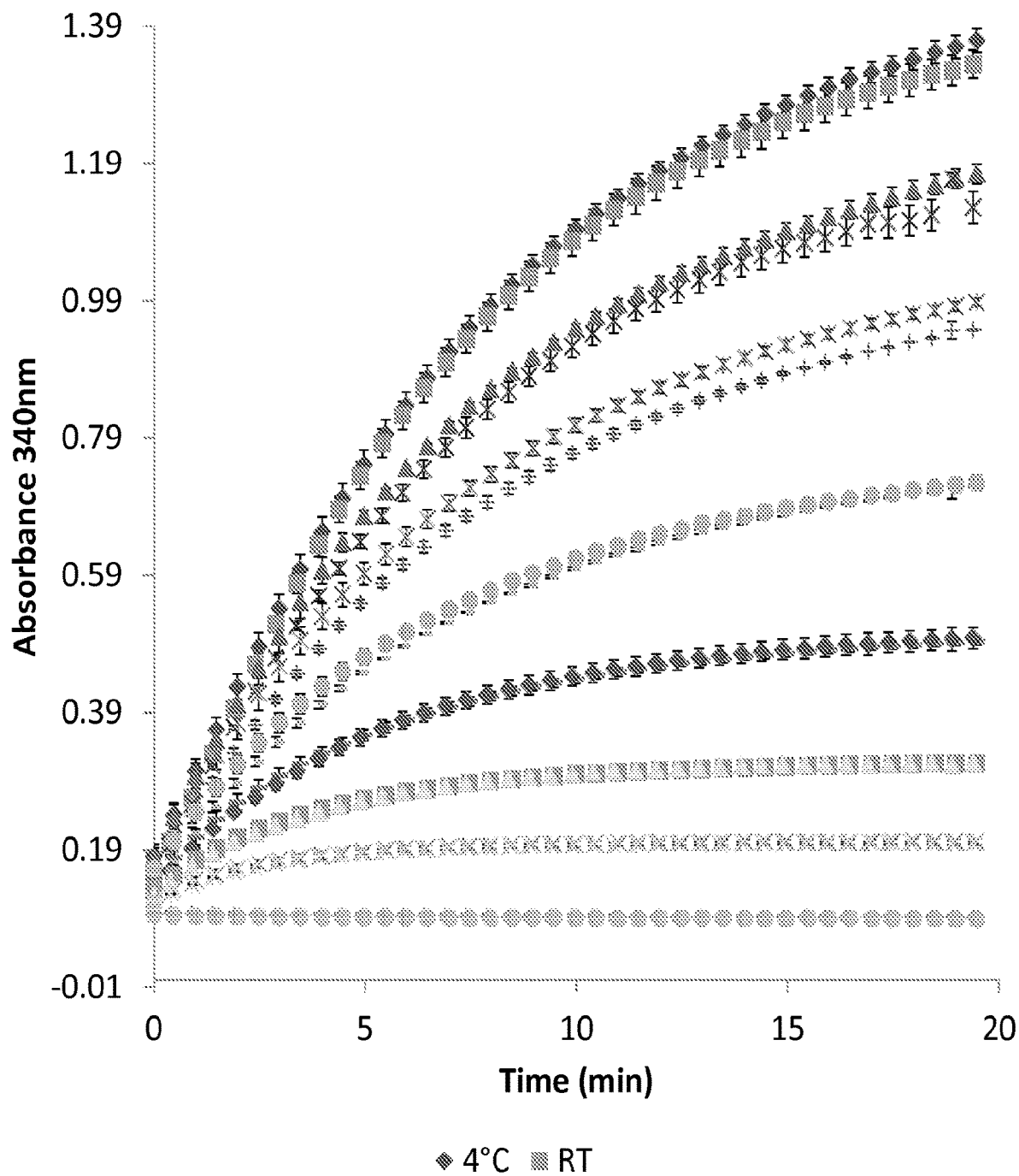
FIG. 24 depicts short term stability of the enzyme stored in 100 mM Tris pH 10.79 at 4° C. and room temperature was tested 3 weeks after purification. The results shows that there is no changes in the activity at different concentrations of Phe.
Figure 25:
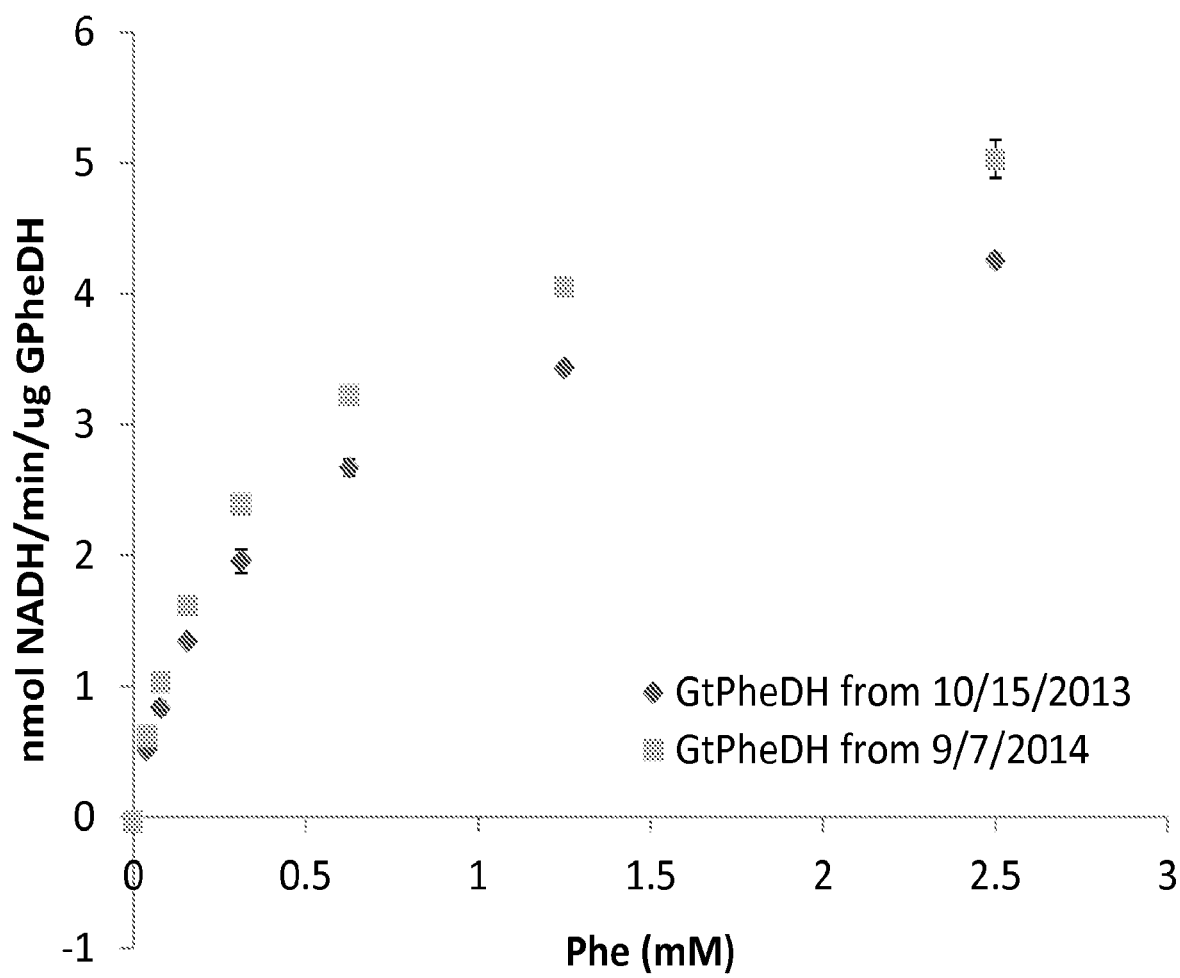
FIG. 25 depicts long term stability of the enzyme stored in 100 mM Tris pH 10.79 at 4° C. was tested over a year after purification. The results show no significant changes in activity were detected.
Figure 26:
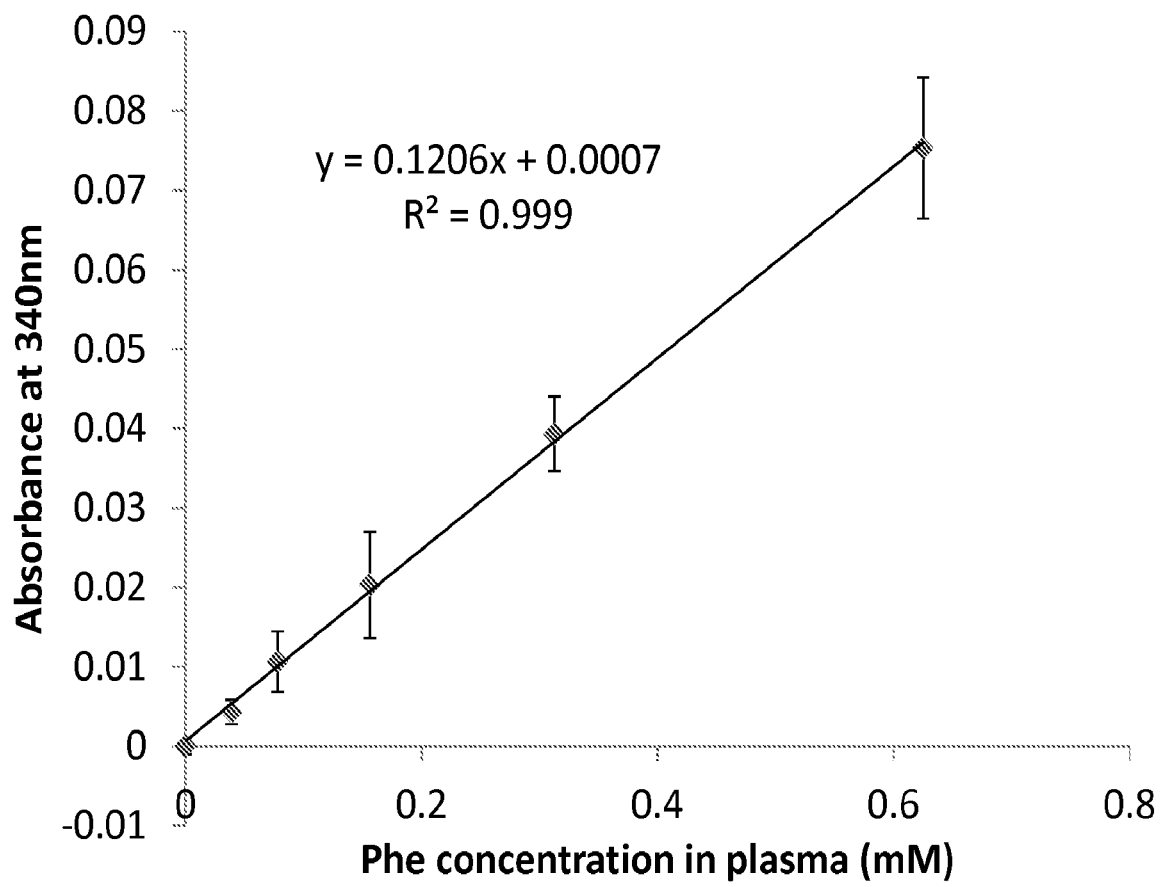
FIG. 26 depicts the linearity of the reaction catalyzed by the PheD enzyme. Unidentified normal plasma was spiked with different amounts of Phe to test the linearity of the reaction catalyzed by the enzyme in this biological matrix. Using 20 µl of spiked plasma in a 100 µl final volume of reaction we generated the shown standard curve. Proving that the range of expected concentrations in human plasma can easily be detected by this method.

In this embodiment, the NADH produced by the phenylalanine dehydrogenase was measured through use of absorbance. A 340 nm ultra-violet LED was powered and the light and shone through a cuvette containing plasma, the enzyme and the cofactor, NAD+. As NADH was produced, the amount of ultra-violet light absorbed would increase, resulting in less light reaching the photodiode. Less light reaching the photodiode resulted in lower generated current. This was actually constructed as seen in FIG. 21. It also produced the calibration curve as depicted in FIG. 22, which could detection plasma phenylalanine concentrations ranging from 60-1000 micromolar, with an error as low as 5%.

Figure 2B:
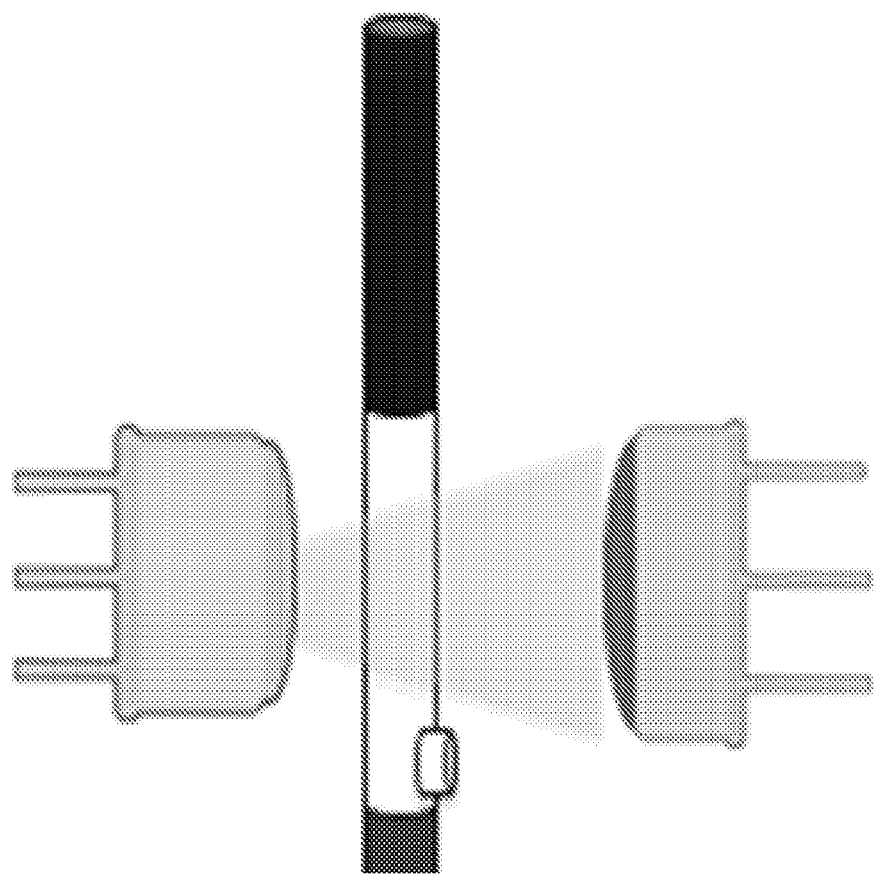
Figure 6:
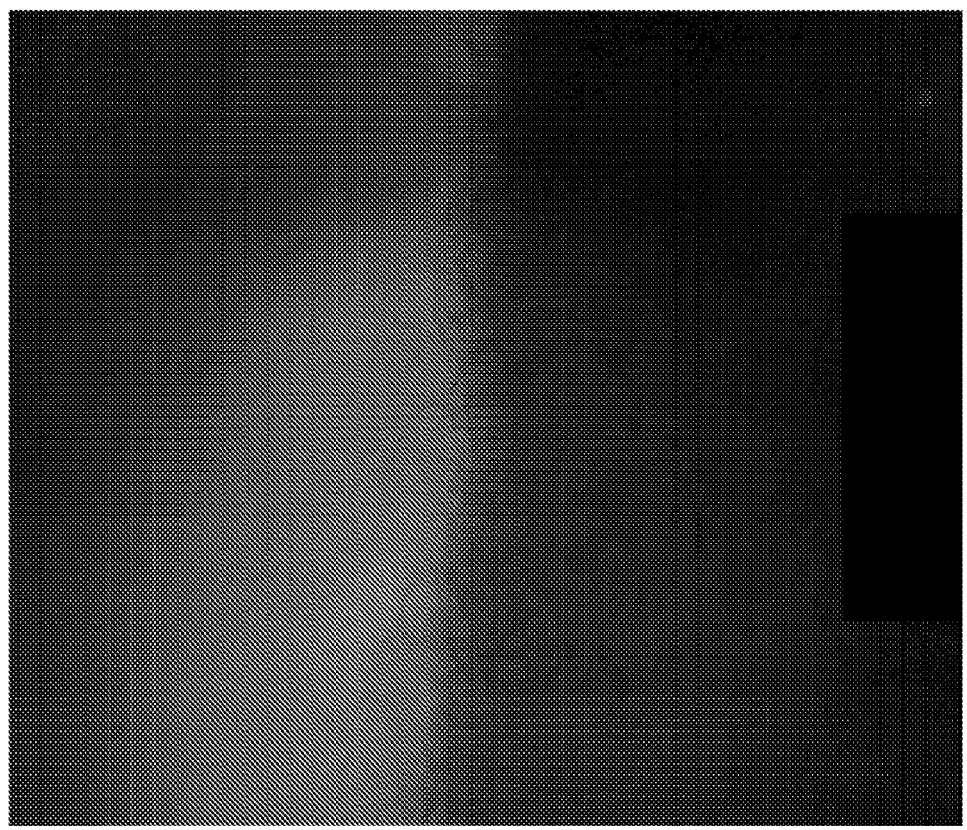
FIG. 6 depicts fluorescence microscopy of filter paper containing NADH on the left side and a control area on the right.
Figure 7:
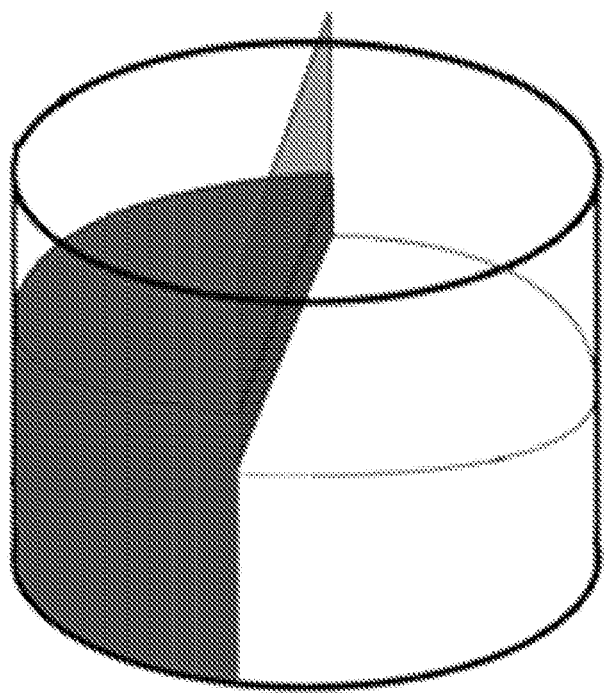
FIG. 7 depicts a bisected well for the extraction of amino acids.

Once the separation is complete, the disc can be placed in front of a compact fluorometer. The presence of the PheDh enzyme led to the creation of NADH (FIG. 2B), and because the disc is clear, the fluorometer took measurement without having the blood removed from the channel (FIG. 6).

Figure 3:
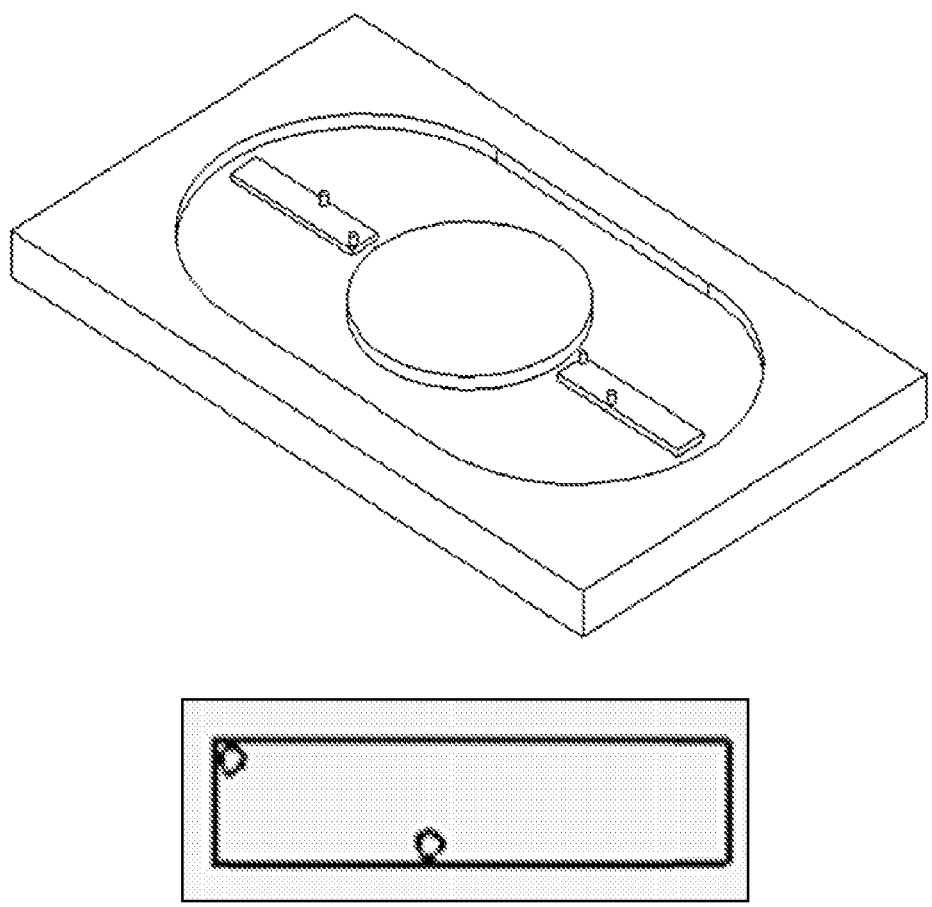
FIG. 3 depicts a centrifuge disc capable of containing and centrifuging blood samples.
Figure 4:
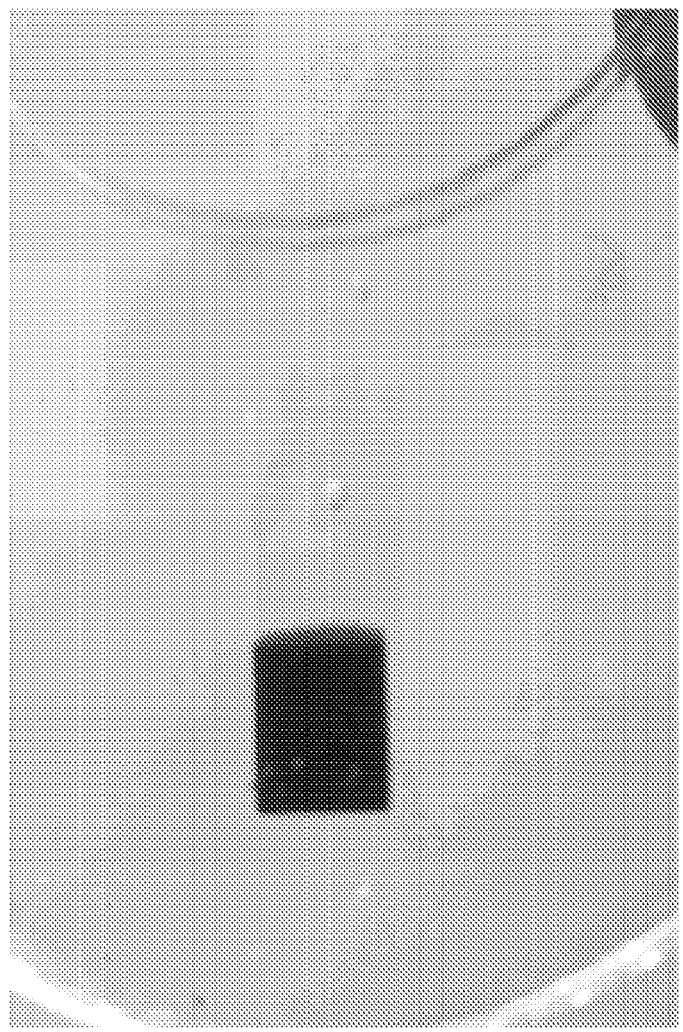
FIG. 4 depicts a centrifuge disc containing a blood sample after centrifugation.
Figure 5:
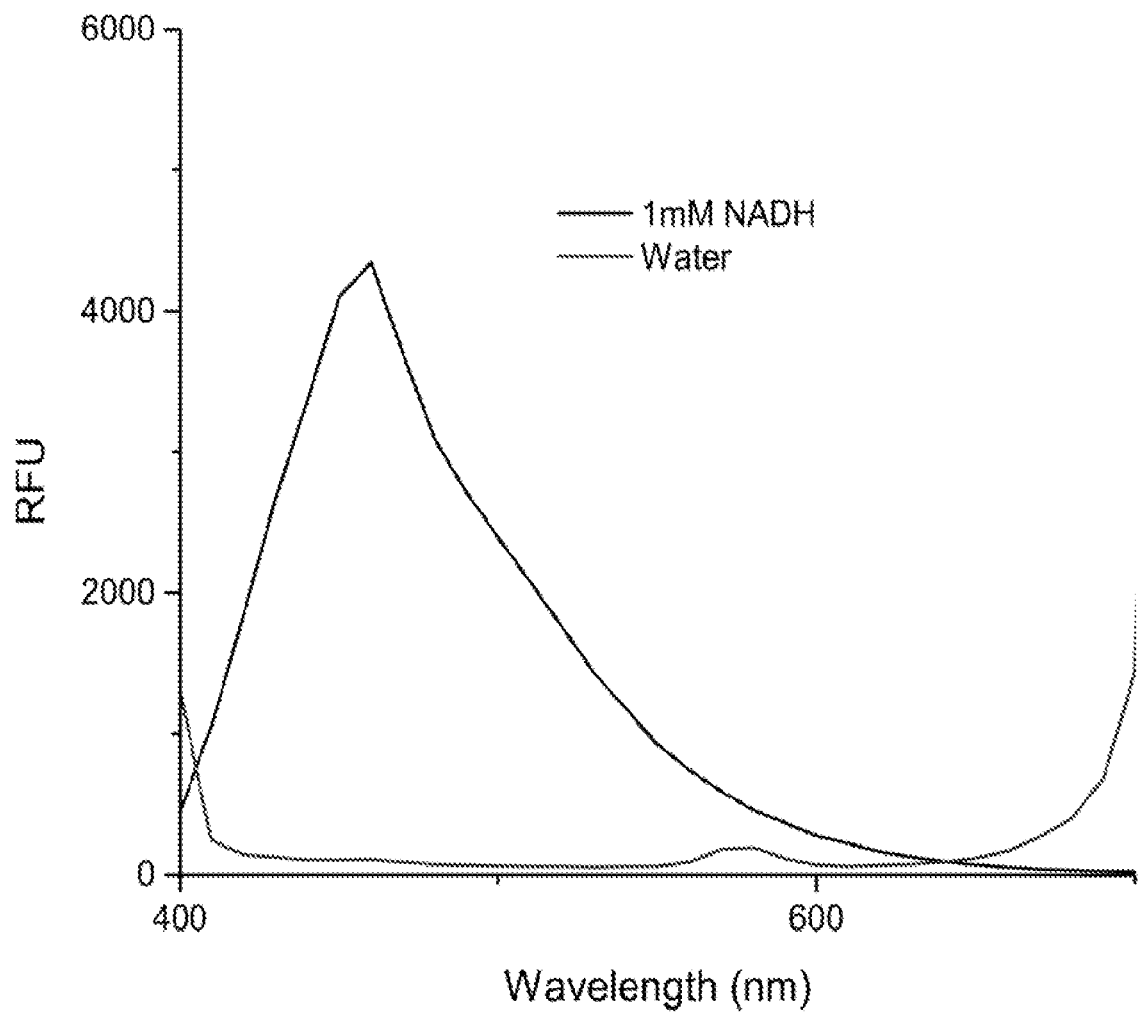
FIG. 5 depicts a graph showing the fluorescence peak of NADH.

An alternative embodiment of the centrifugation disc is one with two microfluidic channels in parallel on the same side of the disc, one containing PheDh enzyme and one without as a control A disc was designed to centrifuge blood samples. The mold of the disc was produced, and designed to be utilized with a brushless motor. The disc was produced using PDMS but can be made out of any optically transparent polymer material. As seen in the figures below, the disc could effectively separate whole blood into plasma and red blood cells within 5 minutes. (FIG. 3). Blood applied to the small hole filled both channels equally, and a larger counterweight will compensate for the increase in blood volume. After centrifugation, the blood plasma area of both channels was adjacent to each other, allowing for the fluorometer to measure both the enzyme and control channels at once (FIG. 4). Raw data appears in (FIG. 6). In either embodiment, the compact fluorometer took a fluorescent image after 5 minutes from centrifugation. The image was processed and the red, green and blue channels will be extracted. The presence of the PheDh enzyme led to the creation of NADH (FIG. 5).

Example 11—Validation of Paper Fluidic Compared with Conventional Detection

We will determine the accuracy, precision, and lower limit of quantification of the sensor. Progressively lower concentrations of the phenylalanine in whole blood will be examined to determine the lower limit of quantification (LLoQ) as compared to a blank sample. This will demonstrate the sensitivity of the sensor per accepted regulatory guidelines. From this point retrospective and prospective patient samples can be tested and correlated with the same blood phenylalanine tests being performed using conventional techniques. Demonstrating that the constructed near-patient device correlates with HPLC will prove the feasibility of using handheld fluorometry for the biochemical analysis. Patients with PKU will have blood drawn for their regular biochemical analysis. The samples will be de-identified and measured using the phenylalanine sensor. The measured concentration will then be compared to measurements taken using HPLC.

The developed Phe sensor's performance will be evaluated using the Centers for Disease Control and Prevention (CDC) report on good laboratory practices for biochemical genetic testing. A varied sampling of patient and 'normal' blood draws will be utilized to determine the accuracy, precision and lower limit of quantification (LLoQ).

Initially a calibration curve will be generated utilizing whole blood spiked 1200 mM Phe and serially diluted to produce a range of concentrations from 20 mM to 1200 mM Phe. The whole blood used will have its Phe levels measured using HPLC to determine its true value. Measurements will then be taken in quintuplicate of each serial dilution to produce the calibration curve.

De-identified samples obtained from patients coming for regular biochemical analysis will be split. One half of the sample will be analyzed conventionally by HPLC. The other half will be analyzed using the developed, handheld Phe sensor. The accuracy of the sensor will be determined using at least 32 patient and 'normal' samples. The measurements are expected to fall within 15% of the true value determined by HPLC. Additionally the correlation between the developed Phe sensor and HPLC will be determined.

The precision will be determined by testing the at least 3 patient samples of known Phe concentration at least 5 times within the same day. The same samples will then be tested several times over the course of 3 days with whole blood and over the course of 8 weeks with plasma samples as whole will not stay viable for multiple weeks. Finally the same samples will measured using at least 6 different operators. These precision measurements will determine the day-to-day, run-to-run, within-run and operator coefficient of variance.

The LLoQ will be determined by analyzing 5 different 'blank' samples in quintuplicate. The LLoQ will be defined as the lower concentration of Phe detected which produces a signal that is at least 4 standard deviations higher than the average signal of blank samples. This defined LLoQ will ensure that 99.5% of results at the LLoQ will be fit for use.

EQUIVALENTS

Those skilled in the art will recognize, or be able to ascertain using no more than routine experimentation, many equivalents to the specific embodiments of the disclosure described herein. The scope of the present disclosure is not intended to be limited to the above Description, but rather is as set forth in the following claims:

The invention claimed is:

1. A biosensor comprising:
a light source;
a light detector comprising a complementary metal-oxide semiconductor (CMOS) or a charged-coupled device camera; and
one or more reaction surfaces comprising at least one oxidizing agent lyophilized or desiccated onto the one or more reaction surfaces, and one or more metabolic enzymes or functional fragments thereof;
wherein at least one of the one or more metabolic enzymes or functional fragments thereof is at least 80% homologous to a phenylalanine dehydrogenase from *Geobacillus thermoglucosidasius*;
wherein the one or more reaction surfaces do not comprise and are not attached to an electrically conductive support; and
wherein the one or more reaction surfaces are free of an electron mediator; and
wherein the light source is positioned at a distance from at least one of the one or more reaction surfaces sufficient to irradiate the at least one of the one or more reaction surfaces and the light detector is positioned at a distance from the one or more reaction surfaces sufficient to collect irradiated light from the one or more reaction surfaces, and
wherein the biosensor further comprises a housing that contains at least a first fluid opening adjacent to and in fluid communication with a filter paper immediately adjacent to a microfluidic chamber that comprises at least one of the one or more reaction surfaces.

2. The biosensor of claim 1, wherein at least one of the one or more reaction surfaces further comprises at least one circuit connecting the light detector to a controller.

3. The biosensor of claim 1, wherein at least one of the one or more reaction surfaces is a filter paper that comprises the one or more metabolic enzymes.

4. The biosensor of claim 1, wherein the one or more reaction surfaces are free of one or more of the following: (i) uricase or a functional fragment thereof; (ii) a hydrogel comprising dextran or a derivative thereof; (iii) a bacterial cell; (iv) an electronic dipole configured for electrophoresis; and (v) 3, 4,-dihydroxybenzoic acid (3, 4-DHB).

5. The biosensor of claim 1, wherein the biosensor is at least 70% biologically active after about thirty days in storage at 4 degrees Celsius.

6. The biosensor of claim 1, wherein at least one of the one or more reaction surfaces comprises a volume from about 10 uL to about 100 µL of fluid.

7. The biosensor of claim 1, wherein the biosensor is free of an electron mediator selected from: thionine, o-phenylenediamine, methylene blue, and toluidine blue.

8. The biosensor of claim 1, wherein the at least one oxidizing agent is chosen from: NAD+ or FAD+.

9. The biosensor of claim 1, wherein at least one of the one or more reaction surfaces consists of a filter paper comprising a mixture of at least one lyophilized metabolic enzyme or functional fragment thereof and a sugar at a concentration from about 100 mM to about 400 mM.

10. The biosensor of claim 1 further comprising a hydrogel comprising alginate.

11. The biosensor of claim 10, wherein the alginate comprises a block polymer with a formula:

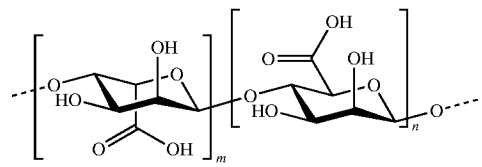

wherein m and n each are any positive integer.

12. The biosensor of claim 1, wherein the biosensor directly detects a reduction of the at least one oxidizing agent.

13. The biosensor of claim 1 further comprising whole blood at the one or more reaction surfaces.

14. The biosensor of claim 1 further comprising a Tris or glycine buffer in contact with the one or more metabolic enzymes or functional fragments thereof.

15. The biosensor of claim 1, wherein the biosensor is configured to compute a concentration of phenylalanine in a sample by comparing target data values to a calibration curve, the target data values captured by the light detector upon exposure of the sample to light by the light source, and the computation comprising:
determining a shortest distance from each target data value to a respective calibration point of the calibration curve, identifying two nearest points ($d_{ks}$ and $d_{kss}$) from the shortest distance from each target value to the respective calibration point, determining a concentration range ($d_c$) between the two nearest points, calculating a distance between x and y coordinates ($d_{xy}$) on a chromaticity space between the two nearest points, calculating a shortest distance from the space between the two nearest points to a line between the respective calibration points ($d_{sd}$), identifying $d_m$ as the largest of $d_{ks}$, $d_{kss}$, and $d_{sd}$, calculating a variation (v+/−) as a ratio of $(d_m d_c)/d_{xy}$, and determining a distance from one corresponding calibration point on the calibration curve to a point on a line where $d_{sd}$ is measured to arrive at the concentration of phenylalanine (Cm).

16. The biosensor of claim 15, wherein the step of determining a shortest distance from each target data value to a respective calibration point of the calibration curve comprises calculating $$d_k = \sqrt{(x_k - x)^2 + (y_k - y)^2},$$

where k is an integer from 1 to the number of stored x and y pairs (points) in the calibration curve, the step of determining a concentration range (de) between the two nearest points comprises calculating $d_C = |C_{ks} - C_{kss}|$, where $C_{ks}$ and $C_{kss}$ are the concentrations of the points corresponding to $d_{ks}$ and $d_{kss}$, the step of calculating a distance between x and y coordinates ($d_{xy}$) on a chromaticity space between the two nearest points comprises calculating $$d_{xy} = \sqrt{(x_{ks} - x_{kss})^2 + (y_{ks} - y_{kss})^2},$$

the step of calculating a shortest distance from the space between the two nearest points to a line between the respective calibration points ($d_{sd}$) comprises calculating $$d_{sd} = \frac{|(x_{kss} - x_{ks})(y_{ks} - y_m) - (x_{kss} - x_m)(y_{ks} - y_{kss})|}{\sqrt{(x_{ss} - x_{ks})^2 + (y_{kss} - y_{ks})^2}},$$

and the step of determining a distance from one corresponding calibration point on the calibration curve to a point on a line where $d_{sd}$ is measured to arrive at the concentration of phenylalanine (Cm) comprises calculating $$C_m = \frac{d_p d_c}{d_{xy}}, \text{ where } d_p = \sqrt{d_{ks}^2 - d_{sd}^2}.$$

17. A system comprising the biosensor of claim 1 and a computer processor in operable connection to at least one computer storage memory.

18. The system of claim 17, further comprising:
a digital display in operable connection to the light detector by an electrical circuit capable of carrying an electrical signal corresponding to a measurement of irradiated light from at least one of the one or more reaction surfaces to the digital display,
wherein the digital display is configured to display concentration value of an amino acid in a sample when the light detector collects irradiated light from the at least one of the one or more reaction surfaces after a time period sufficient for the at least one metabolic enzyme to catalyze the oxidation of its amino acid substrate at the at least one of the one or more reaction surfaces.

19. The system of claim 17, wherein the at least one of the one or more metabolic enzymes or functional fragments thereof that is at least 80% homologous to a phenylalanine dehydrogenase from *Geobacillus thermoglucosidasius* is immobilized to at least one of the one or more reaction surfaces with one or a plurality of sugar molecules.

20. A kit comprising (i) the biosensor of claim 1; and (ii) a set of instructions optionally accessible remotely through an electronic medium;
wherein at least one of the one or more reaction surfaces comprises a test strip or filter paper contained within a removable housing having at least one fluid inlet.

21. A method of quantifying a concentration of one or more amino acids in sample of bodily fluid of a subject comprising contacting a sample of bodily fluid to the biosensor of claim 1; and exposing the sample of bodily fluid to light emitted from the light source of the biosensor prior to detecting the light emitted from the one or more reaction surfaces of the biosensor.

22. The method of claim 21, wherein the step of contacting comprises exposing the sample of bodily fluid of a subject to the one or more reaction surfaces of the biosensor for a time period sufficient to allow oxidation of at least one amino acid in the sample of bodily fluid by the one or more metabolic enzymes or functional fragments thereof of the biosensor.

23. The method of claim 21, wherein the sample of bodily fluid contains whole blood or serum from a subject.

24. A method of diagnosing a metabolic disease in a subject comprising: contacting a sample of bodily fluid to the biosensor of claim 1;
quantifying one or more concentration values of amino acids in the sample using the biosensor;
comparing the one or more concentration values of amino acids in the sample to a threshold value of amino acid concentration identified as being in a healthy range; and identifying the subject as having a metabolic disease if the one or more concentration values of amino acids in the sample exceed or fall below the threshold value.

25. The method of claim 24, wherein the metabolic disease is chosen from at least one or a combination of: phenylketonuria, hyperammonemia, and maple syrup urine disease.

* * * * *

SEQUENCE LISTING

<160> NUMBER OF SEQ ID NOS: 10

<210> SEQ ID NO 1
<211> LENGTH: 378
<212> TYPE: PRT
<213> ORGANISM: Geobacillus thermoglucosidiasius

<400> SEQUENCE: 1

```
Met Asn Thr Val Thr Asn Gln Trp Lys Ala Val Asp Ile Phe Thr Gln
1               5                   10                  15

Ile Arg Asp His Glu Gln Val Val Phe Cys Asn Asp Lys Asn Thr Gly
            20                  25                  30

Leu Lys Ala Ile Ile Ala Ile His Asp Thr Thr Leu Gly Pro Ala Leu
        35                  40                  45

Gly Gly Cys Arg Met Tyr Pro Tyr Ala Thr Val Glu Asp Ala Leu Phe
    50                  55                  60

Asp Val Leu Arg Leu Ser Lys Gly Met Thr Tyr Lys Cys Leu Ala Ala
65                  70                  75                  80

Asp Val Asp Phe Gly Gly Gly Lys Ala Val Ile Ile Gly Asp Pro His
                85                  90                  95

Lys Asp Lys Thr Pro Glu Leu Phe Arg Ala Phe Gly Gln Phe Val Glu
            100                 105                 110

Ser Leu Asn Gly Arg Phe Tyr Thr Gly Thr Asp Met Gly Thr Thr Pro
        115                 120                 125
```

```
Asp Asp Phe Val His Ala Met Lys Glu Thr Asn Cys Ile Gly Val
        130                 135                 140

Pro Glu Glu Tyr Gly Gly Ser Gly Asp Ser Ser Val Pro Thr Ala Leu
145                 150                 155                 160

Gly Val Ile Tyr Gly Ile Gln Ala Thr Asn Lys Val Ile Trp Gly Ser
                165                 170                 175

Asp Glu Leu His Gly Lys Thr Tyr Ala Ile Gln Gly Leu Gly Lys Val
                180                 185                 190

Gly Arg Lys Val Ala Glu Arg Leu Leu Lys Glu Gly Ala Asp Leu Tyr
        195                 200                 205

Val Cys Asp Ile His Pro Thr Ala Ile Glu Ala Ile Val Ser Tyr Ala
        210                 215                 220

Lys Lys Leu Gly Ala Asn Val Lys Val Val Gln Gly Thr Glu Ile Tyr
225                 230                 235                 240

Arg Thr Asp Ala Asp Ile Phe Val Pro Cys Ala Phe Gly Asn Val Val
                245                 250                 255

Asn Asp Asn Thr Ile His Val Leu Lys Val Lys Ala Ile Val Gly Ser
                260                 265                 270

Ala Asn Asn Gln Leu Leu Asp Val Arg His Gly Gln Leu Leu Lys Glu
        275                 280                 285

Lys Gly Ile Leu Tyr Ala Pro Asp Tyr Ile Val Asn Ala Gly Gly Leu
        290                 295                 300

Ile Gln Val Ala Asp Glu Leu Tyr Gly Leu Asn Lys Glu Arg Val Leu
305                 310                 315                 320

Gln Lys Thr Lys Ala Ile Tyr Ser Thr Leu Leu His Ile Tyr Ser Arg
                325                 330                 335

Ala Glu Ala Asp His Ile Thr Thr Ile Glu Ala Ala Asn Arg Phe Cys
                340                 345                 350

Glu Glu Arg Leu Gln Gln Arg Ser Arg Arg Asn Asp Phe Phe Thr His
        355                 360                 365

Arg Lys Gln Pro Lys Trp Asp Ile Arg Arg
        370                 375
```

<210> SEQ ID NO 2
<211> LENGTH: 366
<212> TYPE: PRT
<213> ORGANISM: Thermoactinomyces intermedius
<400> SEQUENCE: 2

```
Met Arg Asp Val Phe Glu Met Met Asp Arg Tyr Gly His Glu Gln Val
1               5                   10                  15

Ile Phe Cys Arg His Pro Gln Thr Gly Leu Lys Ala Ile Ala Leu
                20                  25                  30

His Asn Thr Thr Ala Gly Pro Ala Leu Gly Gly Cys Arg Met Ile Pro
            35                  40                  45

Tyr Ala Ser Thr Asp Glu Ala Leu Glu Asp Val Leu Arg Leu Ser Lys
    50                  55                  60

Gly Met Thr Tyr Lys Cys Ser Leu Ala Asp Val Asp Phe Gly Gly Gly
65                  70                  75                  80

Lys Met Val Ile Ile Gly Asp Pro Lys Lys Asp Lys Ser Pro Glu Leu
                85                  90                  95

Phe Arg Val Ile Gly Arg Phe Val Gly Gly Leu Asn Gly Arg Phe Tyr
                100                 105                 110

Thr Gly Thr Asp Met Gly Thr Asn Pro Glu Asp Phe Val His Ala Ala
```

```
              115                 120                 125
Arg Glu Ser Lys Ser Phe Ala Gly Leu Pro Lys Ser Tyr Gly Gly Lys
    130                 135                 140

Gly Asp Thr Ser Ile Pro Thr Ala Leu Gly Val Phe His Gly Met Arg
145                 150                 155                 160

Ala Thr Ala Arg Phe Leu Trp Gly Thr Asp Gln Leu Lys Gly Arg Val
                165                 170                 175

Val Ala Ile Gln Gly Val Gly Lys Val Gly Glu Arg Leu Leu Gln Leu
            180                 185                 190

Leu Val Glu Val Gly Ala Tyr Cys Lys Ile Ala Asp Ile Asp Ser Val
        195                 200                 205

Arg Cys Glu Gln Leu Lys Glu Lys Tyr Gly Asp Lys Val Gln Leu Val
    210                 215                 220

Asp Val Asn Arg Ile His Lys Glu Ser Cys Asp Ile Phe Ser Pro Cys
225                 230                 235                 240

Ala Lys Gly Gly Val Val Asn Asp Asp Thr Ile Asp Glu Phe Arg Cys
                245                 250                 255

Leu Ala Ile Val Gly Ser Ala Asn Asn Gln Leu Val Glu Asp Arg His
            260                 265                 270

Gly Ala Leu Leu Gln Lys Arg Ser Ile Cys Tyr Ala Pro Asp Tyr Leu
        275                 280                 285

Val Asn Ala Gly Gly Leu Ile Gln Val Ala Asp Glu Leu Glu Gly Phe
    290                 295                 300

His Glu Glu Arg Val Leu Ala Lys Thr Glu Ala Ile Tyr Asp Met Val
305                 310                 315                 320

Leu Asp Ile Phe His Arg Ala Lys Asn Glu Asn Ile Thr Thr Cys Glu
                325                 330                 335

Ala Ala Asp Arg Ile Val Met Glu Arg Leu Lys Lys Leu Thr Asp Ile
            340                 345                 350

Arg Arg Ile Leu Leu Glu Asp Pro Arg Asn Ser Ala Arg Arg
        355                 360                 365

<210> SEQ ID NO 3
<211> LENGTH: 38
<212> TYPE: DNA
<213> ORGANISM: Artificial Sequence
<220> FEATURE:
<223> OTHER INFORMATION: 5' Primer for PheDH

<400> SEQUENCE: 3
tgtgctagca tgaataccgt taccaatcag tggaaagc                           38

<210> SEQ ID NO 4
<211> LENGTH: 32
<212> TYPE: DNA
<213> ORGANISM: Artificial Sequence
<220> FEATURE:
<223> OTHER INFORMATION: 3' primer for PheDH

<400> SEQUENCE: 4
ctcgagtcat taccggcgga tatcccactt cg                                 32

<210> SEQ ID NO 5
<211> LENGTH: 5236
<212> TYPE: DNA
<213> ORGANISM: Artificial Sequence
<220> FEATURE:
<223> OTHER INFORMATION: pET24a Vector Sequence
```

<400> SEQUENCE: 5

```
atccggatat agttcctcct ttcagcaaaa aaccccctcaa gacccgttta gaggccccaa      60
ggggttatgc tagttattgc tcagcggtgg cagcagccaa ctcagcttcc tttcgggctt     120
tgttagcagc cggatctcag tggtggtggt ggtggtgctc gagtgcggcc gcaagcttgt     180
cgacggagct cgaattcgga tcctagaggg gaattgttat ccgctcacaa ttcccctata     240
gtgagtcgta ttaatttcgc gggatcgaga tctcgatcct ctacgccgga cgcatcgtgg     300
ccggcatcac cggcgccaca ggtgcggttg ctggcgccta tcgccgac atcaccgatg     360
gggaagatcg ggctcgccac ttcgggctca tgagcgcttg tttcggcgtg ggtatggtgg     420
caggccccgt ggcggggga ctgttgggcg ccatctcctt gcatgcacca ttccttgcgg     480
cggcggtgct caacggcctc aacctactac tgggctgctt cctaatgcag gagtcgcata     540
agggagagcg tcgagatccc ggacaccatc gaatggcgca aaacctttcg cggtatggca     600
tgatagcgcc cggaagagag tcaattcagg gtggtgaatg tgaaaccagt aacgttatac     660
gatgtcgcag agtatgccgg tgtctcttat cagaccgttt cccgcgtggt gaaccaggcc     720
agccacgttt ctgcgaaaac gcgggaaaaa gtggaagcgg cgatggcgga gctgaattac     780
attcccaacc gcgtggcaca caactggcg gcaaacagt cgttgctgat tggcgttgcc     840
acctccagtc tggccctgca cgcgccgtcg caaattgtcg cggcgattaa atctcgcgcc     900
gatcaactgg gtgccagcgt ggtggtgtcg atggtagaac gaagcggcgt cgaagcctgt     960
aaagcggcgg tgcacaatct ctcgcgcaa cgcgtcagtg ggctgatcat taactatccg    1020
ctggatgacc aggatgccat tgctgtgaa gctgcctgca ctaatgttcc ggcgttattt    1080
cttgatgtct ctgaccagac acccatcaac agtattattt tctcccatga agacggtacg    1140
cgactgggcg tggagcatct ggtcgcattg ggtcaccagc aaatcgcgct gttagcgggc    1200
ccattaagtt ctgtctcggc gcgtctgcgt ctggctggct ggcataaata tctcactcgc    1260
aatcaaattc agccgatagc ggaacgggaa ggcgactgga gtgccatgtc cggttttcaa    1320
caaaccatgc aaatgctgaa tgagggcatc gttcccactg cgatgctggt tgccaacgat    1380
cagatgcgc tgggcgcaat gcgcgccatt accgagtccg gctgcgcgt tggtgcggat    1440
atctcggtag tgggatacga cgataccgaa gacagctcat gttatatccc gccgttaacc    1500
accatcaaac aggatttttcg cctgctgggg caaaccagcg tggaccgctt gctgcaactc    1560
tctcagggcc aggcggtgaa gggcaatcag ctgttgcccg tctcactggt gaaagaaaa    1620
accaccctgg cgcccaatac gcaaaccgcc tctccccgcg cgttggccga ttcattaatg    1680
cagctggcac gacaggtttc ccgactggaa agcgggcagt gagcgcaacg caattaatgt    1740
aagttagctc actcattagg caccgggatc tcgaccgatg cccttgagag ccttcaaccc    1800
agtcagctcc ttccggtggg cgcggggcat gactatcgtc gccgcactta tgactgtctt    1860
ctttatcatg caactcgtag gacaggtgcc ggcagcgctc tgggtcattt tcggcgagga    1920
ccgctttcgc tggagcgcga cgatgatcgg cctgtcgctt gcggtattcg gaatcttgca    1980
cgccctcgct caagccttcg tcactggtcc cgccaccaaa cgtttcggcg agaagcaggc    2040
cattatcgcc ggcatggcgg ccccacgggt gcgcatgatc gtgctcctgt cgttgaggac    2100
ccggctaggc tggcggggtt gccttactgg ttagcagaat gaatcaccga tacgcgagcg    2160
aacgtgaagc gactgctgct gcaaaacgtc tgcgacctga gcaacaacat gaatggtctt    2220
cggtttccgt gtttcgtaaa gtctggaaac gcggaagtca gcgccctgca ccattatgtt    2280
ccggatctgc atcgcaggat gctgctggct accctgtgga acacctacat ctgtattaac    2340
```

```
gaagcgctgg cattgaccct gagtgatttt tctctggtcc cgccgcatcc ataccgccag    2400
ttgtttaccc tcacaacgtt ccagtaaccg ggcatgttca tcatcagtaa cccgtatcgt    2460
gagcatcctc tctcgtttca tcggtatcat taccccatg aacagaaatc cccttacac     2520 ggaggcatca gtgaccaaac aggaaaaaac cgcccttaac atgggcccgct ttatcagaag  2580 ccagacatta acgcttctgg agaaactcaa cgagctggac gcggatgaac aggcagacat   2640
ctgtgaatcg cttcacgacc acgctgatga gctttaccgc agctgcctcg cgcgtttcgg   2700
tgatgacggt gaaaacctct gacacatgca gctcccggag acggtcacag cttgtctgta   2760
agcggatgcc gggagcagac aagcccgtca gggcgcgtca gcgggtgttg gcgggtgtcg   2820 ggcgcagcc atgacccagt cacgtagcga tagcggagtg tatactggct taactatgcg    2880
gcatcagagc agattgtact gagagtgcac catatatgcg gtgtgaaata ccgcacagat   2940
gcgtaaggag aaaataccgc atcaggcgct cttccgcttc ctcgctcact gactcgctgc   3000
gctcggtcgt tcggctgcgg cgagcggtat cagctcactc aaaggcggta atacggttat   3060
ccacagaatc aggggataac gcaggaaaga acatgtgagc aaaaggccag caaaaggcca   3120
ggaaccgtaa aaaggccgcg ttgctggcgt ttttccatag gctccgcccc cctgacgagc   3180
atcacaaaaa tcgacgctca agtcagaggt ggcgaaaccc gacaggacta taaagatacc   3240
aggcgtttcc ccctggaagc tccctcgtgc gctctcctgt tccgaccctg ccgcttaccg   3300
gatacctgtc cgcctttctc ccttcgggaa gcgtggcgct ttctcatagc tcacgctgta   3360
ggtatctcag ttcggtgtag tcgttcgct ccaagctggg ctgtgtgcac gaacccccg     3420 ttcagcccga ccgctgcgcc ttatccggta actatcgtct tgagtccaac ccggtaagac   3480
acgacttatc gccactggca gcagccactg gtaacaggat tagcagagcg aggtatgtag   3540
gcggtgctac agagttcttg aagtggtggc ctaactacgg ctacactaga aggacagtat   3600
ttggtatctg cgctctgctg aagccagtta ccttcggaaa aagagttggt agctcttgat   3660
ccggcaaaca aaccaccgct ggtagcggtg gttttttttgt ttgcaagcag cagattacgc   3720
gcagaaaaaa aggatctcaa gaagatcctt tgatctttc tacggggtct gacgctcagt   3780
ggaacgaaaa ctcacgttaa gggattttgg tcatgaacaa taaaactgtc tgcttacata   3840
aacagtaata caaggggtgt tatgagccat attcaacggg aaacgtcttg ctctaggccg   3900
cgattaaatt ccaacatgga tgctgattta tatgggtata aatgggctcg cgataatgtc   3960
gggcaatcag gtgcgacaat ctatcgattg tatgggaagc ccgatgcgcc agagttgttt   4020
ctgaaacatg gcaaaggtag cgttgccaat gatgttacag atgagatggt cagactaaac   4080
tggctgacgg aatttatgcc tcttccgacc atcaagcatt ttatccgtac tcctgatgat   4140
gcatggttac tcaccactgc gatccccggg aaaacagcat tccaggtatt agaagaatat   4200
cctgattcag gtgaaaatat tgttgatgcg ctggcagtgt tcctgcgccg gttgcattcg   4260
attcctgttt gtaattgtcc ttttaacagc gatcgcgtat ttcgtctcgc tcaggcgcaa   4320
tcacgaatga ataacggttt ggttgatgcg agtgattttg atgacgagcg taatggctgg   4380
cctgttgaac aagtctggaa agaaatgcat aaacttttgc cattctcacc ggattcagtc   4440
gtcactcatg gtgatttctc acttgataac cttattttg acgaggggaa attaataggt    4500
tgtattgatg ttggacgagt cggaatcgca gaccgatacc aggatcttgc catcctatgg   4560
aactgcctcg gtgagttttc tccttcatta cagaaacggc ttttcaaaa atatggtatt    4620 gataatcctg atatgaataa attgcagttt catttgatgc tcgatgagtt tttctaagaa   4680
```

| | |
|---|---|
| ttaattcatg agcggataca tatttgaatg tatttagaaa aataaacaaa tagggggttcc | 4740 |
| gcgcacattt ccccgaaaag tgccacctga aattgtaaac gttaatattt tgttaaaatt | 4800 |
| cgcgttaaat ttttgttaaa tcagctcatt ttttaaccaa taggccgaaa tcggcaaaat | 4860 |
| cccttataaa tcaaaagaat agaccgagat agggttgagt gttgttccag tttggaacaa | 4920 |
| gagtccacta ttaaagaacg tggactccaa cgtcaaaggg cgaaaaaccg tctatcaggg | 4980 |
| cgatggccca ctacgtgaac catcacccta atcaagtttt tggggtcga ggtgccgtaa | 5040 |
| agcactaaat cggaaccca agggagccc ccgatttaga gcttgacggg gaaagccggc | 5100 |
| gaacgtggcg agaaaggaag ggaagaaagc gaaaggagcg ggcgctaggg cgctggcaag | 5160 |
| tgtagcggtc acgctgcgcg taaccaccac acccgccgcg cttaatgcgc cgctacaggg | 5220 |
| cgcgtcccat tcgcca | 5236 |

<210> SEQ ID NO 6
<211> LENGTH: 5368
<212> TYPE: DNA
<213> ORGANISM: Artificial Sequence
<220> FEATURE:
<223> OTHER INFORMATION: pET28a vector sequence

<400> SEQUENCE: 6

| | |
|---|---|
| atccggatat agttcctcct ttcagcaaaa aaccccctcaa gacccgttta gaggccccaa | 60 |
| ggggttatgc tagttattgc tcagcggtgg cagcagccaa ctcagcttcc tttcgggctt | 120 |
| tgttagcagc cggatctcag tggtggtggt ggtggtgctc gagtgcggcc gcaagcttgt | 180 |
| cgacggagct cgaattcgga tccgcgaccc atttgctgtc caccagtcat gctagccata | 240 |
| tggctgccgc gcggcaccag gccgctgctg tgatgatgat gatgatggct gctgcccatg | 300 |
| gtatatctcc ttcttaaagt taaacaaaat tatttctaga ggggaattgt tatccgctca | 360 |
| caattcccct atagtgagtc gtattaattt cgcgggatcg agatctcgat cctctacgcc | 420 |
| ggacgcatcg tggccggcat caccggcgcc acaggtgcgg ttgctggcgc ctatatcgcc | 480 |
| gacatcaccg atggggaaga tcgggctcgc cacttcgggc tcatgagcgc ttgtttcggc | 540 |
| gtgggtatgg tggcaggccc cgtggccggg ggactgttgg cgccatctc cttgcatgca | 600 |
| ccattccttg cggcggcggt gctcaacggc ctcaacctac tactgggctg cttcctaatg | 660 |
| caggagtcgc ataagggaga gcgtcgagat cccggacacc atcgaatggc gcaaaacctt | 720 |
| tcgcggtatg gcatgatagc gcccggaaga gagtcaattc agggtggtga atgtgaaacc | 780 |
| agtaacgtta tacgatgtcg cagagtatgc cggtgtctct tatcagaccg tttcccgcgt | 840 |
| ggtgaaccag gccagccacg tttctgcgaa aacgcgggaa aaagtggaag cggcgatggc | 900 |
| ggagctgaat tacattccca accgcgtggc acaacaactg gcgggcaaac agtcgttgct | 960 |
| gattggcgtt gccacctcca gtctggccct gcacgcgccg tcgcaaattg tcgcggcgat | 1020 |
| taaatctcgc gccgatcaac tgggtgccag cgtggtggtg tcgatggtag aacgaagcgg | 1080 |
| cgtcgaagcc tgtaaagcgg cggtgcacaa tcttctcgcg caacgcgtca gtgggctgat | 1140 |
| cattaactat ccgctggatg accaggatgc cattgctgtg gaagctgcct gcactaatgt | 1200 |
| tccggcgtta tttcttgatg tctctgacca gacacccatc aacagtatta ttttctccca | 1260 |
| tgaagacggt acgcgactgg gcgtggagca tctggtcgca ttgggtcacc agcaaatcgc | 1320 |
| gctgttagcg ggcccattaa gttctgtctc ggcgcgtctg cgtctggctg gctggcataa | 1380 |
| atatctcact cgcaatcaaa ttcagccgat agcggaacgg gaaggcgact ggagtgccat | 1440 |
| gtccggtttt caacaaacca tgcaaatgct gaatgagggc atcgttccca ctgcgatgct | 1500 |

```
ggttgccaac gatcagatgg cgctgggcgc aatgcgcgcc attaccgagt ccgggctgcg    1560
cgttggtgcg gatatctcgg tagtgggata cgacgatacc gaagacagct catgttatat    1620
cccgccgtta accaccatca aacaggattt tcgcctgctg gggcaaacca gcgtggaccg    1680
cttgctgcaa ctctctcagg gccaggcggt gaagggcaat cagctgttgc ccgtctcact    1740
ggtgaaaaga aaaccaccc tggcgcccaa tacgcaaacc gcctctcccc gcgcgttggc     1800
cgattcatta atgcagctgg cacgacaggt ttcccgactg gaaagcgggc agtgagcgca    1860
acgcaattaa tgtaagttag ctcactcatt aggcaccggg atctcgaccg atgcccttga    1920
gagccttcaa cccagtcagc tccttccggt gggcgcgggg catgactatc gtcgccgcac    1980
ttatgactgt cttctttatc atgcaactcg taggacaggt gccggcagcg ctctgggtca    2040
ttttcggcga ggaccgcttt cgctggagcg cgacgatgat cggcctgtcg cttgcggtat    2100
tcggaatctt gcacgccctc gctcaagcct tcgtcactgg tcccgccacc aaacgtttcg    2160
gcgagaagca ggccattatc gccggcatgg cggcccacg ggtgcgcatg atcgtgctcc     2220
tgtcgttgag gacccggcta ggctggcggg gttgccttac tggttagcag aatgaatcac    2280
cgatacgcga cgaacgtga agcgactgct gctgcaaaac gtctgcgacc tgagcaacaa     2340
catgaatggt cttcggtttc cgtgtttcgt aaagtctgga aacgcggaag tcagcgccct    2400
gcaccattat gttccggatc tgcatcgcag gatgctgctg gctaccctgt gaacaccta     2460 catctgtatt aacgaagcgc tggcattgac cctgagtgat ttttctctgg tcccgccgca    2520
tccataccgc cagttgttta ccctcacaac gttccagtaa ccgggcatgt tcatcatcag    2580
taacccgtat cgtgagcatc ctctctcgtt tcatcggtat cattaccccc atgaacagaa    2640 atcccccctta cacggaggca tcagtgacca aacaggaaaa aaccgcccctt aacatggccc   2700 gctttatcag aagccagaca ttaacgcttc tggagaaact caacgagctg gacgcggatg    2760
aacaggcaga catctgtgaa tcgcttcacg accacgctga tgagctttac cgcagctgcc    2820
tcgcgcgttt cggtgatgac ggtgaaaacc tctgacacat gcagctcccg gagacggtca    2880
cagcttgtct gtaagcggat gccgggagca gacaagcccg tcaggcgcg tcagcgggtg     2940 ttggcgggtg tcggggcgca gccatgaccc agtcacgtag cgatagcgga gtgtatactg    3000
gcttaactat gcggcatcag agcagattgt actgagagtg caccatatat gcggtgtgaa    3060
ataccgcaca gatgcgtaag gagaaaatac cgcatcaggc gctcttccgc ttcctcgctc    3120
actgactcgc tgcgctcggt cgttcggctg cggcgagcgg tatcagctca ctcaaaggcg    3180
gtaatacggt tatccacaga atcagggga acgcaggaa agaacatgtg agcaaaaggc      3240
cagcaaaagg ccaggaaccg taaaaaggcc gcgttgctgg cgttttccca taggctccgc    3300 cccccctgacg agcatcacaa aaatcgacgc tcaagtcaga ggtggcgaaa cccgacagga   3360
ctataaagat accaggcgtt tcccctggaa gctccctcg tgcgctctcc tgttccgacc     3420
ctgccgctta ccggatacct gtccgccttt ctcccttcgg gaagcgtggc gctttctcat    3480
agctcacgct gtaggtatct cagttcggtg taggtcgttc gctccaagct gggctgtgtg    3540
cacgaacccc ccgttcagcc cgaccgctgc gccttatccg gtaactatcg tcttgagtcc    3600
aacccggtaa gacacgactt atcgccactg gcagcagcca ctggtaacag gattagcaga    3660
gcgaggtatg taggcggtgc tacagagttc ttgaagtggt ggcctaacta cggctacact    3720
agaaggacag tatttggtat ctgcgctctg ctgaagccag ttaccttcgg aaaaagagtt    3780
ggtagctctt gatccggcaa acaaaccacc gctggtagcg gtggtttttt tgtttgcaag    3840
```

| | |
|---|---|
| cagcagatta cgcgcagaaa aaaaggatct caagaagatc ctttgatctt ttctacgggg | 3900 |
| tctgacgctc agtggaacga aaactcacgt taagggattt tggtcatgaa caataaaact | 3960 |
| gtctgcttac ataaacagta atacaagggg tgttatgagc catattcaac gggaaacgtc | 4020 |
| ttgctctagg ccgcgattaa attccaacat ggatgctgat ttatatgggt ataaatgggc | 4080 |
| tcgcgataat gtcgggcaat caggtgcgac aatctatcga ttgtatggga agcccgatgc | 4140 |
| gccagagttg tttctgaaac atggcaaagg tagcgttgcc aatgatgtta cagatgagat | 4200 |
| ggtcagacta aactggctga cggaatttat gcctcttccg accatcaagc attttatccg | 4260 |
| tactcctgat gatgcatggt tactcaccac tgcgatcccc gggaaaacag cattccaggt | 4320 |
| attagaagaa tatcctgatt caggtgaaaa tattgttgat gcgctggcag tgttcctgcg | 4380 |
| ccggttgcat tcgattcctg tttgtaattg tcctttttaac agcgatcgcg tatttcgtct | 4440 |
| cgctcaggcg caatcacgaa tgaataacgg tttggttgat gcgagtgatt ttgatgacga | 4500 |
| gcgtaatggc tggcctgttg aacaagtctg gaaagaaatg cataaacttt tgccattctc | 4560 |
| accggattca gtcgtcactc atggtgattt ctcacttgat aaccttattt ttgacgaggg | 4620 |
| gaaattaata ggttgtattg atgttggacg agtcggaatc gcagaccgat accaggatct | 4680 |
| tgccatccta tggaactgcc tcggtgagtt ttctccttca ttacagaaac ggcttttca | 4740 |
| aaaatatggt attgataatc ctgatatgaa taaattgcag tttcatttga tgctcgatga | 4800 |
| gttttttctaa gaattaattc atgagcggat acatatttga atgtatttag aaaaataaac | 4860 |
| aaatagggt tccgcgcaca tttccccgaa aagtgccacc taaattgtaa gcgttaatat | 4920 |
| tttgttaaaa ttcgcgttaa attttgtta aatcagctca ttttttaacc aataggccga | 4980 |
| aatcggcaaa atcccttata atcaaaaga atagaccgag atagggttga gtgttgttcc | 5040 |
| agtttggaac aagagtccac tattaaagaa cgtggactcc aacgtcaaag ggcgaaaaac | 5100 |
| cgtctatcag ggcgatggcc cactacgtga accatcaccc taatcaagtt ttttggggtc | 5160 |
| gaggtgccgt aaagcactaa atcggaaccc taaagggagc ccccgattta gagcttgacg | 5220 |
| gggaaagccg cgaacgtgg cgagaaagga agggaagaaa gcgaaggag cgggcgctag | 5280 |
| ggcgctggca agtgtagcgg tcacgctgcg cgtaaccacc acaccgcc cgcttaatgc | 5340 |
| gccgctacag ggcgcgtccc attcgcca | 5368 |

<210> SEQ ID NO 7
<211> LENGTH: 721
<212> TYPE: PRT
<213> ORGANISM: Solanum lycopersicum

<400> SEQUENCE: 7

Met Ala Ser Ser Ile Val Gln Asn Gly His Val Asn Gly Glu Ala Met
1               5                   10                  15

Asp Leu Cys Lys Lys Ser Ile Asn Val Asn Asp Pro Leu Asn Trp Glu
                20                  25                  30

Met Ala Ala Glu Ser Leu Arg Gly Ser His Leu Asp Glu Val Lys Lys
            35                  40                  45

Met Val Asp Glu Phe Arg Lys Pro Ile Val Lys Leu Gly Gly Glu Thr
        50                  55                  60

Leu Thr Val Ala Gln Val Ala Ser Ile Ala Asn Val Asp Asn Lys Ser
65                  70                  75                  80

Asn Gly Val Lys Val Glu Leu Ser Glu Ser Ala Arg Ala Gly Val Lys
                85                  90                  95

Ala Ser Ser Asp Trp Val Met Asp Ser Met Gly Lys Gly Thr Asp Ser

```
                100              105                 110
Tyr Gly Val Thr Thr Gly Phe Gly Ala Thr Ser His Arg Arg Thr Lys
            115                 120                 125

Asn Gly Gly Ala Leu Gln Lys Glu Leu Ile Arg Phe Leu Asn Ala Gly
            130                 135             140

Val Phe Gly Asn Gly Thr Glu Ser Ser His Thr Leu Pro His Ser Ala
145             150                 155                 160

Thr Arg Ala Ala Met Leu Val Arg Ile Asn Thr Leu Leu Gln Gly Tyr
                165             170                 175

Ser Gly Ile Arg Phe Glu Ile Leu Glu Ala Ile Thr Lys Leu Ile Asn
            180                 185             190

Ser Asn Ile Thr Pro Cys Leu Pro Leu Arg Gly Thr Ile Thr Ala Ser
            195                 200             205

Gly Asp Leu Val Pro Leu Ser Tyr Ile Ala Gly Leu Leu Thr Gly Arg
            210                 215             220

Pro Asn Ser Lys Ala Val Gly Pro Asn Gly Glu Lys Leu Asn Ala Glu
225             230             235                 240

Glu Ala Phe Arg Val Ala Gly Val Thr Ser Gly Phe Phe Glu Leu Gln
                245             250                 255

Pro Lys Glu Gly Leu Ala Leu Val Asn Gly Thr Ala Val Gly Ser Gly
                260             265                 270

Met Ala Ser Met Val Leu Phe Glu Ser Asn Ile Leu Ala Val Met Ser
            275                 280                 285

Glu Val Leu Ser Ala Ile Phe Ala Glu Val Met Asn Gly Lys Pro Glu
            290                 295             300

Phe Thr Asp Tyr Leu Thr His Lys Leu Lys His His Pro Gly Gln Ile
305             310             315                 320

Glu Ala Ala Ala Ile Met Glu His Ile Leu Asp Gly Ser Ser Tyr Val
                325             330             335

Lys Ala Ala Gln Lys Leu His Glu Met Asp Pro Leu Gln Lys Pro Lys
            340             345                 350

Gln Asp Arg Tyr Ala Leu Arg Thr Ser Pro Gln Trp Leu Gly Pro Gln
            355             360             365

Ile Glu Val Ile Arg Ala Ala Thr Lys Met Ile Glu Arg Glu Ile Asn
370             375                 380

Ser Val Asn Asp Asn Pro Leu Ile Asp Val Ser Arg Asn Lys Ala Leu
385                 390             395             400

His Gly Gly Asn Phe Gln Gly Thr Pro Ile Gly Val Ser Met Asp Asn
                405             410                 415

Thr Arg Leu Ala Leu Ala Ser Ile Gly Lys Leu Met Phe Ala Gln Phe
                420             425             430

Ser Glu Leu Val Asn Asp Tyr Tyr Asn Asn Gly Leu Pro Ser Asn Leu
            435             440             445

Thr Ala Gly Arg Asn Pro Ser Leu Asp Tyr Gly Leu Lys Gly Ala Glu
            450             455             460

Ile Ala Met Ala Ser Tyr Cys Ser Glu Leu Gln Phe Leu Ala Asn Pro
465             470             475             480

Val Thr Asn His Val Gln Ser Ala Glu Gln His Asn Gln Asp Val Asn
                485             490             495

Ser Leu Gly Leu Ile Ser Ala Arg Lys Thr Ala Glu Ala Val Asp Ile
            500             505             510

Leu Lys Leu Met Ser Ser Thr Tyr Leu Val Ala Leu Cys Gln Ala Ile
            515             520             525
```

Asp Leu Arg His Leu Glu Glu Asn Leu Arg Ser Ala Val Lys Asn Thr
    530                 535                 540

Val Ser Gln Val Ala Lys Arg Thr Leu Thr Met Gly Ala Asn Gly Glu
545                 550                 555                 560

Leu His Pro Ala Arg Phe Cys Glu Lys Glu Leu Leu Arg Val Val Asp
                565                 570                 575

Arg Glu Tyr Val Phe Ala Tyr Ala Asp Asp Pro Cys Ser Ser Thr Tyr
            580                 585                 590

Pro Leu Met Gln Lys Leu Arg Gln Val Leu Val Asp His Ala Met Lys
        595                 600                 605

Asn Gly Glu Ser Glu Lys Asn Val Asn Ser Ser Ile Phe Gln Lys Ile
    610                 615                 620

Val Ala Phe Glu Asp Glu Leu Lys Ala Val Leu Pro Lys Glu Val Glu
625                 630                 635                 640

Ser Ala Arg Ala Val Val Glu Ser Gly Asn Pro Ala Ile Pro Asn Arg
                645                 650                 655

Ile Thr Glu Cys Arg Ser Tyr Pro Leu Tyr Arg Leu Val Arg Gln Glu
            660                 665                 670

Leu Gly Ser Glu Leu Leu Thr Gly Glu Lys Val Arg Ser Pro Gly Glu
        675                 680                 685

Glu Ile Asp Lys Val Phe Thr Ala Met Cys Asn Gly Gln Ile Ile Asp
    690                 695                 700

Pro Leu Leu Glu Cys Leu Lys Ser Trp Asn Gly Ala Pro Leu Pro Ile
705                 710                 715                 720

Cys

<210> SEQ ID NO 8
<211> LENGTH: 1101
<212> TYPE: DNA
<213> ORGANISM: Thermoactinomyces intermedius

<400> SEQUENCE: 8
atgcgcgacg tgtttgaaat gatggaccgc tatggccacg agcaggtcat tttttgccgt      60
catccgcaaa ccggtctcaa agcgatcatc gccttgcata atacaaccgc ggggccggct     120
ttgggtggat gccgcatgat cccgtatgct tcgacggacg aagccttgga ggatgttttg     180
cggttgtcca aggcatgac ctataaatgc agtctggcgg atgtggactt ggcgggggga     240
aaaatggtta tcatcggcga tccgaaaaaa gataaatcgc cggagttgtt tcgcgtgatc     300
ggccgttttg tgggcgggtt aaacggccgt ttctataccg aaccgacat gggaaccaat     360
ccggaagatt ttgtccatgc cgccagggaa tcgaaatctt ttgccggatt gccgaaatcg     420
tacgcggaa aggggacac atccattccc accgcgctcg gggtgtttca cggaatgcgg     480
gccaccgccc ggttttatg ggggacggat cagctgaaag gcgtgtggt tgccatccaa     540
ggagtcggca agtgggaga gcgcttgttg cagcttttgg tcgaagtggg gcttactgc     600
aaaattgccg acatcgattc ggtgcgatgc gaacagctga agaaaagta tggcgacaag     660
gtccaattgg tggatgtgaa ccggattcac aaggagagtt gcgatatttt ctcgccttgc     720
gccaaaggcg cgtggtcaa tgatgacacc attgacgagt ccgttgcct ggccattgtc     780
ggatccgcca caaccaact ggtggaagac cggcatgggg cactgcttca aaaacggagc     840
atttgttatg cacccgatta tctggtgaat gccggcgggc tgattcaagt ggctgatgaa     900
ctggaaggct tccatgaaga gagagtgctc gccaaaaccg aagcgattta tgacatggtc     960

```
ctggatattt tcaccgggc gaaaaatgag aatattacca cttgtgaggc agcggaccgg   1020
atcgtgatgg agcgtttgaa aaagttaacc gatattcgcc ggatcttgtt ggaggatccc   1080
cgcaacagcg caaggaggta a                                             1101
```

<210> SEQ ID NO 9
<211> LENGTH: 352
<212> TYPE: PRT
<213> ORGANISM: Caenorhabditis remanei

<400> SEQUENCE: 9

```
Met Asp Phe Lys Ala Lys Leu Leu Ala Glu Met Ala Lys Lys Arg Lys
1               5                   10                  15

Ala Val Ser Gly Leu Glu Val Lys Glu Gly Ala Lys Phe Val Arg
            20                  25                  30

Gly Ala Asp Leu Glu Ser Lys Arg Thr Gln Glu Tyr Glu Ala Lys Gln
        35                  40                  45

Glu Glu Leu Ala Ile Lys Lys Arg Lys Ala Asp Asp Glu Ile Leu Gln
    50                  55                  60

Glu Ser Thr Ser Arg Ala Lys Ile Val Pro Glu Val Pro Glu Ala Glu
65                  70                  75                  80

Phe Asp Glu Lys Thr Pro Met Pro Glu Ile His Ala Arg Leu Arg Gln
                85                  90                  95

Arg Gly Gln Pro Ile Leu Leu Phe Gly Glu Ser Glu Leu Ser Val Arg
            100                 105                 110

Lys Arg Leu His Gln Leu Glu Ile Glu Gln Pro Glu Leu Asn Glu Gly
        115                 120                 125

Trp Glu Asn Glu Met Gln Thr Ala Met Lys Phe Ile Gly Lys Glu Met
    130                 135                 140

Asp Lys Ala Val Val Glu Gly Thr Ala Asp Ser Ala Thr Arg His Asp
145                 150                 155                 160

Ile Ala Leu Pro Gln Gly Tyr Glu Glu Asp Asn Trp Lys Ser Ile Glu
                165                 170                 175

His Ala Ser Thr Leu Leu Gly Val Gly Asp Glu Met Lys Arg Asp Cys
            180                 185                 190

Asp Ile Ile Leu Ser Ile Cys Arg Tyr Ile Leu Ala Arg Trp Ala Arg
        195                 200                 205

Asp Leu Asn Asp Arg Pro Leu Asp Val Lys Lys Thr Ala Gln Gly Met
    210                 215                 220

His Glu Ala Ala His His Lys Gln Thr Thr Met His Leu Lys Ser Leu
225                 230                 235                 240

Met Thr Ser Met Glu Lys Tyr Asn Val Asn Asn Asp Ile Arg His His
                245                 250                 255

Leu Ala Lys Ile Cys Arg Leu Leu Val Ile Glu Arg Asn Tyr Leu Glu
            260                 265                 270

Ala Asn Asn Ala Tyr Met Glu Met Ala Ile Gly Asn Ala Pro Trp Pro
        275                 280                 285

Val Gly Val Thr Arg Ser Gly Ile His Gln Arg Pro Gly Ser Ala Lys
    290                 295                 300

Ala Tyr Val Ser Asn Ile Ala His Val Leu Asn Asp Glu Thr Gln Arg
305                 310                 315                 320

Lys Tyr Ile Gln Ala Phe Lys Arg Leu Met Thr Lys Leu Gln Glu Tyr
                325                 330                 335

Phe Pro Thr Asp Pro Ser Lys Ser Val Glu Phe Val Lys Lys Ser Val
            340                 345                 350
```

<210> SEQ ID NO 10
<211> LENGTH: 411
<212> TYPE: PRT
<213> ORGANISM: Arabidopsis thaliana

<400> SEQUENCE: 10

Met Asn Ala Leu Ala Ala Thr Asn Arg Asn Phe Lys Leu Ala Ala Arg
1               5                   10                  15

Leu Leu Gly Leu Asp Ser Lys Leu Glu Lys Ser Leu Leu Ile Pro Phe
            20                  25                  30

Arg Glu Ile Lys Val Glu Cys Thr Ile Pro Lys Asp Asp Gly Thr Leu
        35                  40                  45

Ala Ser Phe Val Gly Phe Arg Val Gln His Asp Asn Ala Arg Gly Pro
    50                  55                  60

Met Lys Gly Gly Ile Arg Tyr His Pro Glu Val Asp Pro Asp Glu Val
65                  70                  75                  80

Asn Ala Leu Ala Gln Leu Met Thr Trp Lys Thr Ala Val Ala Lys Ile
                85                  90                  95

Pro Tyr Gly Gly Ala Lys Gly Gly Ile Gly Cys Asp Pro Ser Lys Leu
            100                 105                 110

Ser Ile Ser Glu Leu Glu Arg Leu Thr Arg Val Phe Thr Gln Lys Ile
        115                 120                 125

His Asp Leu Ile Gly Ile His Thr Asp Val Pro Ala Pro Asp Met Gly
    130                 135                 140

Thr Gly Pro Gln Thr Met Ala Trp Ile Leu Asp Glu Tyr Ser Lys Phe
145                 150                 155                 160

His Gly Tyr Ser Pro Ala Val Val Thr Gly Lys Pro Ile Asp Leu Gly
                165                 170                 175

Gly Ser Leu Gly Arg Asp Ala Ala Thr Gly Arg Gly Val Met Phe Gly
            180                 185                 190

Thr Glu Ala Leu Leu Asn Glu His Gly Lys Thr Ile Ser Gly Gln Arg
        195                 200                 205

Phe Val Ile Gln Gly Phe Gly Asn Val Gly Ser Trp Ala Ala Lys Leu
    210                 215                 220

Ile Ser Glu Lys Gly Gly Lys Ile Val Ala Val Ser Asp Ile Thr Gly
225                 230                 235                 240

Ala Ile Lys Asn Lys Asp Gly Ile Asp Ile Pro Ala Leu Leu Lys His
                245                 250                 255

Thr Lys Glu His Arg Gly Val Lys Gly Phe Asp Gly Ala Asp Pro Ile
            260                 265                 270

Asp Pro Asn Ser Ile Leu Val Glu Asp Cys Asp Ile Leu Val Pro Ala
        275                 280                 285

Ala Leu Gly Gly Val Ile Asn Arg Glu Asn Ala Asn Glu Ile Lys Ala
    290                 295                 300

Lys Phe Ile Ile Glu Ala Ala Asn His Pro Thr Asp Pro Asp Ala Asp
305                 310                 315                 320

Glu Ile Leu Ser Lys Lys Gly Val Val Ile Leu Pro Asp Ile Tyr Ala
                325                 330                 335

Asn Ser Gly Gly Val Thr Val Ser Tyr Phe Glu Trp Val Gln Asn Ile
            340                 345                 350

Gln Gly Phe Met Trp Glu Glu Lys Val Asn Asp Glu Leu Lys Thr
        355                 360                 365

Tyr Met Thr Arg Ser Phe Lys Asp Leu Lys Glu Met Cys Lys Thr His

|     |     | 370 |     |     | 375 |     |     |     | 380 |     |     |     |
| --- | --- | --- | --- | --- | --- | --- | --- | --- | --- | --- | --- | --- |
| Ser | Cys | Asp | Leu | Arg | Met | Gly | Ala | Phe | Thr | Leu | Gly | Val | Asn | Arg | Val |
| 385 |     |     |     |     | 390 |     |     |     | 395 |     |     |     |     |     | 400 |
| Ala | Gln | Ala | Thr | Ile | Leu | Arg | Gly | Trp | Gly | Ala |
|     |     |     |     | 405 |     |     |     |     | 410 |     |